US009361590B2

(12) United States Patent
Noda et al.

(10) Patent No.: US 9,361,590 B2
(45) Date of Patent: Jun. 7, 2016

(54) INFORMATION PROCESSING APPARATUS, INFORMATION PROCESSING METHOD, AND PROGRAM

(71) Applicant: SONY CORPORATION, Tokyo (JP)

(72) Inventors: Kuniaki Noda, Tokyo (JP); Kenta Kawamoto, Tokyo (JP); Peter Duerr, Tokyo (JP); Kohtaro Sabe, Tokyo (JP)

(73) Assignee: Sony Corporation, Tokyo (JP)

( * ) Notice: Subject to any disclaimer, the term of this patent is extended or adjusted under 35 U.S.C. 154(b) by 323 days.

(21) Appl. No.: 14/047,285

(22) Filed: Oct. 7, 2013

(65) Prior Publication Data
US 2014/0114888 A1    Apr. 24, 2014

(30) Foreign Application Priority Data
Oct. 18, 2012    (JP) .................................. 2012-230513

(51) Int. Cl.
*G06F 15/18*    (2006.01)
*G06N 99/00*    (2010.01)
*G06K 9/62*    (2006.01)

(52) U.S. Cl.
CPC ............ *G06N 99/005* (2013.01); *G06K 9/6256* (2013.01)

(58) Field of Classification Search
None
See application file for complete search history.

(56) References Cited

U.S. PATENT DOCUMENTS

| 4,147,930 A * | 4/1979 | Browne ............... G01B 11/024 198/394 |
| 8,645,304 B2 * | 2/2014 | Jiang ...................... G06N 7/005 706/47 |
| 2005/0185834 A1 * | 8/2005 | Kristjansson ............ G06K 9/32 382/154 |
| 2008/0259163 A1 * | 10/2008 | Yu ........................ G06K 9/6226 348/169 |
| 2009/0110236 A1 * | 4/2009 | Huang .................. G06T 7/2053 382/103 |

OTHER PUBLICATIONS

Kawamoto, et al., Development of Object Manipulation through Self-Exploratory Visuomotor Experience, DATE: Aug. 24-24, 2011.

* cited by examiner

*Primary Examiner* — Kakali Chaki
*Assistant Examiner* — Luis Sitiriche
(74) *Attorney, Agent, or Firm* — Paratus Law Group, PLLC

(57) ABSTRACT

There is provided an information processing apparatus including a manipulation model learning unit configured to learn a manipulation model regarding manipulation of a first object by a second object, by use of an actual image that is an actually observed image including the first object and the second object, the manipulation model associating a position and a change in state of the second object, when a state of the second object changes at a position in an object reference coordinate system with the first object regarded as a reference, with a change in state of the first object caused by the change in state of the second object.

17 Claims, 31 Drawing Sheets

FIG.13
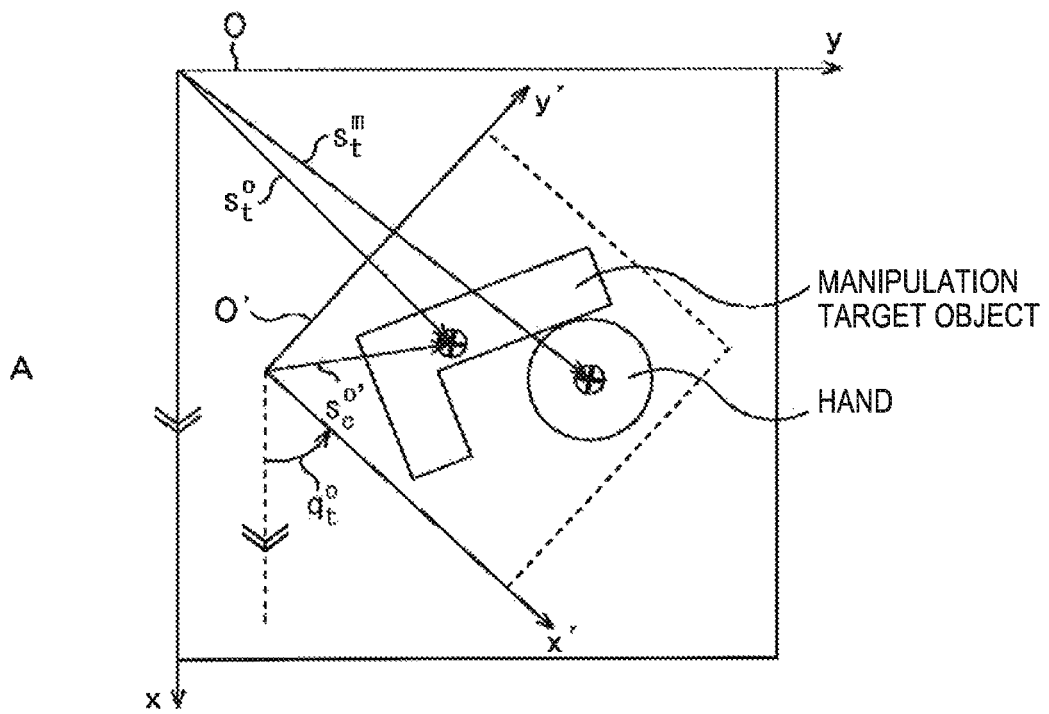
A
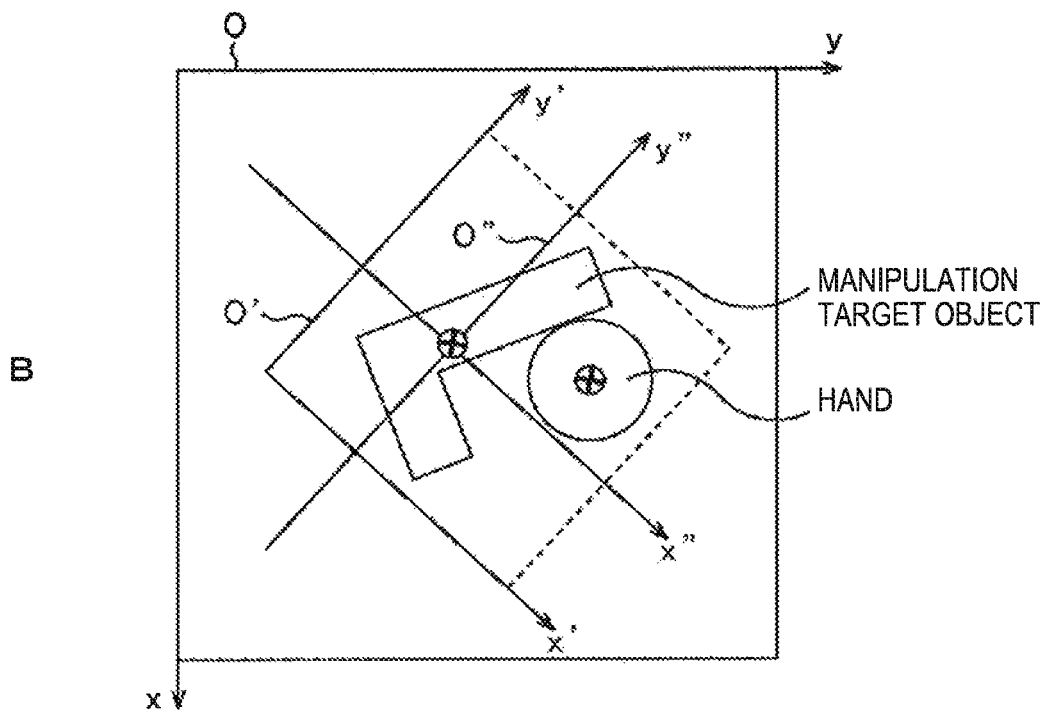
B

INFORMATION PROCESSING APPARATUS, INFORMATION PROCESSING METHOD, AND PROGRAM

BACKGROUND

This technology relates to an information processing apparatus, an information processing method, and a program, and more particularly relates to an information processing apparatus, an information processing method, and a program, which make it possible to provide, for example, a manipulation model with high versatility as a manipulation model with respect to manipulation of an object.

For example, when a manipulator is made to autonomously manipulate a manipulation target object, a model that precisely reproduces motions of the object in an object manipulation environment is constructed in advance as a manipulation model with respect to manipulation of the object, and a motion plan of the manipulator is analytically worked out by using the manipulation model.

For example, data on the shape of an object, a rigid-body dynamics model, and the like are constructed as a manipulation model by a designer of the manipulator.

If the manipulation model constructed in advance as described above encounters changes in object manipulation environment, such as disturbance due to change in shape and friction of the object which are not assumed in the manipulation model, disagreement may arise (consistency may be compromised) between the changed environment and the manipulation model, which makes it difficult to execute precise manipulation (expected manipulation) of the object.

Accordingly, there has been proposed a learning-type manipulation model which aims at achieving learning-based object manipulation on the basis of an experience of object manipulation in the environment, without using previously set assumption regarding data on the shape of an object, a rigid-body dynamics model, and the like (see, for example, "Development of object manipulation through self-exploratory visuomotor experience" by K. Kawamoto, K. Noda, T. Hasuo, and K. Sabe, in Proceedings of the IEEE. International Conference on Development and Learning (ICDL, 2011), 2011.

SUMMARY

In "Development of object manipulation through self-exploratory visuomotor experience," learning of a manipulation model is performed depending on an absolute position and posture of an object in an environment (a position and posture of an object as a foreground in an environment as a background of an image observed by a manipulator). Accordingly, when an object is put in an inexperienced location (such as a location where the manipulator has not been before), the manipulator determines that the state where the object is placed as an unlearned state, and so the manipulator may find it difficult to take an action for precise manipulation of the object.

As a method for learning a manipulation model so that an object can precisely be manipulated regardless of the position and posture of the object in an environment, there is a method in which an experience of the object moving all the places in the environment is prepared as learned data and the manipulation model is learned by using all the learned data.

However, this method takes huge amounts of time for preparing learned data as an experience (trial of actions) and for completing learning of the manipulation model by use of the learned data.

Therefore, it is desirable to propose, in a sense, a highly versatile manipulation model that is capable of manipulating an object with precision not only in the case where the object is put in an experienced location but also in the case where the object is put in an inexperienced location.

The technology has been made in view of such circumstances, and it is desirable to provide a manipulation model with high versatility as a manipulation model with respect to manipulation of an object.

According to an embodiment of the present disclosure, there is provided an information processing apparatus or a program for causing a computer to function as the information processing apparatus, the information processing apparatus including a manipulation model learning unit configured to learn a manipulation model regarding manipulation of a first object by a second object, by use of an actual image that is an actually observed image including the first object and the second object, the manipulation model associating a position and a change in state of the second object, when a state of the second object changes at a position in an object reference coordinate system with the first object regarded as a reference, with a change in state of the first object caused by the change in state of the second object.

According to an embodiment of the present disclosure, there is provided an information processing method including learning a manipulation model regarding manipulation of a first object by a second object by use of an actual image that is an actually observed image including the first object and the second object, the manipulation model associating a position and a change in state of the second object, when a state of the second object changes at a position in an object reference coordinate system with the first object regarded as a reference, with a change in state of the first object caused by the change in state of the second object.

In one aspect as described in the foregoing, a manipulation model with respect to manipulation of a first object by a second object is learned by use of an actual image that is an actually observed image including the first object and the second object, the manipulation model associating a position and a change in state of the second object, when the state of the second object has changed at each position in an object reference coordinate system with the first object as a reference, with a change in state of the first object caused by the change in state of the second object.

Note that the information processing apparatus may be an independent apparatus or may be an internal block that constitutes one apparatus.

The program may be provided in the form of being transmitted via a transmission medium or being recorded in a record medium.

According to an embodiment of the technology, it becomes possible to provide a manipulation model with high versatility as a manipulation model with respect to manipulation of an object.

BRIEF DESCRIPTION OF THE DRAWINGS

FIG. 13 is a view explaining an object reference coordinate system;

DETAILED DESCRIPTION OF THE EMBODIMENT(S)

Figure 1:
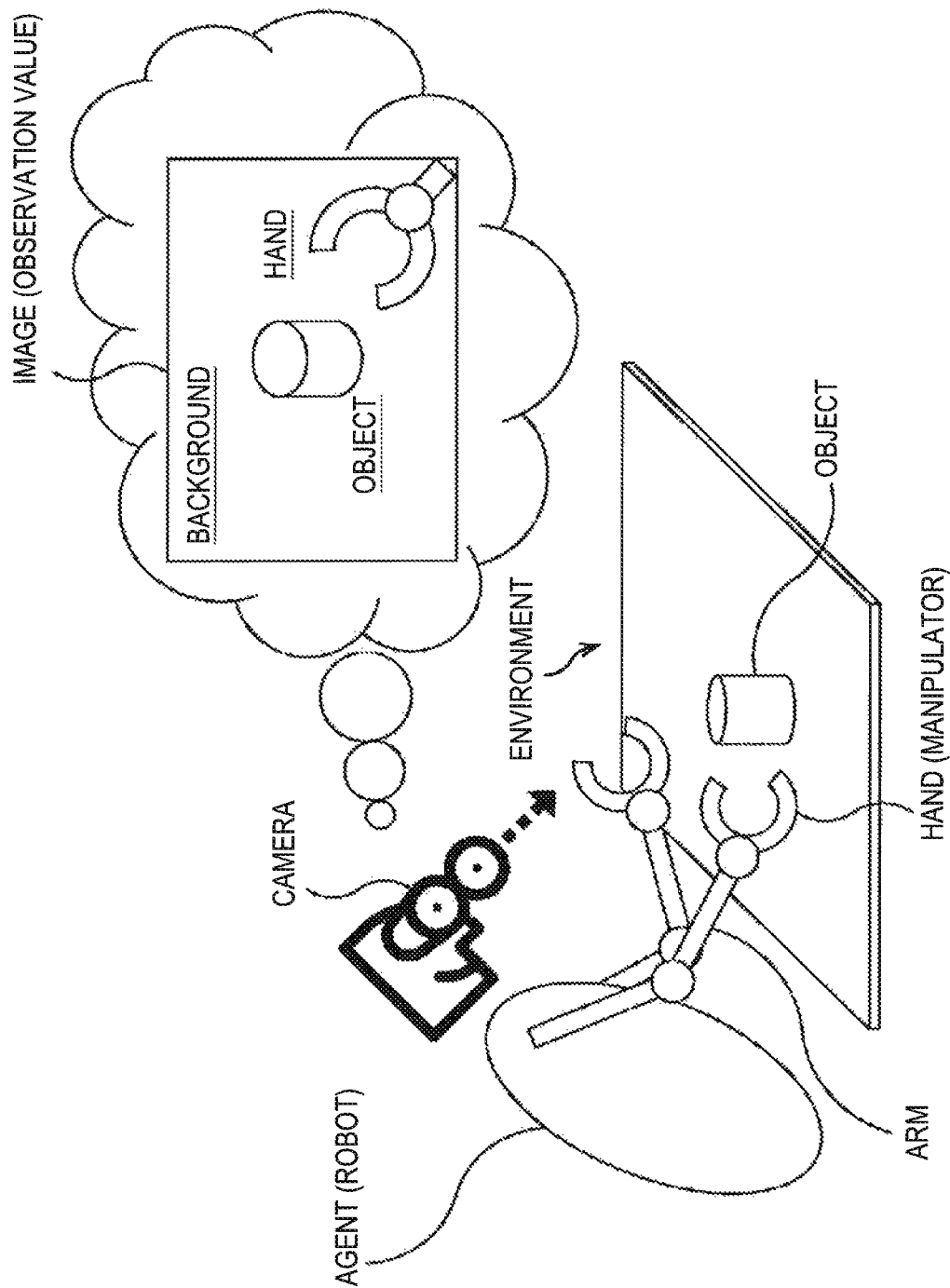
FIG. 1 is a view explaining an outline of the technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[Chapter 0: Outline of the Technology]

FIG. 1 is a view explaining an outline of the technology.

This technology is a technology that uses an agent such as a robot which can perform actions, the agent including, for example, a hand (manipulator) or the like as an object to be controlled (control target object) (second object) which is controlled in order to manipulate an object to be manipulated (manipulation target object) (first object) in an environment and a camera or the like which can observe (photograph) the environment shown in FIG. 1 so as to learn, from an image observed with the camera, a manipulation model with respect to manipulation of the object (manipulation target object) for use in implementing manipulation of the object under a real environment, and to manipulate the object by use of the manipulation model.

Specifically, in the technology, learning of a manipulation model is performed from an actual image actually observed in the agent. By use of the manipulation model, an action of the hand (control target object) is performed, and with the action of the hand, an object (manipulation target object) in the environment is manipulated.

Therefore, in the technology, a manipulation model is acquired by learning by use of actual images. This makes it possible to omit prior construction of knowledge about the shape of a manipulation target object, a rigid-body dynamics model, or the like for the manipulation model, and makes it possible to manipulate the manipulation target object having an arbitrary shape by learning.

The manipulation model of the technology is a model which stochastically associates movement of the hand (control target object) with movement of the object (manipulation target object) generated by the movement of the hand, so that the model is provided by focusing attention only on a stochastic relationship between movement (change in state) of the hand and movement (change in state) of the object so as to obtain the stochastic relationship.

Furthermore, the manipulation model of the technology may be used as both a prediction model (forward model) that can predict movement of the object generated in response to the movement of the hand and a control model (inverse model) that can derive movement of the hand which is for generating a targeted movement of the object.

The manipulation model of the technology is also an additional learning type manipulation model which allows additional learning. The additional learning enables the model to adapt to environmental change.

In learning of the manipulation model of the technology, positions and postures of the object, which are expressed with an object reference coordinate system with a manipulation target object as a reference, are used as learned data for learning the manipulation model in order to acquire the manipulation model with so-called high versatility which can be used without depending on an absolute position and a posture of the manipulation target object in an environment, i.e., in order to achieve versatility of the manipulation model.

In the technology, learning the manipulation model by use of positions and postures of an object which are expressed with the object reference coordinate system makes it possible to obtain a manipulation model which can precisely manipulate the object through less experience as compared with a case where learning is performed depending on the absolute position and posture of an object in an environment.

Note that it suffices that an image (actual image) for use in learning of the manipulation model is an actual image which can actually be observed by an agent. For example, dynamic images taken with a video camera, dynamic images obtained by capturing computer game screens, and the like, can be employed as the image.

Further, in the present embodiment, as described later, a foreground appearance model which is an appearance model of a foreground corresponding to an object or a hand (a portion of the image including the object or the hand) is learned from an actual image observed by the agent, and the object or the hand is recognized (the object or the hand included in the actual image is recognized) from the actual image by use of the foreground appearance model. However, in learning of the manipulation model of the technology, learning of the foreground appearance model can be omitted.

Specifically, in learning the manipulation model of the technology, learning the foreground appearance model (and learning a later-described background appearance model) can be omitted if the object and the hand on the actual image can be recognized and their positions (such as centroid positions) and postures can be ascertained by some methods.

[Chapter 1 Environment Setting]

Figure 2:
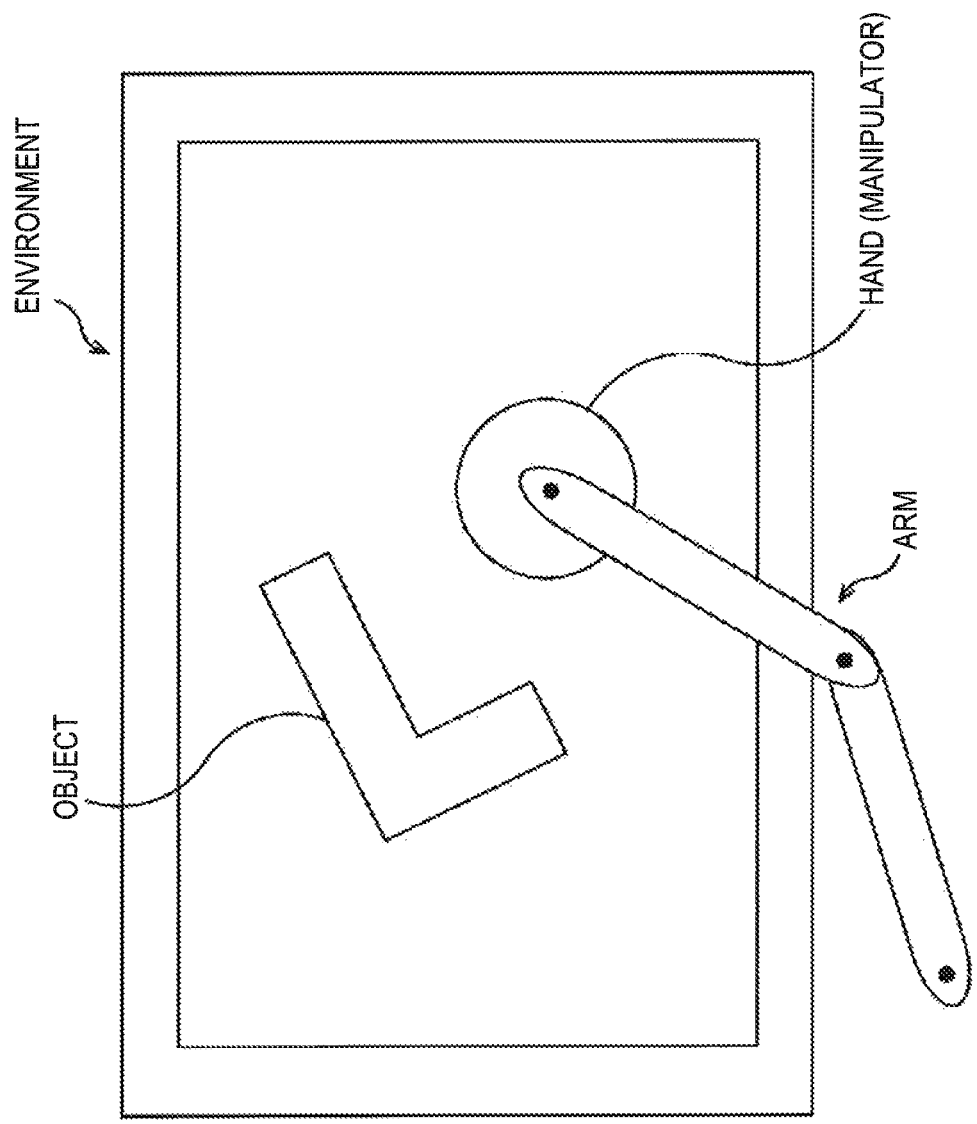
FIG. 2 is a view explaining an example of an environment to which the technology is applied.

FIG. 2 is a view explaining an example of the environment to which the technology is applied.

In FIG. 2, in an environment as a two-dimensional plane, an L-shaped object and a hand (manipulator) of an agent are placed.

The hand of the agent is attached to the top end of an arm corresponding to a forearm, and when the agent moves the arm, the hand attached to the top end of the arm is also moved. Therefore, the agent can autonomously move the hand.

Contrary to this, the L-shaped object does not move autonomously but moves in response to force when it is applied from the outside by the hand or the like.

In the present embodiment, the L-shaped object is a manipulation target object, and the hand (manipulator) is a control target object.

The agent takes an image of the environment with a camera, so that the image, which includes an environment as a background and an L-shaped object that moves while changing its position and posture and a hand as foregrounds that overlapped with the background is observed.

Although two-dimensional environment is illustrated in FIG. 2, the technology is also applicable to three-dimensional environment.

Although the image observed by the agent in FIG. 2 includes two foregrounds: a foreground corresponding to the L-shaped object; and a foreground corresponding to the hand, the number of foregrounds included in the image may be one or may be three or more.

In the technology, for the i-th foreground #i among the foregrounds included in the image, a state such as a position of a centroid (center of inertial mass) and a posture at time t is defined as $z^i_t$, while an action performed by the foreground or an action added to the foreground for movement or the like at time t is defined as $u^i_t$, respectively.

Moreover, a model representing the background of the image is referred to as a background model, while a model representing the foreground #i of the image is referred to as a foreground model #i.

The foreground mode #i includes a foreground appearance model $\mu^i$ which is an appearance model of the foreground #i.

The foreground appearance model $\mu^i$ includes a foreground texture model $\tau^i$ indicating the texture of the foreground #i and a foreground shape model $\sigma^i$ indicating the shape of the foreground #i, and is expressed by Formula (1).

$$\mu^i = \begin{bmatrix} \tau^i \\ \sigma^i \end{bmatrix} \quad (1)$$

The background model includes a background appearance mode $\mu^w$ which is an appearance model of the background.

The background appearance model $\mu^w$ includes a background texture model $\tau^w$ indicating the texture of the entire background and is expressed by Formula (2).

$$\mu^w = \tau^w \quad (2)$$

In the technology, a generation model that generates an observation value of an image includes the foreground model #i and the background model as described above, and generates an observation value $x_t$ of an image (hereinafter also referred to as an observation image) at each tune t.

Figure 3:
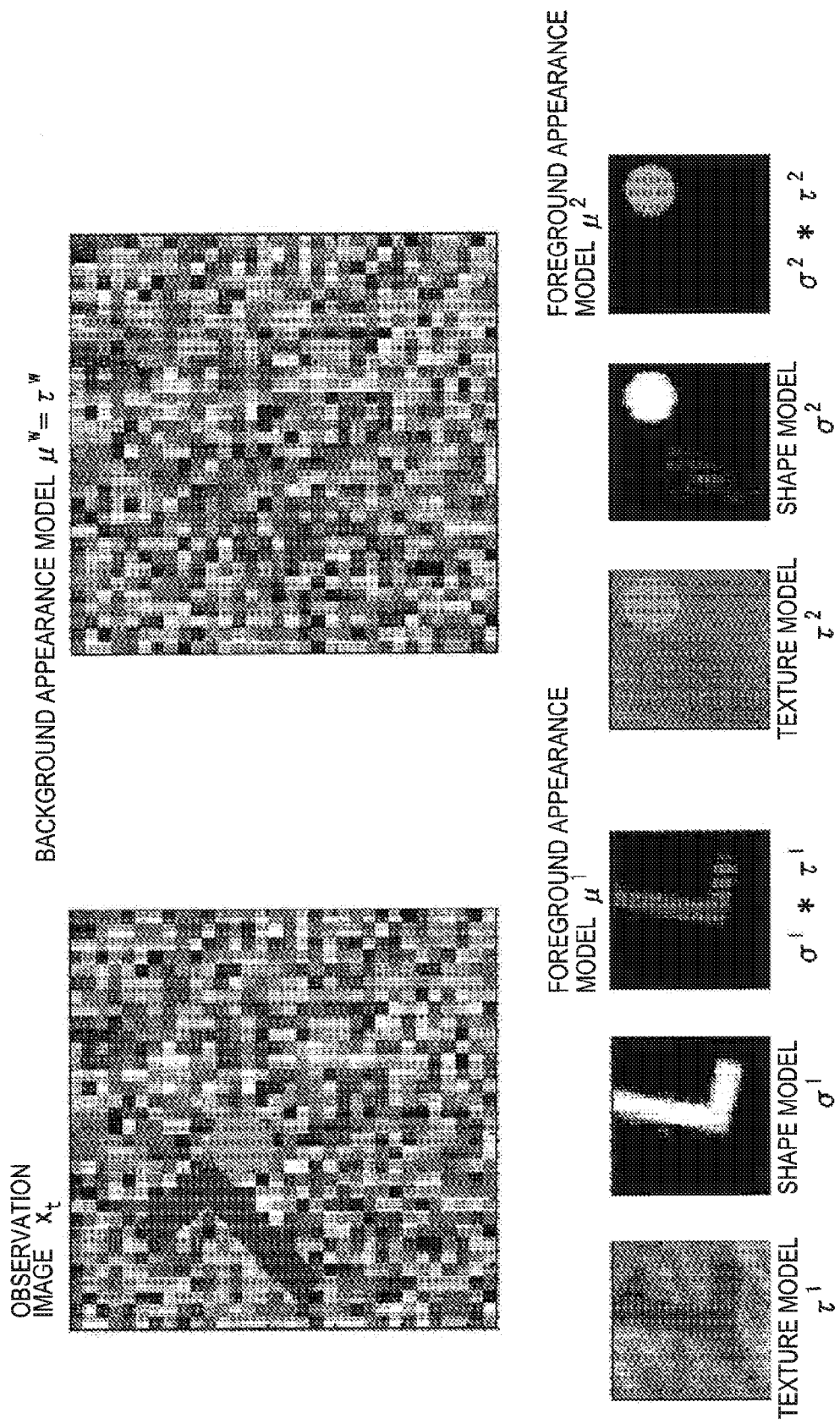
FIG. 3 is a view showing an example of a foreground model #i, a background model, and an observation image $x_t$ which is generated by use of the foreground model #i and the background model.

FIG. 3 is a view showing an example of a foreground model #i, a background model, and an observation image $x_1$ which is generated in the generation model including the foreground model #i and the background model.

In the foreground model #i, the foreground texture model $\tau^i$ and the foreground shape model $\sigma^i$ of the foreground appearance model $\mu^i$ are, for example, images of the same size, and an assumable maximum foreground size may be employed as their size.

An image as the foreground texture model $\tau^i$ has a value of the texture of the foreground #i (for example, RGB vales, etc.) as a pixel value of each pixel (pixel/voxel).

An image as the foreground shape model $\sigma^i$ has, for example, a continuous value in the range of 0 through 1 as a pixel value of each pixel. The pixel value of each pixel in the foreground shape model $\sigma^i$ expresses a probability of the pixel being a foreground (being a pixel expressing a foreground).

If a product of pixel values of the pixels at the same position is expressed by *, appearance of the foreground #i is expressed by $\tau^i * \sigma^i$ that is a product of pixel values of the pixels at the same position in the foreground texture model $\tau^i$ and the foreground shape model $\sigma^i$ included in the foreground appearance model $\mu^i$.

The background appearance model $\mu^w$ is superimposed on the foreground appearance model $\mu^i$, by which an observation image $x_t$ is generated. In FIG. 3, two foreground appearance models $\mu^1$ and $\mu^2$ are superimposed on the background appearance model $\mu^w = \tau^w$, so that an observation image $x_t$ is generated.

Figure 4:
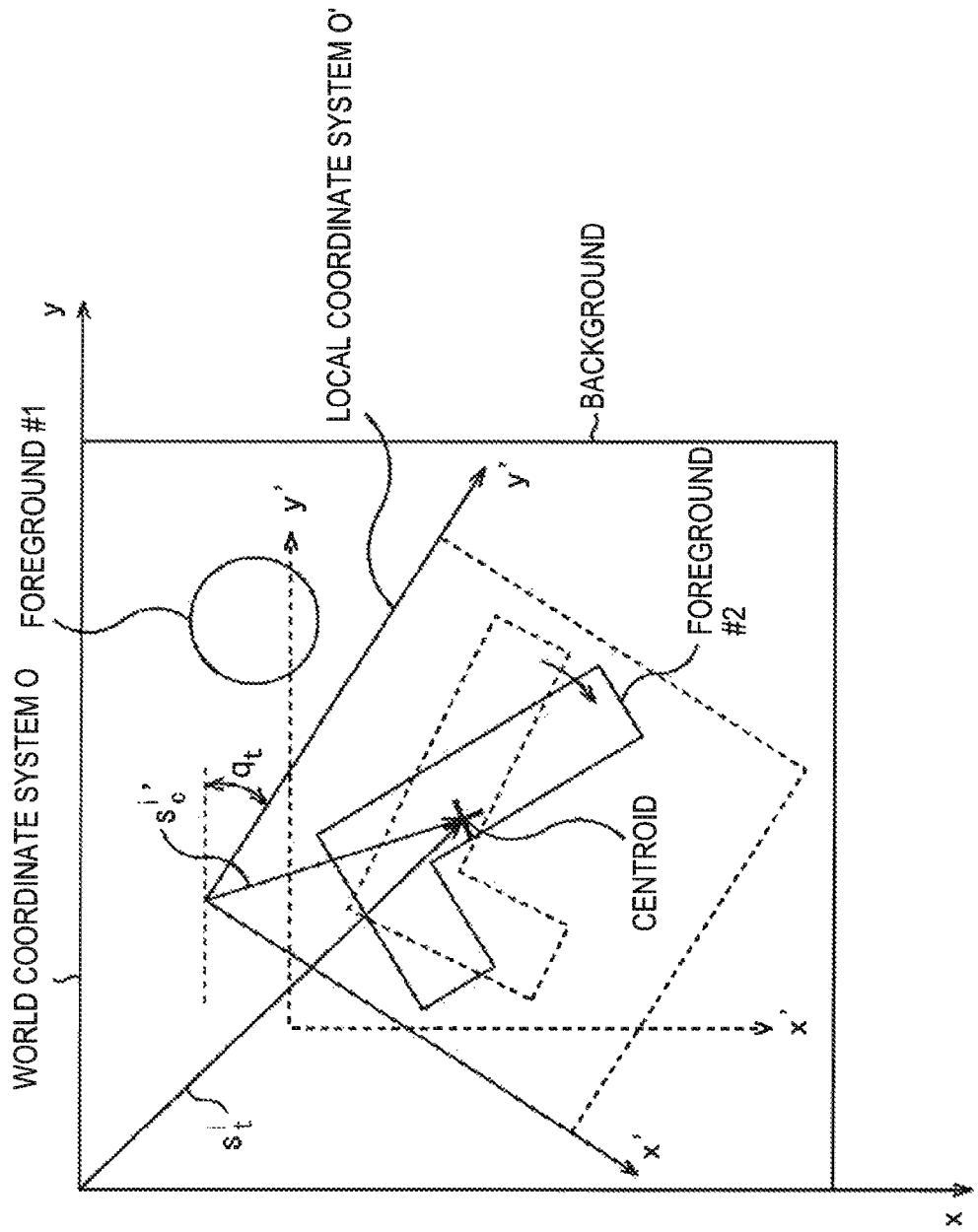
FIG. 4 is a view explaining a state $z^i_t$ of the foreground #i.

FIG. 4 is a view explaining the state $z^i_t$ of the foreground #i.

To express the state $z^i_t$ of the foreground #i, a world coordinate system O is defined as a coordinate system for expressing so-called an absolute state of the foreground #i in an environment (background), and a local coordinate system O' is defined as a coordinate system for expressing the state of the foreground in the foreground model (foreground appearance model) regardless of the state of the foreground #i on the world coordinate system O. The local coordinate system O' is defined for every foreground model #i at every time t.

For example, a two-dimensional coordinate system may be adopted as the world coordinate system O, in which an axis extending from the upper side to the lower side in the background appearance model $\mu^w=\tau^w$ is defined as an x axis, another axis extending from the left side to the right side is defined as a y-axis, and an upper left point in the background appearance model $\mu^w=\tau^w$ is defined as an origin.

For example, a two-dimensional coordinate system may be adopted as the local coordinate system O', in which an axis extending from the upper side to the lower side in the foreground appearance model $\mu$ (the foreground texture model $\tau^i$ and the foreground shape model $\sigma^i$) is defined as an $x^1$ axis, another axis extending from the left side to the right side is defined as a $y^1$ axis, and an upper left point in the foreground appearance model $\mu$ is defined as an origin.

Note that when the foreground appearance model $\mu^i$ is superimposed on the background appearance model $\mu^w$ with the original posture being maintained (without being rotated) in the generation model, the x' axis of the local coordinate system O' is in parallel with the x axis of the world coordinate system O, and the y' axis of the local coordinate system O' is in parallel with the y axis of the world coordinate system O. In FIG. 4, a two-dimensional coordinate system plotted with a dotted line shows a local coordinate system O' when the foreground appearance model $\mu^i$ is superimposed on the background appearance model $\mu^w$ with the original posture being maintained.

The state $z^i_t$ of the foreground #i includes, for example, a position $s^i_t$ of a mass center of the foreground #i (foreground appearance model $\mu^i$) on the world coordinate system O at time t, a change velocity of the position $s^i_t$ (a differential of the position $s^i_t$) $\dot{s}^i_t$, a posture $q^i_t$ of the foreground #i, a change velocity of the posture $q^i_t$ (differential of the posture $(q^i_t)$ $\dot{q}^i_t$, and is expressed by Formula (3).

$$z^i_t = \begin{bmatrix} s^i_t \\ s^{-i}_t \\ q^i_t \\ q^{-i}_t \end{bmatrix} \quad (3)$$

For example, an angle (angle of rotation) formed between the axis x(y) of the world coordinate system O and the axis x'(y') of the local coordinate system O' may be adopted as the posture $q^i_t$ of the foreground #i.

The local coordinate system O' of the foreground #i is inclined in proportion to the posture $q^i_t$ of the foreground #i which has the foreground appearance model $\mu^i$ superimposed on the background appearance model $\mu^w$. On the local coordinate system O' of the foreground #i, the foreground #i (the foreground appearance model $\mu^i$) is unmoved. Therefore, on the local coordinate system O' of the foreground #i, a position $s^i_c{}'$ of a centroid (center of mass) of the foreground #i is fixed and the posture thereof is also fixed.

It is to be noted that the observation value (observation image) $x_t$ observed in the generation model at time t is defined by Formula (4) by use of an image (observation image) $\lambda_t$ obtained by superimposing the foreground appearance model $\mu^i$ of all the foregrounds that are present at time t on the background appearance model $\mu^w=\tau^w$.

$$x_t=\lambda_t \quad (4)$$

[Chapter 2 Learning of Foreground Model and Background Model]
[Section 2.1 Framework of Generation Model]

Figure 5:
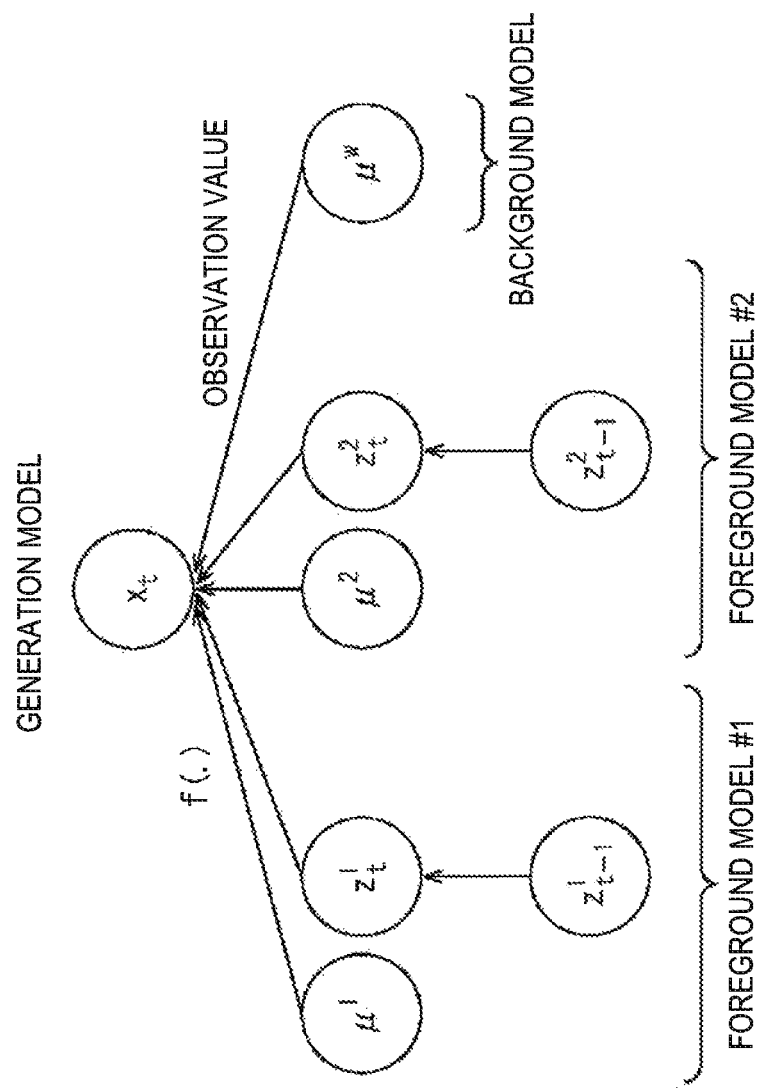
FIG. 5 is a view showing an example of a graphical model of a generation model that generates an observation image by use of the foreground model #i and the background model.

FIG. 5 is a view showing an example of a graphical model of the generation model that generates an observation image.

FIG. 5 shows a graphical model for a generation model of an image including two foregrounds #1 and #2.

According to the generation model of FIG. 5, the state $z^1_t$ of the foreground #1 at time t is determined based on the state $z^1_{t-1}$ at time t−1 immediately before.

Similarly, the state $z^2_t$ of the foreground #2 at time t is determined based on the state $z^2_{t-1}$ at time t−1 immediately before.

In the generation model, in accordance with the state $z^1_t$ of the foreground #1 at time t, (an image as) the foreground appearance model $\mu^1$ is superimposed on (an image as) the background appearance model $\mu^w$, so that an observation image $x_t$ including only the foreground #1 as a foreground is generated. Further in the generation model, in accordance with the state $z^2_t$ of the foreground #2 at time t, (an image as) the foreground appearance model $\mu^2$ is superimposed on the observation image $x_t$ having the foreground superimposed thereon immediately before, i.e., on the observation image $x_t$ including only the foreground #1 as a foreground in this case. As a result, an observation image $x_t$ including two foregrounds #1 and #2 is generated as an observation image $x_t$ observed at time t. In FIG. 5, only two foregrounds #1 and #2 are present as a foreground. However, when three or more foregrounds are present, an observation image $x_t$ including three or more foregrounds is similarly generated as an observation image $x_t$ observed at time t in the generation model.

In FIG. 5, a function f( ) is a function which generates the observation image $x_t$ by use of the foreground appearance model $\mu^1$, the state $z^1_t$ of the foreground #1 at time t, the foreground appearance model $\mu^2$, the state $z^2_t$ of the foreground #2 at time t, and the background appearance model $\mu^w$, and which represents a generation model.

Here, the observation image $x_t$ at time t generated in the generation model is a random variable (an expectation value of an observation value), and a likelihood of the observation image $x_t$ can be obtained by comparison with observation values $\tilde{x}_t$ of the image actually observed.

The foreground appearance model $\mu^i$, the background appearance model $\mu^w$, and the state $z^i$ of the foreground #i are parameters of the generation model that generates an observation value of an image. The state $z^i$ of the foreground #i is a latent variable that changes moment by moment, while the foreground appearance model $\mu^i$ and the background appearance model $\mu^w$ are permanent parameters (model parameters) independent of time.

It is to be noted that the total number of foregrounds is expressed by N. Although the total number N of the foregrounds is 2 in FIG. 5, a value of 1 or 3 or more may be employed as the total number N of the foregrounds.

The observation image $x_t$ generated in the generation model is determined by the state $z^i_t$ of the foreground #i as a latent variable, and the foreground appearance model $\mu^i_t$ and the background appearance model $\mu^w$ as model parameters. Therefore, the observation image $x_t$ can be expressed by Formula (5) which uses the function f( ) as a generation model.

$$x_t=f(z^1_t, \ldots z^N_t, \mu^1, \ldots, \mu^N, \mu^w) \quad (5)$$

[Section 2.2 EM Algorithm]

Figure 6:
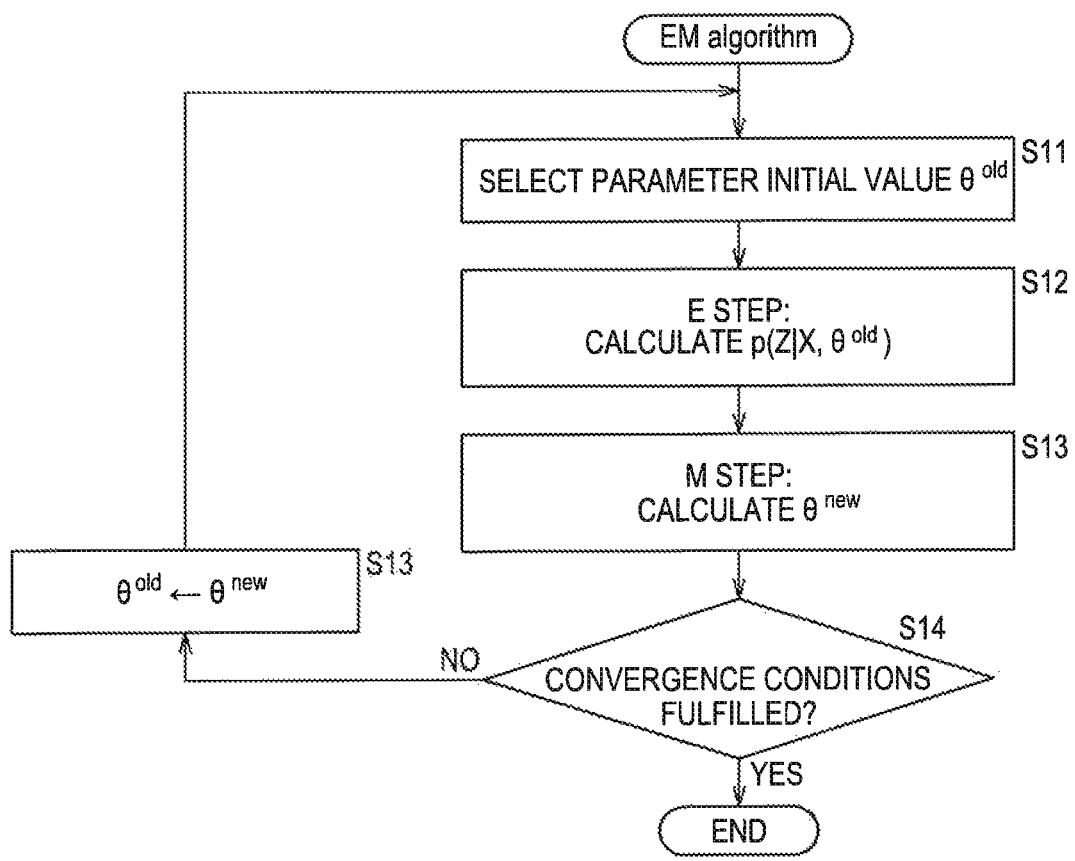
FIG. 6 is a flow chart explaining an EM algorithm.

FIG. 6 is a flow chart explaining an EM Algorithm.

As a method for calculating a maximum likelihood solution of the model parameter by use of an observation value actually observed for a model having a latent variable (zit) like the generation model shown in FIG. 5, an Expectation-Maximization (EM) algorithm may be used for example.

Suppose that a set of all the observation values and a set of latent (potential) variables are designated by X and Z, respectively.

Although the observation value X can be observed, it is difficult to observe the latent variable Z. A set {X, Z} of the observation value X and latent variable Z is referred to as complete data, while the observation value X is referred to as imperfect data.

Suppose that the complete data {X, Z} can be modeled with a probability distribution model, and (a model parameter) of the obtained model is expressed as θ.

A log likelihood ln(p(X|θ)) of the observation value X being observed in the model θ can be obtained by marginalizing a likelihood p(X, Z|θ) of the complete data {X, Z} being observed in the model θ with a latent variable Z and taking a logarithm thereof. The log likelihood ln(p(X|θ)) may be expressed by Formula (6).

$$\ln p(X \mid \theta) = \ln \left\{ \sum_Z p(X, Z \mid \theta) \right\} \quad (6)$$

Herein, ln represents a natural logarithm.

In subsequent operation, substituting summation (Σ) of the latent variables Z for integration makes it possible to establish the same argument even in the case where the latent variable Z is a continuous value.

Although the imperfect data X can be observed, it is difficult to observe all the complete data {X,Z}. Therefore, since it is difficult to use the likelihood (function) p(X,Z|θ) of the complete data {X,Z}, an expectation value of posteriori probability with respect to the latent variable Z is considered in the EM algorithm, alternatively.

The process of considering the expectation value of the posteriori probability with respect to the latent variable Z is the E step of the EM algorithm.

In the EM algorithm, a current model parameter $\theta^{old}$ is used for calculating a posteriori distribution p(Z|X, θ) of the latent variable Z when the observation value X is observed in the model θ, and the posteriori distribution $p(Z|X,\theta^{old})$ is used for calculating an expectation value $Q(\theta,\theta^{old})$ of a log likelihood (hereinafter also referred to as a complete data log likelihood) ln(p(X,Z|θ)) of the complete data {X,Z} being observed with an arbitrary model parameter θ.

Therefore, the expectation value $Q(\theta,\theta^{old})$ is expressed by Formula (7).

$$Q(\theta, \theta^{old}) = \sum_Z p(Z \mid X, \theta^{old}) \ln p(X, Z \mid \theta) \quad (7)$$

In Formula (7), an expectation value $Q(\theta,\theta^{old})$ of a complete data log likelihood ln(p(X,Z|θ)) is calculated by using the posteriori distribution $p(Z|X,\theta^{old})$ as a probability distribution of the complete data log likelihood ln(p(X,Z|θ)).

In the EM algorithm, the expectation value $Q(\theta,\theta^{old})$ is calculated in the E step as described in the foregoing, and then in the M step, the model parameter θ is updated from the current model parameter $\theta^{old}$ to a new model parameter $\theta^{new}$ in accordance with Formula (8) so as to maximize the expectation value $Q(\theta,\theta^{old})$.

$$\theta^{new} = \underset{\theta}{\mathrm{argmax}}\, Q(\theta, \theta^{old}) \quad (8)$$

Herein, Formula (8) argmax expresses a model parameter θ that maximizes $Q(\theta,\theta^{old})$.

Note that before the first E step is performed, the model parameter $\theta=\theta^{old}$ is initialized to an appropriate value by use of, for example, random numbers and the like.

A description is further given of the EM algorithm with reference to FIG. 6.

In the EM algorithm, in step S11, the model parameter θ is initialized to an appropriate initial value $\theta^{old}$, and the processing proceeds to step S12.

In step S12, processing of the E step is performed, and the processing proceeds to step S13. In short, in step S12, a posteriori distribution $p(Z|X,\theta^{old})$ is calculated by use of the imperfect data X.

In step S13, processing of the M step is performed, and the processing proceeds to S14. Specifically, in step S13, a new model parameter $\theta^{new}$ is calculated so that an expectation value $Q(\theta,\theta^{old})$ of the complete data log likelihood ln(p(X, Z|θ)) calculated with the posteriori distribution $p(Z|X,\theta^{old})$ is maximized.

In step S14, it is determined whether specified convergence conditions for ending the EM algorithm are fulfilled.

Herein, examples of the conditions that can be employed as the convergence conditions for ending the EM algorithm include: E step and the M step being repeated a prescribed number of times; the new model parameter $\theta^{new}$ hardly changing from the model parameter $\theta^{old}$ immediately before, and the likelihood of the observation value X observed in the new model parameter $\theta^{new}$ hardly changing from the likelihood of the observation value X observed in the model parameter $\theta^{old}$ immediately before.

In step S14, if it is determined that the convergence conditions are not yet fulfilled, the processing proceeds to step S15, where the model parameter θ is updated from the current model parameter $\theta^{old}$ to the new model parameter $\theta^{new}$.

The processing then returns from step S15 to step S12, and the same processing is repeated hereinafter.

If it is determined in step S14 that the convergence conditions have been fulfilled, then the processing is ended.

[Section 2.3 Approximation by Particle Filter]

Figure 7:
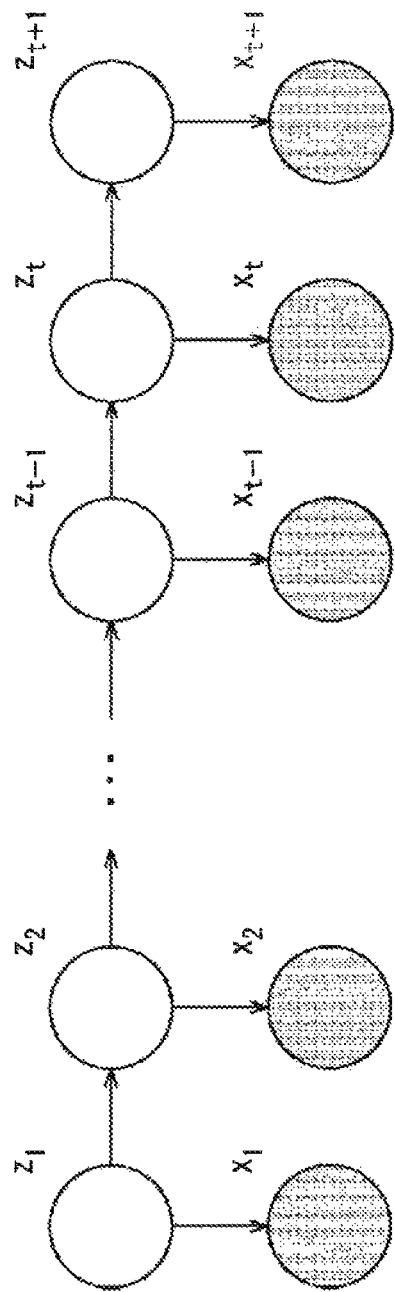
FIG. 7 is a view showing an example of a graphical model of a modelθ.

FIG. 7 is a view showing an example of a graphical model for the model θ that expresses the complete data {X,Z}.

In FIG. 7, a sequence $x_1, x_2, \ldots, x_{t+1}$ of the observation value X is expressed as a chain $z_1, z_2, \ldots, z_{t+1}$ of the latent variable Z, and each observation value $x_t$ is conditioned by a corresponding value (state) of the latent variable $z_t$.

When the model θ is a model having difficulty in analytically calculating the E step of the EM algorithm, the E step may be calculated by use of an approximation reasoning method based on a numerical sampling (Monte Carlo sampling).

The Monte Carlo sampling is described in, for example "Pattern Recognition and Machine Learning (II): Statistical Inference based on Bayes Theory" by C. M. Bishop, Springer Japan KK, 2008, pp. 364-365 (in Japanese translation) and "CONDENSATION—conditional density propagation for visual tracking" by Michael Isard and Andrew Blake, Int. J. Computer Vision, 29, 1, 5-28, 1998.

The expectation value $Q(\theta,\theta^{old})$ of the complete data log likelihood ln(p(X,Z|θ)) in the case where the latent variable Z is a continuous value is expressed by Formula (9) where summation (Σ) of Formula (7) is substituted for integration.

$$Q(\theta,\theta^{old}) = \int p(Z|X,\theta^{old}) \ln p(Z,X|\theta) dZ \quad (9)$$

The expectation value $Q(\theta,\theta^{old})$ of Formula (9) can be approximated as shown in Formula (10) with a limited sum of L samples $z^{(l)}$(l=1, 2, ..., L) of the latent variable Z sampled by using a sampling method from the current posteriori distribution $p(Z|X,\theta^{old})$.

$$Q(\theta, \theta^{old}) \cong \sum_{l=1}^{L} \ln p(Z^{(l)}, X|\theta) \qquad (10)$$

The expectation value $Q(\theta, \theta^{old})$ calculated in accordance with Formula (10) can be optimized in a normal M step (a model parameter $\theta = \theta new$ which maximizes the expectation value $Q(\theta, \theta^{old})$ can be calculated).

As mentioned above, the EM algorithm for calculating the model parameter $\theta = \theta^{new}$ that maximizes the expectation value $Q(\theta, \theta^{old})$ calculated in accordance with Formula (10) is referred to as the Monte Carlo EM algorithm.

As a technique for sequentially sampling the sequence $x_1$, $x_2, \ldots, x_t$ of the observation value X, there is a sequential Monte Carlo algorithm called a particle filter.

Figure 8:
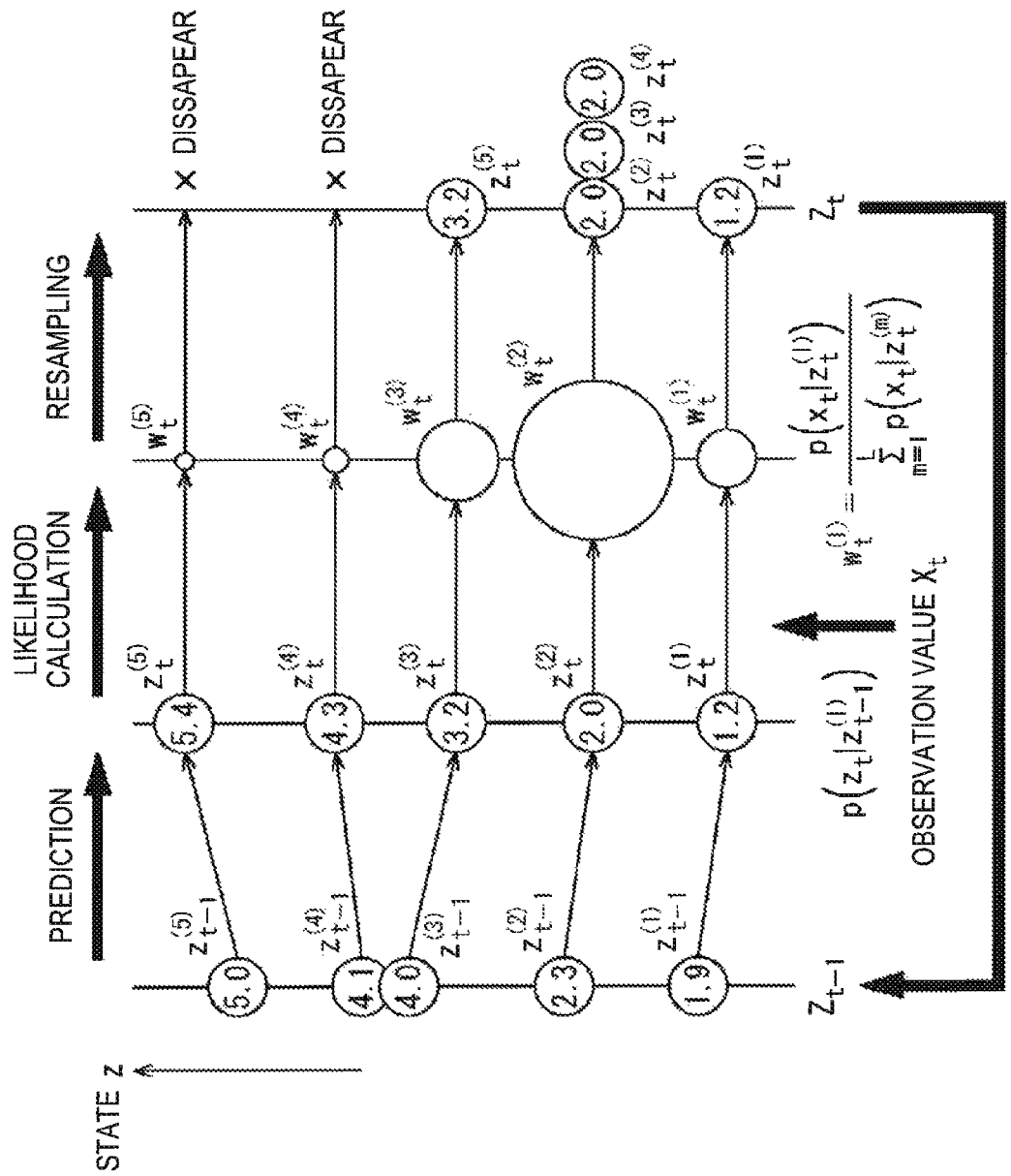
FIG. 8 is a view explaining a particle filter.

FIG. 8 is a view explaining the particle filter.

In the particle filter, in the model $\theta$ indicated by the graphical model shown in FIG. 7 for example, a sequence $x_{t-1} = x_1$, $x_2, \ldots, x_{t-1}$ of the observation value X is observed by time t−1, and L states $z^{(1)}{}_t (z^{(1)}{}_t, z^{(2)}{}_t, \ldots, z^{(L)}{}_t)$ are sampled from a posteriori distribution $p(z_t|X_{t-1})$ of being in the state $z_t$ (of becoming equal to the state $z_t$) at time t. These sampled samples (states $z^{(1)}{}_t$ in this case) are referred to as particles.

In the state $z_t$ at time t, an expectation value $E[f(z_t)]$ of observation values $x_t = f(z_t)$ observed based on the function f( ) as the generation model in FIG. 5 and Formula (5) can be approximated by Formula (11) by use of a particle (state particle) $z^{(l)}{}_t$ of the state $z_t$.

$$E[f(z_t)] \cong \sum_{l=1}^{L} w_t^{(l)} f(z_t^{(l)}) \qquad (11)$$

Herein, $w^{(l)}{}_t$ represents a weight of the particle $z^{(l)}{}_t$. The weight $w^{(l)}{}_t$ is a value corresponding to an (observation) likelihood $p(x_t|z^{(l)}{}_t)$ of the observation value $x_t$ being observed in the state $z^{(l)}{}_t$ (as a particle). The weight $w^{(l)}{}_t$ is defined by Formula (12).

$$w_t^{(l)} = \frac{p(x_t \mid z_t^{(l)})}{\sum_{m=1}^{L} p(x_t \mid z_t^{(m)})} \qquad (12)$$

Note that the weight $w^{(l)}{}_t$ is a value within the range expressed by a formula $0 \leq w^{(l)}{}_t \leq 1$ and satisfies a formula $w^{(1)}{}_t + w^{(2)}{}_t + \ldots + w^{(L)}{}_t = 1$.

In the case where L particles $z^{(l)}{}_t$ through $z^{(L)}{}_t$ and weights $w^{(l)}{}_t$ through $w^{(L)}{}_t$ are obtained at time t, if an observation value $x_{t+1}$ is observed at time t+1, a sequence of the observation value $x_t = \{x_1, x_2, \ldots, x_t\}$ is observed by time t, and a posteriori distribution $p(z_{t+1}|X_t)$ of being in a state $z_{t+1}$ at time t+1 can be calculate by Formula (13) by using a transition probability $p(z_{t+1}|z^{(l)}{}_t)$ of being in the state $z^{(l)}{}_t$ at time t and transiting to the state $z_{t+1}$ at time t+1, and the weight $w^{(l)}{}_t$ of the particle $z^{(l)}{}_t$.

$$p(z_{t+1} \mid X_t) \cong \sum_{l=1}^{L} w_t^{(l)} p(z_{t+1} \mid z_t^{(l)}) \qquad (13)$$

The posteriori distribution $p(z_{t+1}|X_t)$ of Formula (13) is a mixed distribution with the weight $w^{(l)}{}_t$ as a mixture coefficient. In the particle filter, resampling to select the particle $z^{(l)}{}_t$ with a probability corresponding to the weight $w^{(l)}{}_t$ as a mixture coefficient is performed.

The particle filter is further explained with reference to FIG. 8.

In the particle filter, a sequence $x_{t-1} = \{x_1, x_2, \ldots, x_{t-1}\}$ of the observation value X is observed by time t−1, and a posteriori distribution $p(z_t|X_{t-1})$ of being in the state $z_t$ at time t is sample expressed by L particles $z^{(l)}{}_{t-1}$ through $z^{(L)}{}_{t-1}$ and the weight $z^{(l)}{}_{t-1}$ through $z^{(L)}{}_{t-1}$.

In this case, in FIG. 8, the number L of the particles $z^{(l)}{}_t$ is 5.

In the particle filter, in order to calculate a sample expression at next time t, a transition destination of L particles $z^{(l)}{}_{t-1}$ through $z^{(L)}{}_{t-1}$ at time t−1 which transit at next time t is calculated, i.e., L particles $z^{(l)}{}_t$ through $z^{(L)}{}_t$ at text time t are predicted (generated) based on a transition probability $p(z_t|z^{(l)}{}_{t-1})$ of the mixed distribution (posteriori distribution) $p(z_t|X_{t-1})$ of Formula (13).

In FIG. 8, circles represent particles. A numeral written in the circle that represents a particle shows an example of a value (in FIG. 8, a value of the state $z^{(i)}{}_t$ is a scalar value to simplify the drawing) of the state $z^{(l)}{}_t$ as a particle.

For example, while the numeral in the circle representing a state $z^{(5)}{}_{t-1}$ at time t−1 as a particle is 5.0 in FIG. 8, the numeral in the circle representing a state $z^{(5)}{}_t$ at time t as a particle, which is predicted based on a transition probability $p(z_t|z^{(5)}{}_{t-1})$ from the state $z^{(5)}{}_{t-1}$ at time t−1 as the particle, is 5.4.

After L particles $z^{(l)}{}_t$ through $z^{(L)}{}_t$ at next time t are predicted, an observation likelihood $p(x_t|z^{(l)}{}_t)$ of the observation value $x_t$ being observed in the particle $z^{(l)}{}_t$ is calculated in the particle filter by use of the observation value $x_t$ at time t.

Further in the particle filter, a weight $w^{(l)}{}_t$ of the particle $z^{(l)}{}_t$ is calculated in accordance with Formula (12) by use of the observation likelihood $p(x_t|z^{(l)}{}_1)$. In FIG. 8, the circle representing the particle $z^{(l)}{}_1$ is illustrated with a size corresponding to the value of the weight $w^{(l)}{}_t$.

Then, in the particle filter, the particle $z^{(l)}{}_t$ is resampled with a probability corresponding to the weight $w^{(l)}{}_t$.

In the particle filter, the resampled particle $z^{(l)}{}_t$ is used as a sample expression of a posteriori distribution $p(z_{t+1}|X_t)$ of a sequence $x_t = \{x_1, x_2, \ldots, x_t\}$ of the observation value X observed by time t being in a state $z_{t+1}$ at time t+1, together with the weight $w^{(l)}{}_t$, by which the same processing is repeated.

In the resampling, since the particle $z^{(l)}{}_t$ is sampled with a probability corresponding to the weight $w^{(l)}{}_t$, those particles $z^{(l)}{}_t$ which are not sampled at all because of small weight $w^{(l)}{}_1$ end up disappearing.

In the resampling, the particle $z^{(l)}{}_t$ with a large weight $w^{(l)}{}_t$ may be sampled a plurality of times. In that case, a particle with the value (state) identical to the sampled particle $z^{(l)}{}_t$ is reproduced for the number of times identical to the sampled number.

As described in the foregoing, a plurality of particles having the same value V as the particle $z^{(l)}{}_t$ may be generated in the resampling. In that case, values of each of a plurality of the particles become different values scattering around the same value V when particles at next time t are predicted (transition destinations are calculated) based on the transition probability $p(z_{t+1}|z^{(l)}{}_t)$ of Formula (13).

Here, examples of a resampling method for sampling the particle $z^{(l)}_t$ with a probability corresponding to the weight $w^{(l)}_t$ include a roulette method and a method called systematic sampling.

In the roulette method, the range from 0 to 1 is divided into L divisions, and each division is sequentially allocated to L weights $w^{(1)}_t, w^{(2)}_t, \ldots, w^{(L)}_t$. A width of the division allocated to the weight $w^{(l)}_t$ is a width proportional to the magnitude of the weight $w^{(l)}_t$.

In the roulette method, values within the range of 0 through 1 are sampled based on random numbers, and a particle corresponding to the weight $w^{(l)}_t$ having a division including the sampled value allocated thereto is reproduced. This processing is repeated until the number of sampling is equal to the total number L of the particles.

In the systematic sampling, as in the roulette method, the range from 0 through 1 is divided into L divisions with a width proportional to the size of the weight $w^{(l)}_t$, and each division is allocated to L weights $w^{(1)}_t, w^{(2)}_t, \ldots, w^{(L)}_t$.

In the systematic sampling, values within the range of 0 through 1 are sampled based on random numbers, and a particle corresponding to the weight $w^{(l)}_t$ having a division including the sampled value allocated thereto is reproduced.

Then, in the systematic sampling, among the values within the range of 0 through 1, a value obtained by adding a specified value to a value sampled immediately before is sampled, and a particle corresponding to the weight $w^{(l)}_t$ having a division including the sampled value allocated thereto is reproduced. These procedures are repeated until the number of sampling is equal to the total number L of the particles.

It is to be noted that if a value obtained by adding a specified value to the value sampled immediately before is more than 1, a value below the decimal point of that value is sampled.

While L random numbers are calculated in the roulette method, calculation of only one random number is used in the systematic sampling. Accordingly, a calculation cost of the random number in the systematic sampling is smaller as compared with the roulette method.

[Chapter 3 Concrete Implementation of Generation Model and Learning of Generation Model]

[Section 3.1 Implementation of Generation Model]

Figure 9:
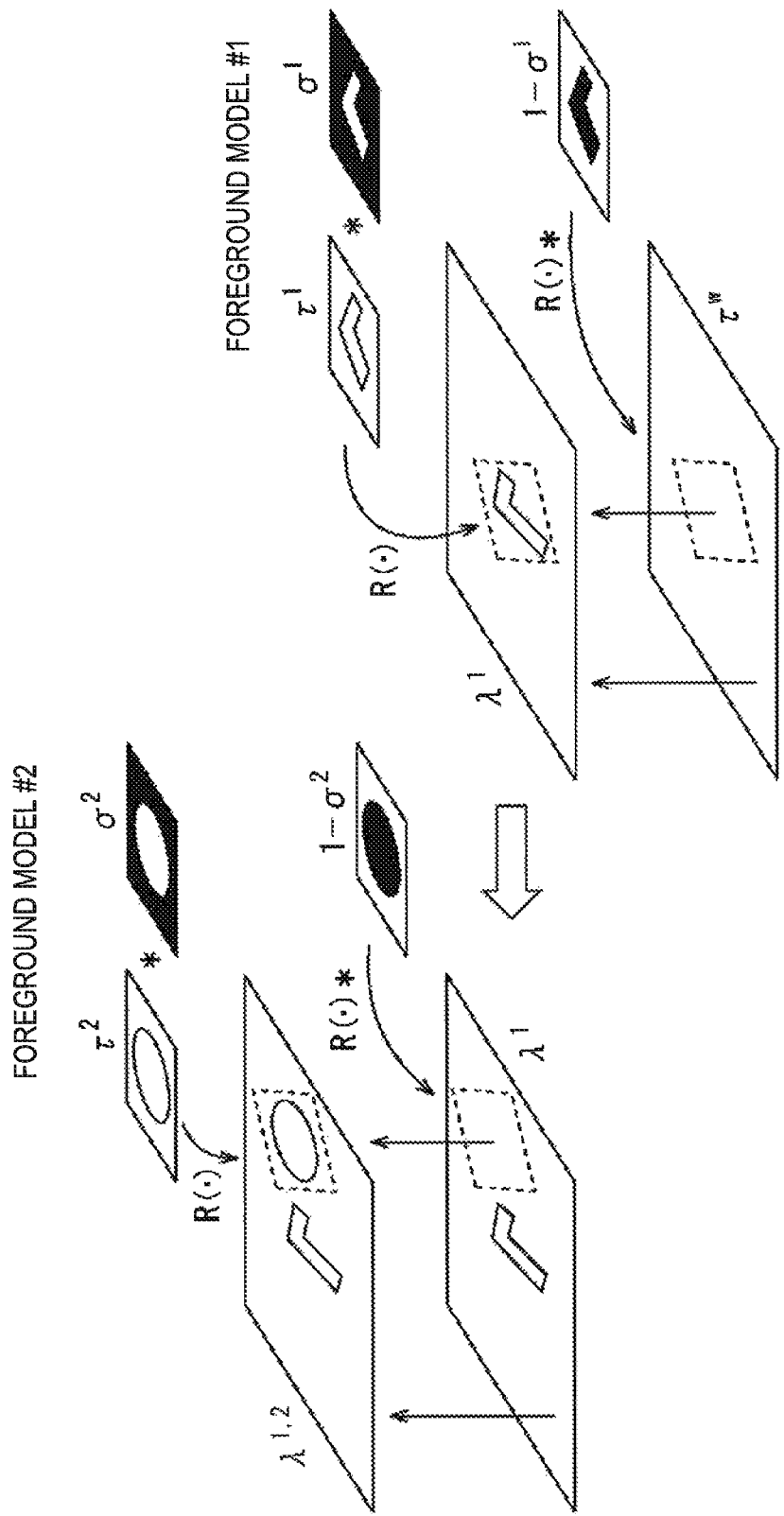
FIG. 9 is a view showing an example of implementation of the generation model θ that generates an observation image by use of the foreground model #i and the background model.

FIG. 9 is a view showing an example of implementation of the generation model θ that generates an observation image, that is, a function f( ) of Formula (5), by use of a foreground model #1 and a background model.

In the generation model, a foreground appearance model $\mu^i$ is superimposed on a background appearance model $\mu^w$ with a position $s^i_t$ and a posture $q^i_t$ that the state $z^i_t$ indicates.

In superposition of the foreground appearance model $\mu^i_t$ to the background appearance model $\mu^w$, (a texture expressed by) a background texture model $\tau^w$ as a background appearance model $\mu^w$ and a foreground texture model $\tau^i$ of a foreground appearance model $\mu^i$ are alpha blended by using a foreground shape model $\sigma^i$ of the foreground appearance model $\mu^i$ as an alpha value.

For example, suppose that only the first foreground #1 is present in the observation image $x_t$, an observation image $x_t = \lambda^1(z^1_t, \mu^1, \mu^w)$ which includes only one foreground #1 and which is observed in the generation model where model parameters (the foreground appearance model $\mu^i$, the background appearance model $\mu^w$, and the state $z^i$ of the foreground #i) are expressed by Formula (14).

$$\lambda^1(z^1_t, \mu^1, \mu^w) = \quad (14)$$

$$\lambda^1_t(r^{O1}_t) = \begin{cases} (1-\sigma^1(r^1))\tau^w(r^{O1}_t) + \sigma^1(r^1)\tau^1(r^1) & \text{if } r^1 \in \mu^1 \\ \tau^w(r^{O1}_t) & \text{else} \end{cases}$$

In this formula, $\sigma1(r^i)$ represents a pixel value at a point $r^i$ on the local coordinate system O' in a foreground shape model $\sigma^1$, while $\tau^1(r^i)$ represents a pixel value at the point $r^i$ on the local coordinate system O' of a foreground texture model $\tau^1$. Further, $\tau^w(r^{Oi}_t)$ represents a pixel value at a point $r^{Oi}_t$ on the world coordinate system O in the background texture model $\tau^w$.

Moreover, the point $r^{Oi}_t$ with a superscript O and a subscript time index t attached to the point $r^i$ on the local coordinate system O' represents a point (corresponding point) on the world coordinate system O corresponding to the point $r^i$ on the local coordinate system O' at time t.

For example, if a map function for mapping a point A on the local coordinate system O', which is rotated (inclined) around an origin of the world coordinate system O by an angle B, to a corresponding point on the world coordinate system O is expressed as R(A,B), a corresponding point $r^{Oi}_t$ on the world coordinate system O, which is a point corresponding to the point $r^i$ on the local coordinate system O', is expressed by Formula (15) by use of the map function R( ).

$$r^{Oi}_t = s^i_t + R(r^i - s^i_c, q^i_t) \quad (15)$$

According to Formula (14), when a point $r^1$ on the local coordinate system O' is a point on the foreground appearance model $\mu^1$ (an image as a foreground texture model $\tau^1$ or a foreground shape model $\sigma^1$) ($r^1 \in \mu^1$), a pixel value $\lambda^1_t(r^{O1}_t)$ of a point $r^{O1}_t$ corresponding to the point $r^1$ takes a value $(1-\sigma^1(r^1))\tau^w(r^{O1}_t)+\sigma^1(r^1)\tau^1(r^1)$ which is formed by alpha-blending a pixel value $\tau^w(r^{O1}_t)$ of a corresponding point $r^{O1}_t$ in the background texture model $\tau^w$ and a pixel value $\tau^1(r^1)$ at a point $r^1$ in the foreground texture model $\tau^1$ by using as an alpha value the pixel value $\sigma^1(r^1)$ at the point $r^1$ in the foreground shape model $\sigma^1$.

Further according to Formula (14), when the point $r^1$ on the local coordinate system O' is not a point on the foreground appearance model $\mu^1$, then the pixel value $\lambda^1_t(r^{O1}_t)$ of the point $\tau^{O1}_t$ corresponding to the point $r^1$ takes a pixel value $\tau^w(r^{O1}_t)$ of a corresponding point $r^{Oi}_t$ of the background texture model $\tau^w$.

When a plurality of foregrounds are present (when a plurality of foreground models are present) in an observation image $x_t$, the processing, which is similar to the processing performed in the case where only the first foreground #1 is present in the observation image $x_t$, is repeated for each of a plurality of the foregrounds, so that an observation image $x_t$ which includes a plurality of foregrounds and which is observed in the generation model can be calculated.

However, when a plurality of the foregrounds are present in the observation image $x_t$, the second and subsequent foregrounds are processed by using the observation image $x_t$ calculated regarding the foreground immediately before in place of the background texture model $\tau^w$ (background appearance model $\mu^w$).

Therefore, suppose that two foregrounds #1 and #2 are present in the observation image $x_t$, for example, first, the observation image $x_t = \lambda^1(z^1_t, \mu^1, \mu^w)$ which is observed in the generation mode and which includes only the first foreground #1 is calculated in accordance with Formula (14) as shown in FIG. 9.

Then an observation image $x_t=\lambda^{1,2}(z^1_t, z^2_t, \mu^1, \mu^2, \mu^w)$ including the first foreground #1 and the second foreground #2 are calculated by using, as shown in FIG. 9, the observation image $x_t=\lambda^1(z^1_t,\mu^1,\mu^w)$ calculated for the foreground #1 in Formula (14) in place of the background texture model $\tau^w$, in the similar way as in the observation image $x_t=\lambda^1(z^1_t, \mu^1, \mu^w)$.

That is, the observation image $x_t=\lambda^{1,2}(z^1_t,$ and $(z^2_t, \mu^2_t, \mu^1, \mu^2, \mu^w)$ including the first foreground #1 and the second foreground #2 is calculated in accordance with Formula (16).

$$\lambda^{1,2}(z_t^1, z_t^2, \mu^1, \mu^2, \mu^w) = \qquad (16)$$
$$\lambda_t^{1,2}(r_t^{O2}) = \begin{cases} (1-\sigma^2(r^2))\lambda_t^1(r_t^{O2}) + \sigma^2(r^2)\tau^2(r^2) & \text{if } r^2 \in \mu^2 \\ \lambda_t^1(r_t^{O2}) & \text{else} \end{cases}$$

In this case, the variable $\mu^{1,2}(r^{O2}_t)$ represents a pixel value of a corresponding point $r^{O2}_t$ on the world coordinate system O corresponding to a point $r^2$ on the local coordinate system O' (of the foreground #2) among pixel values of an image as the observation image $x_t=\lambda^{1,2}(z^1_t,(z^2_t,\lambda^1, \mu^2, \mu^w)$ including the first foreground #1 and the second foreground #2.

When three or more foregrounds, i.e., N foregrounds, are present, it is possible to calculate an observation image $x_t=\lambda^1 (z^1_t, z^2_t, \ldots, z^N_t, \mu^1, \mu^2, \ldots, \mu^N, \mu^w)$ including N foregrounds in the similar way.

[Section 3.2 Estimation of Foreground State when Only One Foreground is Present (E Step)]

A description is given of concrete implementation of the E step by use of the particle filter explained in Second 2.3 in the case where only one foreground is present.

It is to be noted that since the number of foregrounds is one, a description of index i indicating the i-th foreground is omitted herein.

In the E step of the EM algorithm, a posteriori distribution $p(Z|X,\theta^{old})$ of a latent variable Z is calculated by use of the model parameter $\theta=\theta^{old}$ updated in the previous M step, and by use of the posteriori distribution $p(Z|X,\theta^{old})$, and an expectation value $Q(\theta, \theta^{old})$ of the complete data log likelihood $\ln(p(X,Z|\theta))$ is calculated in accordance with Formula (7).

When the particle filter is applied to the E step, a posteriori distribution $p(z_{t+1}|X_t)$ of a latent variable $z_{t+1}$ at time t+1 when a sequence $x_t=\{x_1, x_2, \ldots, x_t\}$ of the observation value X is observed by time t can be calculated in accordance with Formula (13).

In this case, according to Formula (12), the weight $w^{(l)}_t$ in Formula (13) is proportional to an observation likelihood $p(x_t|z^{(l)}_t)$ of the observation value $x_t$ being observed in the state $z^{(l)}_t$ as a particle.

Therefore, in order to calculate the weight $w^{(l)}_t$, the observation likelihood $p(x_t|z^{(l)}_t)$ is calculated.

In the technology, assuming that the foreground state is equal to the state $z^{(l)}_t$ as a particle, an observation image $x_t=\lambda_t$ observed in the generation model is crated in accordance with the state $z^{(l)}_t$ as a particle.

In the technology, an error between an observation image $x_t=\lambda_t$ observed in the generation model and an image $\tilde{x}_t=\tilde{\lambda}_t$ which is actually observed (a distance between the images $\lambda_t$ and $\tilde{\lambda}_t$) is calculated as an observation likelihood $p(x_t|z^{(l)}_t)$.

Specifically, in the technology, the observation likelihood $p(x_t|z^{(l)}_t)$ is calculated in accordance with, for example, Formula (17).

$$p(x_t \mid z_t^{(l)}) = K \exp\left(-\frac{\sum_s \|\lambda_t(s) - \tilde{\lambda}_t(s)\|^2}{\sigma^2}\right) \qquad (17)$$

It is to be noted that $\lambda_t(s)$ represents a pixel value at a point s on the world coordinate system O of an image that is an observation image $x_t=\lambda_t$ at time t observed in the generation model $\theta$, while $\tilde{\lambda}_t(s)$ is a pixel value at a point s on the world coordinate system O of an actual image $\tilde{\lambda}_t$ actually observed at time t.

In Formula (17), K and $\sigma^2$ are specified constants which are determined in advance.

If a probability that the state $z^{(l)}_t$ at time t as a particle becomes a state $z_{t+1}$ at next time t+1, i.e., a transition probability $p(z_{t+1}|z^{(l)}_t)$ of the state $z^{(l)}_t$ as a particle, is in conformity to Gaussian distribution (normal distribution), a transition model of the state $z^{(l)}_t$ as a particle can be expressed by, for example, Formula (18).

$$z_{t+1} = \begin{bmatrix} s_{t+1} \\ \dot{s}_{t+1} \\ q_{t+1} \\ \dot{q}_{t+1} \end{bmatrix} = \begin{bmatrix} 1 & \Delta t & 0 & 0 \\ 0 & 1 & 0 & 0 \\ 0 & 0 & 1 & \Delta t \\ 0 & 0 & 0 & 1 \end{bmatrix} \begin{bmatrix} s_t \\ \dot{s}_t \\ q_t \\ \dot{q}_t \end{bmatrix} + \begin{bmatrix} N(0, \Sigma_s) \\ N(0, \Sigma_{\dot{s}}) \\ N(0, \Sigma_q) \\ N(0, \Sigma_{\dot{q}}) \end{bmatrix} \qquad (18)$$

In this case, $\Delta t$ represents an interval of time for calculating the state $z_t$, and $\Delta t=1$ in Formula (18). Moreover, N(A,B) is a Gaussian distribution, where A represents a mean vector (average value) and B represents a variance covariance matrix (variance).

In Formula (18), Gaussian distributions $N(0,\Sigma_s)$, $N(0,\Sigma_{\dot{s}})$, $N(0,\Sigma_q)$, and $N(0,\Sigma_{\dot{q}})$ are Gaussian distributions with a mean vector of 0. Variance covariance matrixes $\Sigma_s$, $\Sigma_{\dot{s}}$, $\Sigma_q$, and $\Sigma_{\dot{q}}$ are determined in advance.

According to the transition model of Formula (18), on the assumption that the state as a particle has a component, which determinately transits in accordance with the position $s_t$ and the posture $q_t$ as well as in accordance with their differential values (velocity) $\dot{s}_t$ and $\dot{q}_t$ at time t that is one time before, and that the state transits, while stochastically fluctuating, in accordance with the Gaussian distribution of a specified variance covariance matrix with a mean vector being 0, the state $z_{t+1}$ at t+1 is calculated (predicted) (a transition destination is calculated).

When it can be assumed as a prior knowledge that a foreground continuously moves on the background, i.e., when it can be assumed that a foreground state continuously changes in the environment, the transition model of Formula (18) effectively functions in which the state $z_{t+1}$ at next time is predicted based on information on the previous time (state $z_t$), while local search is performed at random based on noise of the Gaussian distribution.

As a result, it becomes possible to omit calculation of state estimation regarding the states having low possibility of becoming a foreground in the process of particle resampling, so that scalability can be enhanced as compared with a method in which the background as an environment is, for example, divided into a grid pattern and whether a foreground is present at a grid point is estimated in every grid point.

[Section 3.3 Estimation of Foreground State when a Plurality of Foregrounds are Present (E Step)]

A description is given of concrete implementation of the E step by use of the particle filter explained in Second 2.3 in the case where a plurality of foregrounds are present.

When a plurality of foregrounds are present, a state $z^i_t$ of the foreground #i exists for every foreground #i. The 1-th particle of the state $z^i_t$ of the foreground #i is expressed as $z^{i(l)}_t$. The weight of the particle $z^{i(l)}_t$ is expressed as $w^{i(l)}_t$.

In the technology, an observation image $x_t$ ($=\lambda_t$) observed in the generation model is generated as described in Formulas (14) through (16).

In order to calculate an observation likelihood $p(x_t|z^{i(1)}_t)$ for use in calculating Formula (12) which calculates a particle weight $w^{i(1)}_t$ in the particle filter, an observation image $x_t=\lambda_t$ observed in the generation model is calculated by using the state $z^{i(1)}_t$ as a particle whose weight $w^{i(1)}_t$ is to be calculated for a foreground #i of interest and by using a distribution of foreground state particles and a weight of each of these particles for foregrounds other than the foreground #i of interest.

However, if the observation image $x_t=\lambda_t$ observed in the generation model is calculated by using the particle $z^{i(1)}_t$ of the state $z^i_t$ of the foreground #i of interest, as well as the distribution of foreground state particles other than the foreground #i of interest and the weight of these respective particles, a large calculation cost is incurred.

Accordingly, in the present embodiment, it is assumed that among a plurality of foregrounds, only the foreground #i of interest is independently present on the background, i.e., without consideration to foregrounds other than the foreground #i of interest, so that the speed of calculation is increased at the sacrifice of strictness within a range that practical problems are not imposed thereby.

If it is assumed that only the foreground #i of interest is present on the background, an observation likelihood $p(x^i_t|z^{i(1)}_t)$ of the foreground #i of interest being in the state $z^{i(1)}_t$ as a particle may be calculated in accordance with Formula (19).

$$p(x^i_t | z^{i(l)}_t) = K \exp\left(-\frac{\sum_s \|\lambda^i_t(s) - \lambda^{\sim}_t(s)\|^2}{\sigma^2}\right) \quad (19)$$

It is to be noted that $\lambda^i_t(s)$ represents a pixel value at a point s on the world coordinate system O in an image that is an observation image $x_t=\lambda^i_t$ at time t observed in the generation model $\theta$ when it is assumed that only the foreground #i of interest is present on the background.

In Formula (19), $\lambda^{\sim}_t(s)$ represents, as in the case of Formula (17), a pixel value at a point s on the world coordinate system O in an image $\lambda^{\sim}_t$ actually observed at time t.

Further in Formula (19), K and $\sigma^2$ are specified constants which are determined in advance as in the case of Formula (17).

An observation image $x=\lambda^i_t=\lambda(zit, \mu^i, \mu^w)$ at time t observed in the generation model $\theta$ when it is assumed that only the foreground #i of interest is present on the background may be calculated in accordance with Formula (20).

$$\lambda^i(z^i_t, \mu^i, \mu^w) = \lambda^i_t(r^{Oi}) = \begin{cases} (1-\sigma^i(r^i))\tau^w(r^{Oi}) + \sigma^i(r^i)\tau^i(r^i) & \text{if } r^i \in \mu^i \\ \tau^w(r^{Oi}) & \text{else} \end{cases} \quad (20)$$

In this formula, $\sigma^i(r^i)$ represents a pixel value at a point $r^i$ on the local coordinate system O' in the foreground shape model $\sigma^i$, while $\tau^i(r^i)$ represents a pixel value at the point $r^i$ on the local coordinate system O' in the foreground texture model $\tau^i$. Further, $\tau^w(r^{Oi}_t)$ represents a pixel value at a point $r^{Oi}_t$ on the world coordinate system O in the background texture model $\tau^w$.

Moreover, the point $r^{Oi}_t$ with a superscript O attached to the point $r^i$ on the local coordinate system O' represents a point (corresponding point) on the world coordinate system O which corresponds to the point $r^i$ on the local coordinate system O' at time t, and is calculated in accordance with Formula (15).

[Section 3.4 Update of Foreground Texture Model (M Step)]

A description is given of concrete implementation of update of the foreground texture model $\tau^i$ performed in the E step by use of the particle filter explained in the section 2.3.

In the M step of the EM algorithm, the model parameter $\theta$ is updated from the current model parameter $\theta^{old}$ to the new model parameter $\theta^{new}$ so as to maximize an expectation value $Q(\theta,\theta^{old})$ of the complete data log likelihood $\ln(p(X,Z|\theta))$ calculated by using the posteriori distribution $p(Z|X,\theta^{old})$ of the latent variable Z in the E step.

When the particle filter is applied to this M step, the model parameter $\theta$ is updated by use of the particle weight $w^{i(1)}_t$ calculated in the E step.

Figure 10:
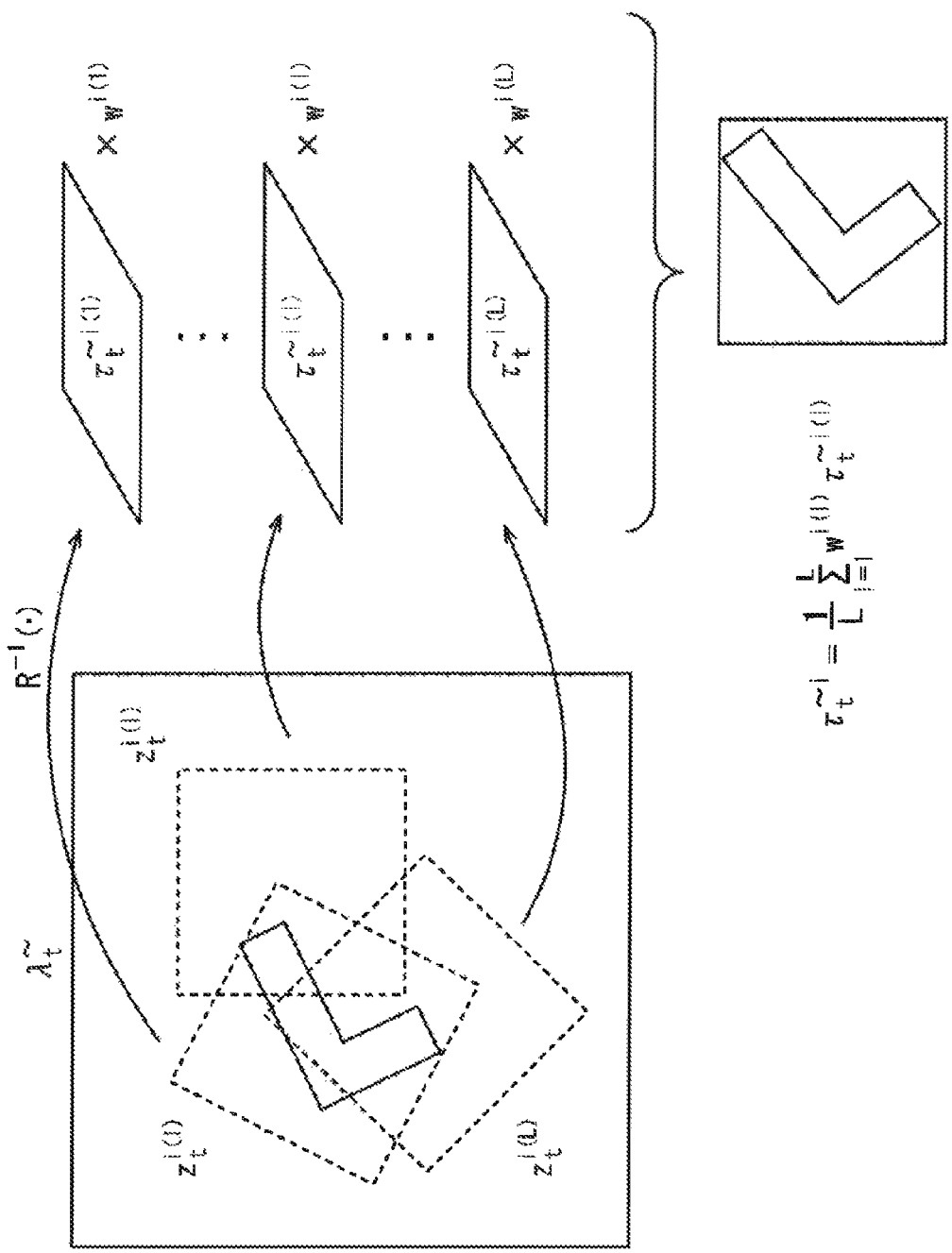
FIG. 10 is a view explaining update of a foreground texture model $\tau^i$ by use of a weight $w^{i(1)}_t$ of a particle.

FIG. 10 is a view explaining update of the foreground texture model $\tau^i$ by use of the particle weight $w^{i(1)}_t$.

In update of the foreground texture model $\tau^i$, in order to update data $\tau^{\sim i}_t$ of one time t at time t, the state of the foreground #i is assumed to be the state $z^{i(1)}_t$ as a particle, and an image in a region estimated to be the foreground #i, which is in the state $z^{i(1)}_t$, is cut from an image (observation value) $\lambda^{\sim}_t$ actually observed at time t and is projected on the local coordinate system O' of the foreground #i as shown in FIG. 10.

Here, the image cut from the image (hereinafter also referred to as the actual image) $\lambda^{\sim}_t$ actually observed at time t and projected on the local coordinate system O' of the foreground #i is also referred to as a cut image $\tau^{\sim i(l)}_t$.

The cut image $\tau^{\sim i(l)}_t$ has the same size as the image of the foreground texture model $\tau^i$ (and the foreground shape model $\sigma^i$), and is expressed by Formula (21).

$$\tau^{\sim i(l)}_t(s'^{i(1)}_t) = \lambda^{\sim}_t(s), s'^{i(1)}_t \epsilon \mu^i \quad (21)$$

Herein, $\tau^{\sim i(l)}_t(s'^{i(1)}_t)$ represents a pixel value at a point $s'^{i(1)}_t$ on the local coordinate system O' in the cut image $\tau^{\sim i(l)}_t$, and $\lambda^{\sim}_t(s)$ represents a pixel value at a point s on the world coordinate system O in the actual image $\lambda^{\sim}_t$.

The point $s'^{i(1)}_t$ with a dash ('), a foreground index i, a particle index (l), and a time index t attached to the point s on the world coordinate system O represents a point (corresponding points) on the local coordinate system O' in the foreground #i which is in the state expressed by the particle $z^{i(1)}_t$, the corresponding point corresponding to the point s on the world coordinate system O.

The corresponding point $s'^{i(1)}_t$ on the local coordinate system O' in the foreground #i, which corresponds to the point s on the world coordinate system O, is expressed by Formula (22) by using map function R(A, B) explained in Formula (15).

$$s'^i_t = R(s-s^i_t, -q^i_t) + s^i_c \quad (22)$$

It is to be noted that the particle index (l) is omitted in Formula (22).

According to Formula (21), when the corresponding point $s'^{i(1)}_t$ on the local coordinate system O' corresponding to the point s on the world coordinate system O is a point on the foreground appearance model $\mu^i$ (on an image as the foreground texture model $\tau^i$ or the foreground shape model $\sigma^i$) at time t ($s'^{i(1)}_t \in \mu^i$), the pixel value $\tilde{\lambda}_t(s)$ at the point s in the actual image $\tilde{\lambda}_t$ is adopted as a pixel value $\tau^{\sim i(1)}_t(s'^{i(1)}_t)$ at the corresponding point $s'^{i(1)}_t$ of the cut image $\tau^{\sim i(1)}_t$.

In update of the foreground texture model $\tau^i$, cut images $\tau^{\sim i(1)}_t, \tau^{\sim i(2)}_t, \ldots, \tau^{\sim i(L)}_t$ are calculated for L particles $z^{i(1)}_t, z^{i(2)}_t, z^{i(L)}_t$ of the foreground #i. Then, in accordance with Formula (23), by using the weights $w^{i(1)}_t$ through $w^{i(1)}_t$ of the particles $z^{i(1)}_t$ through $z^{i(L)}_t$, a weighted average value of the L cut images $\tau^{\sim i(1)}_t$ through $\tau^{\sim i(L)}_t$ is calculated as update data $\tau^{\sim i}_t$ of one time at time t for the foreground texture model $\tau^i$.

$$\tau^{\sim i}_t = \sum_{l=1}^{L} w^{j(l)}_t \tau^{\sim i(l)}_t \tag{23}$$

In update of the foreground texture model $\tau^i$, an average value (equalization of data of predetermined time) of update data $\tau^{\sim i}_t, \tau^{\sim i}_{t-1}, \ldots, \tau^{\sim i}_{t-TGF+1}$ of past TFG-1 time from current time t is calculated in accordance with Formula (24) as a new foreground texture model $\tau^{i,new}$ serving as the new model parameter $\theta^{new}$.

$$\tau^{i,new} = \frac{1}{T_{FG}} \sum_{t=t-T_{FG}+1}^{t} \tau^{\sim i}_t \tag{24}$$

Herein, a weighted average value of the cut image $\tau^{\sim i(1)}_t$ through $\tau^{\sim i(L)}_t$ obtained for each of L particles $z^{i(1)}_t$ through $z^{i(L)}_t$ is calculated as update data $\tau^{\sim i}_t$ of one time at time t. However, it is also possible to calculate, for example, a maximum likelihood state $z^i_t$ from L particles $z^{i(1)}_t$ through $z^{i(L)}_t$ and to use cut images $\tau^{\sim i}_t$ obtained for the maximum likelihood state $z^i_t$ as update data $\tau^{\sim i}_t$ of one time at time t.

Examples of the maximum likelihood state $z^i_t$ that may be adopted include a weighted average value of L particles $z^{i(1)}_t$ through $z^{i(L)}_t$, $(w^{i(1)}_t z^{i(1)}_t + w^{i(2)}_t z^{i(2)}_t + \ldots + w^{i(L)}_t z^{i(L)}_t)/(w^{i(1)}_t + w^{i(2)}_t + \ldots + w^{i(L)}_t + \ldots + w^{i(L)}_t = w^{i(1)}_t + w^{i(2)}_t z^{i(2)}_t + \ldots + w^{i(L)}_t z^{i(L)}_t$.

[Section 3.5 Update of Background Texture Model (M Step)]

A description is given of concrete implementation of update of the background texture model $\tau^w$ performed in the E step by use of the particle filter explained in the section 2.3.

Figure 11:
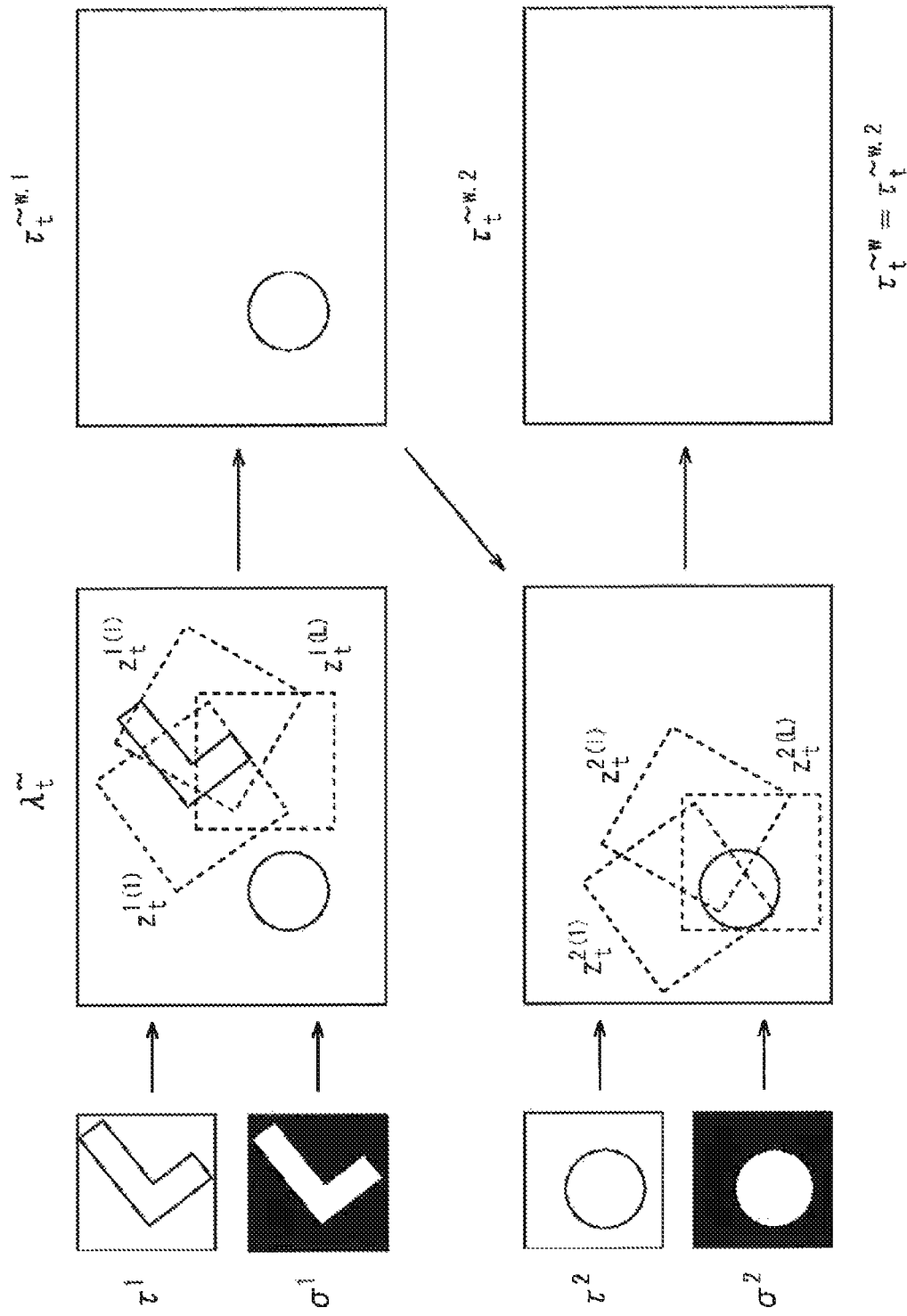
FIG. 11 is a view explaining update of a background texture model $\tau^w$.

FIG. 11 is a view explaining an update of background texture model $\tau^w$.

In update processing of the background texture model $\tau^w$, update data $\tau^{\sim w}_t$ of one time at time t is calculated by using states $z^{1(1)}_t$ through $z^{1(L)}_t, z^{2(1)}_t$ through $z^{2(L)}_t, \ldots, z^{N(1)}_t$ through $z^{N(L)}_t$ as all the particles in all the foreground model #1 through #N.

Specifically, in update processing of the background texture model $\tau^w$, replacing the pixel value of a region of an actual image $\tilde{\lambda}_t$ at time t, which is estimated to include a foreground, with a current background texture model is $\tau^{w,old}$ performed for the state $z^{i(1)}_t$ of each particle in each foreground model #i as shown in FIG. 11, and an image obtained as a result is used as update data $\tau^{\sim w}_t$ of one time at time t.

More specifically, first, the foreground #1 is set as a foreground of interest for example. On the assumption that the state of the foreground #1 of interest is the state $z^{1(1)}_t$ as a particle, an image (hereinafter also referred to as a foreground-removed image) $\tau^{\sim w,1(1)}$ is calculated by removing an image component of the foreground model #i (foreground appearance model $\mu^i$) from the region estimated to be the foreground #i in the state $z^{i(1)}_t$ out of the actual image $\tilde{\lambda}_t$ at time t, and by adding an image component of the current background model (the current background texture model $\tau^{w,old}$) thereto.

The foreground-removed image $\tau^{\sim w,1(1)}$ obtained for the state $z^{1(1)}_t$ as a particle of the foreground #1 is expressed by Formula (25).

$$\tau^{\sim w,1(1)}_t(s) = \begin{cases} \tilde{\lambda}_t(s) - \sigma^1(s'^{1(1)}_t)\tau^1(s'^{1(1)}_t) + (1-\sigma^1(s'^{1(1)}_t))\tau^{w,old}(s) & \text{if } s'^{1(1)}_t \in \mu^1 \\ \tilde{\lambda}_t(s) & \text{else} \end{cases} \tag{25}$$

According to Formula (25), if a corresponding point $s'^{1(1)}_t$ on the local coordinate system O' in the foreground #1, which is in the state represented as the particle $z^{1(1)}_t$, corresponding to the point s on the world coordinate system O is a point on the foreground appearance model $\mu^1$ (image as the foreground texture model $\tau^1$ or the foreground shape model $\sigma^1$) ($s'^{1(1)}_t \in \mu^1$), adopted as a pixel value $\tau^{\sim w1}(s)$ at the point s on a foreground-removed image $\tau^{\sim w,1(1)}$ is a value $\tilde{\lambda}_t(s) - \sigma^1(s'^{1(1)}_t)\tau^1(s'^{1(1)}_t) + (1-\sigma^1(s'^{1(1)}_t))\tau^{w,old}(s)$ which is obtained by subtracting a pixel value $\tau^1(s'^{1(1)}_t)$ at a corresponding point $s'^{1(1)}_t$ on the foreground texture model $\tau^1$ multiplied by $\sigma^1(s'^{1(1)}_t)$ from a pixel value $\tilde{\lambda}_t(s)$ at the point s on the actual image (~t, and adding thereto a value obtained by multiplying a pixel value (w,old(s) at a point s on the current background texture model (w,old by (1-(1(s'1(1)t)).

Further, according to Formula (25), if the corresponding point $s'^{1(1)}_t$ on the local coordinate system O' in the foreground #1, which is in the state represented by the particle $z^{1(1)}_t$, corresponding to the point s on the world coordinate system O is not a point on the foreground appearance model $\mu^1$, a pixel value $\tilde{\lambda}_t(s)$ at the point s of the actual image $\tilde{\lambda}_t$ is adopted.

As a result, as a foreground-removed image $\tau^{\sim w,1(1)}$, an image showing a background which was hidden behind the foreground #1 is obtained by removing the foreground #1, which is in the state $z^{1(1)}_t$ as a particle, from the actual image $\tilde{\lambda}_t$.

In the update processing of the background texture model $\tau^w$, foreground removed images $\tau^{\sim w,1(1)}$ through $\tau^{\sim w,1(L)}$ are calculated for each of L particles $z^{1(1)}_t$ through $z^{1(L)}_t$ in the foreground #1.

By use of the weights $w^{(1)}_t$ through $w^{1(L)}_t$ of each of particles $z^{1(1)}_t$ through $z^{1(L)}_t$ in the foreground #1, a weighted average value $\tau^{\sim w,1}$ of the foreground-removed images $\tau^{\sim w,1(1)}$ through $\tau^{\sim w,1(L)}$ is calculated as a final image (hereinafter also referred to as a final removal image relating to foreground #1) with the foreground #1 removed from the actual image $\tilde{\lambda}_t$.

The final removal image $\tau^{\sim w,1}$ relating to foreground #1 is expressed by Formula (26).

$$\tau^{\sim w,1}_t = \sum_{l=1}^{L} w^{1(l)}_t \tau^{\sim w,t(l)}_t \tag{26}$$

In update processing of the background texture model $\tau^w$, similar processing is performed with the foregrounds #2 through #N being treated one by one as a foreground of interest.

However, in the case of the foreground #2 and subsequent foregrounds #i, the actual image $\tilde{\lambda}_t$ is replaced with a final removal image $\tau^{\sim w,i-1}$ relating to foreground #(i-1) with the foreground #(i-1), which was a foreground of interest immediately before, being removed.

Therefore, the foreground-removed image $z^{\sim w,i(1)}$ which can be calculated for the state z i(1)$_t$ as a particle in the foreground #i may be calculated in accordance with Formula (27) where the actual image $\tilde{\lambda}_t$ of Formula (25) is replaced with the final removal image $\tau^{\sim w,i-1}$ relating to the foreground #(i-1).

$$\tau_t^{\sim w,i(l)}(s) = \qquad (27)$$
$$\begin{cases} \tau_t^{\sim w,i-1}(s) - \sigma^i(s_t^{\prime i(l)})\tau^i(s_t^{\prime i(l)}) + (1-\sigma^i(s_t^{\prime i(l)}))\tau^{w,old}(s) & \text{if } s_t^{\prime i(l)} \in \mu^i \\ \tau_t^{\sim w,i-1}(s) & \text{else} \end{cases}$$

The final removal image $\tau^{\sim w,i}$ relating to the foreground #i may be calculated by use of the foreground-removed image $\tau^{\sim w,i(1)}$ in accordance with Formula (28) as in Formula (26).

$$\tau_t^{\sim w,i} = \sum_{l=1}^{L} w_t^{j(l)} \tau_t^{\sim w,i(l)} \qquad (28)$$

The final removal image $\tau^{\sim w,N}$ relating to foreground #N $\tau^{\sim w,N}$ an image obtained by removing all the N foregrounds #1 through #N from the actual image $\tilde{\lambda}_t$ and filling the regions where the foregrounds #1 through #N were present with regions corresponding to the current background texture model $\tau^{w,old}$. As shown in Formula (29), the image $\tau^{\sim w,N}$ is used as update data $\tau^{\sim w}_t$ of one time at time t for the background texture model $\tau^w$.

$$\tau_t^{\sim w} = \tau_t^{\sim w,N} \qquad (29)$$

FIG. 11 shows the process of calculating the update data $\tau^{\sim w}_t$ of one time at time t for the background texture model $\tau^w$ in the case where the number N of foregrounds is 2.

Then, in update of the background texture model $\tau^w$, an average value (equalization of data during predetermined time) of update data $\tau^{\sim w}_t, w^{\sim w}_{t-1}, \ldots, \tau^{\sim w}_{t-TBG+1}$ of past TBG−1 time from current time t is calculated in accordance with Formula (30) as a new background texture model $\tau^{w,new}$ serving as the new model parameter $\theta^{new}$.

$$\tau^{w,new} = \frac{1}{T_{BG}} \sum_{t=t-T_{BG}+1}^{t} \tau_t^{\sim w} \qquad (30)$$

In update of the background texture model $\tau^w$, for the foreground #2 and subsequent foregrounds #i, exclusive control is performed for preventing one foreground from being modeled (acquired) by a plurality of foreground models at the same time by calculating a foreground-removed image $\tau^{\sim w,i(1)}$ by use of a final removal image $\tau^{\sim w,i-1}$ relating to the foreground #(i-1), which was a foreground of interest immediately before, in place of the actual image $\tilde{\lambda}_t$.

[Section 3.6 Update of Foreground Shape Model (M Step)]

In update of the foreground shape model $\sigma^i$ which region belongs to foreground #i and which region does not belong to foreground #i are evaluated, for example, in a pixel unit for an image as an updated foreground texture model $\tau^i$ (new foreground texture model $\tau^{i,new}$).

Specifically, in update of the foreground shape model $\sigma^i$, whether or not each pixel in the image as an updated foreground texture model $\tau^i$ is a pixel of the foreground #i is evaluated.

In evaluation of whether or not a pixel in the image as a foreground texture model $\tau^i$ is a pixel of the foreground #i, a likelihood (hereinafter also referred to as a foreground likelihood) of the pixel being a pixel of the foreground #i is calculated for each pixel in the image as a foreground texture model $\tau^i$.

As the foreground likelihood, for example, an observation likelihood of an image as a foreground texture model $\tau^i$ being observed as update data $\tau^{\sim i}_t$ of one time at time t relating to the foreground texture model $\tau^i$ of Formula (23) as an expectation value of the foreground #i may be adopted.

In this case, the observation likelihood as a foreground likelihood may be calculated in accordance with, for example, Formula (31).

$$L(FG \mid \tau^i(r^i)) = K \exp\left(-\frac{\|\tau^i(r^i) - \tau_t^{\sim i}(r^i)\|^2}{\sigma^2}\right), r^i \in \mu^i \qquad (31)$$

In this case, $\tau^i(r^i)$ represents a pixel value at a point $r^i$ on the local coordinate system O' in the foreground texture model $\tau^i$, while $\tau^{\sim i}_t(r^i)$ represents a pixel value at point $r^i$ on the local coordinate system O' in an image as update data $\tau^{\sim i}_t$ of one time at time t relating to the foreground texture model $\tau^i$.

Further, $L(FG|\tau^i(r^i))$ represents a likelihood (foreground likelihood) of the pixel value $\tau^i(r^i)$ at the point $r^i$ in the foreground texture model $\tau^i$ being a pixel of the foreground #i.

In Formula (31), K and $\sigma^2$ are specified constants which are determined in advance.

In evaluation of whether a pixel in the image as a foreground texture model $\tau^i$ is a pixel of the foreground #i, in addition to the aforementioned foreground likelihood $L(FG|\tau^i(r^i))$, a likelihood (hereinafter also referred to as a background likelihood) of each pixel in the image as a foreground texture model $\tau^i$ being a pixel of the background is also calculated.

As the background likelihood, it is possible to adopt, for example, an observation likelihood of the image, as a foreground texture model $\tau^i$, being observed as a final removal image $\tau^{\sim w,i}_t$ relating to the foreground #i of Formula (28) as an expectation value of the background.

In this case, the observation likelihood as a background likelihood may be calculated in accordance with, for example, Formula (32).

$$L(BG \mid \tau^i(r^i)) = K \exp\left(-\frac{\|\tau^i(r^i) - \tau_t^{\sim i}(r^i)\|^2}{\sigma^2}\right), r^i \in \mu^i \qquad (32)$$

Herein, $\tau^{\sim' w,i}_t$ with a dash (') attached to the final removal image $\tau^{\sim w,i}_t$ relating to the foreground #i represents an (expectation value of) a projection image obtained by cutting a region of the foreground appearance model $\mu^i$ from the final removal image $\tau^{\sim w,i}_t$ relating to the foreground #i and projecting the cut region on the local coordinate system O' in the foreground #i.

The variable $\tau^{\sim' w,i}_t(r^i)$ represents a pixel value at a point $r^i$ on the local coordinate system O' in the projection image $\tau^{\sim' w,i}_t$.

Further, $L(BG|\tau^i(r^i))$ represents a likelihood (background likelihood) of the pixel value $\tau^i(r^i)$ at the point $r^i$ in the foreground texture model $\tau^i$ being a pixel of the background.

In Formula (32), K and $\sigma^2$ are specified constants which are determined in advance.

The projection image $\tau^{-'w,i}_t$ can be calculated by using the foreground removal image $\tau^{-w,i(1)}_t$ of Formula (27) (Formula (25)) for use in calculating the final removal image $\tau^{-w,i}_t$ relating to the foreground #i of Formula (28) in accordance with Formula (33) and Formula (34).

$$\tau^{-'w,i(1)}_t(s'^{i(1)}_t) = \tau^{-w,i(1)}_t(s), s'^{i(1)}_t \in \mu^i \quad (33)$$

$$\tau^{-'w,i}_t = \sum_{l=1}^{L} w^{i(l)}_t \tau^{-'w,i(l)}_t \quad (34)$$

Herein, $\tau^{-'w,i(1)}_t$ represents a projection image on the assumption that the foreground #i is in the state as a particle, while $z^{i(1)}_t$ as a particle, while $\tau^{-'w,i(1)}_t(s^{i(1)}_t)$ represents a pixel value at a corresponding point $s^{i(1)}_t$ on the world coordinate system O corresponding to the projection image $\tau^{-'w,i(1)}_t$.

According to Formula (33), if the corresponding point $s^{i(1)}_t$ on the local coordinate system O' in the foreground #i corresponding to a point s on the world coordinate system O is a point on the foreground appearance model $\mu^i$, a pixel value $\tau^{-w,i(1)}_t(s)$ at the point s in the foreground-removed image $\tau^{-w,i(1)}_t$ is adopted as a pixel value $\tau^{-'w,i}_t(s^{i(1)}_t)$ at the corresponding point $s^{i(1)}_t$ in the projection image $\tau^{-'w,i(1)}_t$.

According to Formula (34), a weighted average value of the projection image $\tau^{-'w,i(1)}_t$ in which the foreground #i is in the state of each particle $z^{i(1)}_t$, is calculated as a projection image $\tau^{-'w,i}_t$ for use in calculation of Formula (32).

In update of the foreground shape model $\sigma^i$, a probability that each pixel in the image as a foreground texture model $\tau^i$ is a pixel of the foreground #i is calculated in accordance with Formula (35) by using the foreground likelihood $L(BG|\tau^i(r^i))$ of Formula (31) and the background likelihood $L(FG|\tau^i(r^i))$ of Formula (32).

$$p(FG|\tau^i(r^i)) = \frac{L(FG|\tau^i(r^i))}{L(FG|\tau^i(r^i)) + L(BG|\tau^i(r^i))}, r^i \in \mu^i \quad (35)$$

Herein, $p(FG|\tau^i(r^i))$ represents a probability that a point (pixel) $r^i$ on the local coordinate system O' in the foreground #i relating to the foreground shape model $\sigma^i$ is a pixel of the foreground #i. In update of the foreground shape model $\sigma^i$ the pixel value $\sigma^i(r^i)$ of the point $r^i$ is updated to the probability $p(FG|\tau^i(r^i))$.

[Chapter 4 Manipulation Model for Agent to Perform Object Manipulation]

[Section 4.1 Environment Setting for Object Manipulation]

Figure 12:
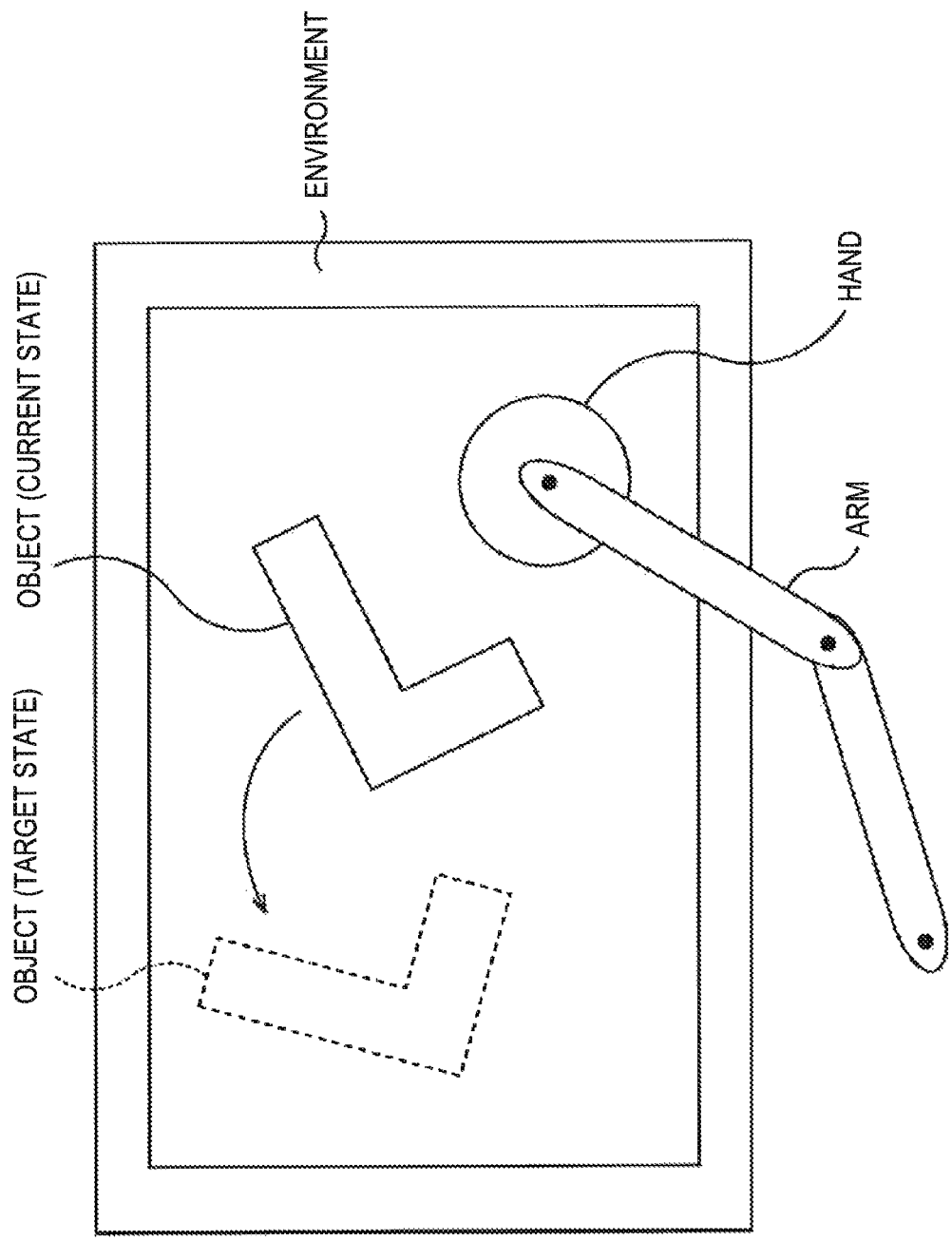
FIG. 12 is a view explaining an outline of environment setting for object manipulation in which an agent manipulates a manipulation target object with a hand (manipulator)

FIG. 12 is a view Explaining an outline of Environment Setting for Object manipulation in which an object that is a manipulation target object is manipulated by an agent with a hand (manipulator) that is a control target object.

The hand that is a control target object and an object that is a manipulation target object are placed on a plane. The agent observes an actual image in which a foreground corresponding to the hand and a foreground corresponding to the object are present on a background corresponding to the plane (environment) on which the hand and the object were placed.

In FIG. 12, the hand that is a control target object is attached to the top end of an arm, so that the agent can move the hand to an arbitrary position by moving the arm in the environment.

Note that in the present embodiment the hand has a circular shape and therefore a posture of the hand is unchanged (is not considered) to simplify explanation.

The object that is a manipulation target object is an object having a polygonal shape. In FIG. 12, an L-shaped object is employed.

When (the object that is) the manipulation target object receives external force, the object moves or performs a rotational motion in accordance with the external force in the environment, as a result of which a position and a posture of the manipulation target object is changed.

Therefore, when the agent moves the arm, so that the hand on the top end of the arm is moved and is brought into contact with the manipulation target object, the manipulation target object performs a motion with the external force applied from the hand.

In the present embodiment, a position and a posture to be targeted are given as a target state for the manipulation target object. The agent moves the hand to perform object manipulation that is to change the position and posture, as the state of the manipulation target object, from a state of the moment (current state) to a target state.

It is assumed in the present embodiment that a sufficiently large friction exists between the manipulation target object and the environment (plane) where the manipulation target object is placed to simplify explanation and that when the hand which is in contact with the manipulation target object is put in the state not in contact with the manipulation target object (and in the state where the hand is in contact with the manipulation target object but three is not applied to the manipulation target object from the hand), the manipulation target object promptly stops its motion.

Hereinafter, a superscript index i is attached to variables which represent information with respect to a foreground regardless of whether the variables relate to the hand or the manipulation target object. A superscript index m (manipulator) is attached to variables which represent information with respect to a foreground of the hand (manipulator) (foreground corresponding to the hand), while a superscript index o (object) is attached to variables which represent information with respect to the foreground of the manipulation target object.

In the manipulation model of the technology, motions of foregrounds of the hand and the manipulation target object are expressed with an object reference coordinate system which is a coordinate system with the manipulation target object as a reference.

FIG. 13 is a view explaining the object reference coordinate system.

FIG. 13A shows a world coordinate system O and a local coordinate system O' of the manipulation target object, while FIG. 13B shows a centroid origin coordinate system O" as an object reference coordinate system.

It is to be noted that a cross illustrated inside a circle indicates the centroid (of (a foreground of) an object) in FIG. 13.

The centroid origin coordinate system O" is a coordinate system parallelly displaced from the local coordinate system O', and an origin thereof is positioned at the centroid of (the foreground of) the manipulation target object.

Therefore, the centroid origin coordinate system O" is a two-dimensional coordinate system in which an axis extending from the upper side to the lower side in the foreground appearance model $\mu^o$ of the manipulation target object is defined as an x" axis, another axis extending from the left side to the right side is defined as a y" axis, and the centroid of the foreground appearance model $\mu^o$ is defined as an origin.

The object reference coordinate system is a coordinate system on the basis of (a foreground #o) of the manipulation target object, i.e., a coordinate system in which the state (position and posture) of (the foreground #o of) the manipulation target object is invariable regardless of the state of (the foreground #o of) the manipulation target object on the world coordinate system O.

Therefore, while both the local coordinate system O' and the centroid origin coordinate system O" can be employed as an object reference coordinate system of the manipulation target object (foreground #o), the centroid origin coordinate system O" is employed in the present embodiment.

Hereinafter, a prime (dash) is not attached to variables on the world coordinate system O and variables which are not related to coordinate systems, one prime is attached to variables on the local coordinate system O', and two primes are attached to variables on (the centroid origin coordinate system as) the object reference coordinate system o".

For example, in FIG. 13A, $s^o_t$ represents a position of (the foreground #o of) the manipulation target object on the world coordinate system O at time t, and $s^m_t$ represents a position of (a foreground #m) of the hand on the world coordinate system O at time t.

Moreover, $q^o_t$ represents a posture of the manipulation target object at time t on the world coordinate system O (an inclination of the manipulation target object on the local coordinate system O' and the object reference coordinate system O" with respect to the world coordinate system O), and $s^o_c{}'$ represents a position of (the centroid of) the manipulation target object on the local coordinate system O' (the manipulation target object on the local coordinate system O').

Since the local coordinate system O' of the manipulation target object is a two-dimensional coordinate system in which an axis extending from the upper side to the lower side in the foreground appearance model $\mu^o$ is defined as an x' axis, another axis extending from the left side to the right side is defined as a y' axis, and an upper left point of the foreground appearance model $\mu^o$ is defined as an origin, the manipulation target object is unmoved on the local coordinate system o'.

Therefore, in the local coordinate system O' of the manipulation target object, the centroid $s^o_c{}'$ of the manipulation target object is unmoved.

Moreover, since the centroid origin coordinate system O" as the object reference coordinate system of the manipulation target object is a coordinate system which is parallely displaced from the local coordinate system O' so that the origin is positioned at the centroid of the manipulation target object, the manipulation target object does not move on the centroid origin coordinate system O" as the object reference coordinate system either. The centroid of the manipulation target object is typically positioned at the origin of the centroid origin coordinate system O" as the object reference coordinate system of the manipulation target object.

Figure 14:
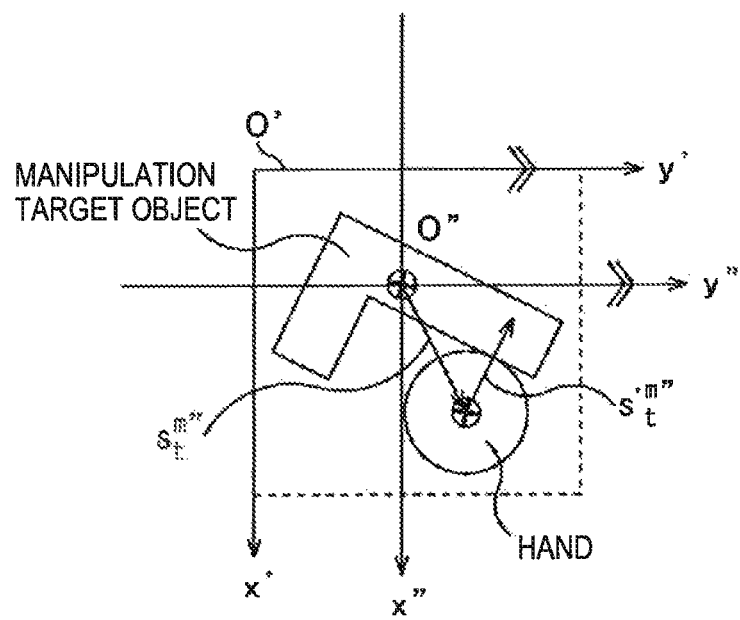
FIG. 14 is a view explaining a state and action of the hand on an object reference coordinate system O" of the manipulation target object at time t.

FIG. 14 is a view explaining a state and an action of the hand on (the centroid origin coordinate system as) the object reference coordinate system O" of the manipulation target object at time t.

In this case, an action of the foreground #i at time t is defined as $u^i_t$ as explained in FIG. 2, and when an action $u^i_{t-1}$ is performed in a state $z^i_t$ at time t−1, the foreground #i is put in the state $z^i_t$ at next time t.

Moreover, a motion model with respect to the motion of the foreground #i is defined as $a^i$, and a motion model $a^m$ of (the foreground #m) of the hand is assumed to be known. In other words, it is assumed that an action $u^m_t$ performed by the hand in response to an instruction such as a specified torque for moving the hand is defined as $u^m_t$, and the instruction given for causing the hand to perform the specified action $u^m_t$ is known.

It is further assumed that the action $u^m_t$ of the hand directly determines the state $z^m_t$ of the hand on the world coordinate system O, and therefore the hand may be in an arbitrary state $z^m_t$ by the action $u^m_t$ performed by the hand.

As described above, since the hand has a circular shape, the posture of the hand does not affect the motion of the manipulation target object caused by the contact between the hand and the manipulation target object.

Therefore, the action $u^m_t$ of the hand can be defined as shown in Formula (36) by using information among the states $z^m_t = [s^m_t, \dot{s}^m_t, q^m_t, \dot{q}^m_t]$ of the hand on the world coordinate system O of Formula (3) excluding the information on the posture, i.e., by using a position $s^m_t$ of the hand on the world coordinate system O and a differential (velocity) $\dot{s}^m_t$ of the position $s^m_t$, $$u^m_t = \begin{bmatrix} s^m_t \\ \dot{s}^m_t \end{bmatrix} \tag{36}$$

In the action $u^m_t$ of the hand in Formula (36), the position $s^m_t$ of the hand represents a position (hereinafter also referred to as a motion starting position) where the hand performs a motion (movement) as an action $u^m_t$ at time t, and the differential (velocity) $\dot{s}^m_t$ of the position $s^m_t$ represents a velocity (hereinafter also referred to as a moving velocity) at which the hand performs a motion (movement) as an action $u^m_t$ at time t.

The phrase that the hand performs an action $u^m_t$ (outputs an action $u^m_t$) refers to that the hand moves at the moving velocity $\dot{s}^m_t$ in the motion starting position $s^m_t$ at time t.

Note that the hand is assumed to move at a specified moving velocity $\dot{s}^m_t$ specified as an action $u^m_t$ regardless of the contact with the manipulation target object.

The action $u^m_t$ of the hand on the world coordinate system O expressed by Formula (36) may be expressed by Formula (37) on the object reference coordinate system O".

$$u^{m''}_t = \begin{bmatrix} s^{m''}_t \\ \dot{s}^{m''}_t \end{bmatrix} \tag{37}$$

In Formula (37), $u^{m''}_t$ represents an action of the hand on the object reference coordinate system O" of the manipulation target object at time t. As shown in FIG. 14, the position $s^{m''}_t$ represents a motion starting position of the hand on the object reference coordinate system O" (of the manipulation target object at time t), and the differential $\dot{s}^{m''}_t$ of the position $s^{m''}_t$ represents a moving velocity of the hand on the object reference coordinate system O" as shown in FIG. 14.

If a map function for mapping a point A, on the object reference coordinate system O" which is rotated (inclined) around an origin of the world coordinate system O by an angle B, to a corresponding point on the world coordinate system O is expressed as RR(A, B), relationship between the action $u^m_t$ on the world coordinate system O and the action $u^{m''}_t$ on the object reference coordinate system O" is expressed by Formula (38) by use of the map function RR( ).

$$u^m_t = RR(u^{m''}_t, q^o_t) \tag{38}$$

In Formula (38), $q^o_t$ represents a posture of (the foreground #o of) the manipulation target object at time t, i.e., an angle of rotation of the manipulation target object around the origin of the object reference coordinate system O" at time t.

In the manipulation model for manipulating a manipulation target object by the hand in the agent, an action $u^m_t$" of the hand on the object reference coordinate system O" of the manipulation target object at time t is generated based on an amount of change in state used for changing the state of the manipulation target object from a state of the moment (current state) to a state to be targeted (target state).

As for a motion model $a^o$ of (the foreground #o of) the manipulation target object, it is desirable to express how the manipulation target object performs a motion in response to the force received through the contact with the hand. Analytically, dynamics parameters such as a rigid mass, moment of inertia, and centroid are used. Such a motion model $a^o$ is calculated by estimating the dynamics parameters in accordance with a calculation model with respect to rigid-body dynamics.

However, in the manipulation model in the technology, the motion of the manipulation target object is acquired through learning as direct mapping of a position and a change in state of the hand to the change in state of the manipulation target object which is included in the relationship between the position and the change in state of the hand and the change in state of the manipulation target object on the object reference coordinate system O".

Accordingly, in manipulating the manipulation target object in the technology, the use of (the motion model for the rigid body as) the motion model $a^o$ of the manipulation target object can be omitted, and so the estimation of the dynamics parameters such as mass of the rigid body (manipulation target object) can also be omitted.

Figure 15:
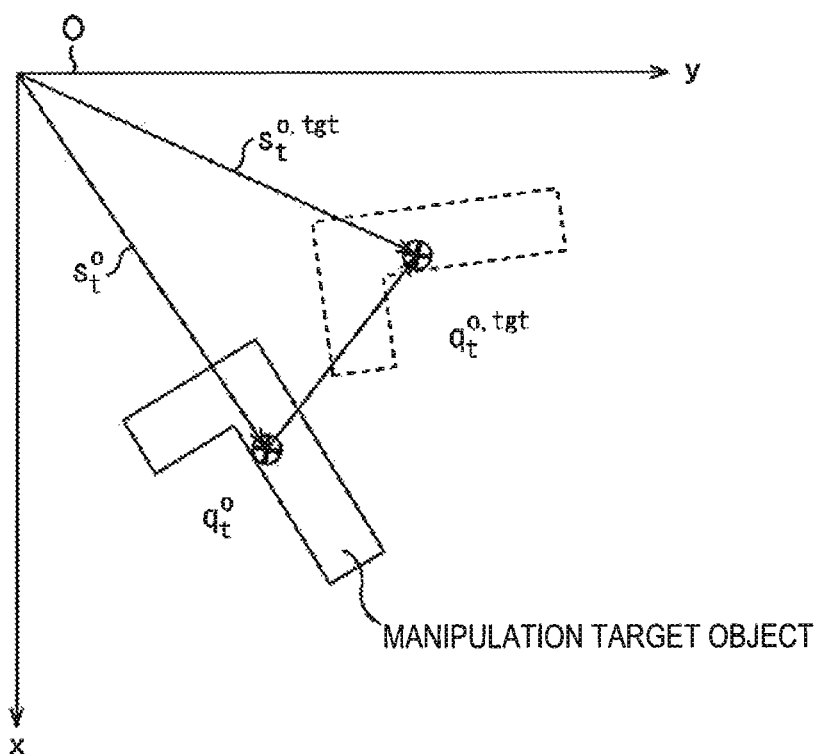
FIG. 15 is a view explaining the detail of environment setting for object manipulation in which the agent manipulates the manipulation target object with the hand.

FIG. 15 is a view explaining the detail of environment setting for object manipulation in which the agent manipulates the manipulation target object with the hand.

The agent causes the hand to perform an action to changes the state of (the foreground #o of) the manipulation target object on the world coordinate system O from a current state to a target state.

Suppose that the current time is time t, the current state (state at current time t) of the manipulation target object is expressed as in the world coordinate system O. Also in the world coordinate system O, the target state of the manipulation target object at (the point of time at) current time t is expressed as $z^{o,tgt}_t$.

In this case, in the world coordinate system O, as shown in FIG. 15, a change in state (hereinafter also referred to as a target change in state) $dz^{o,tgt}_t$ of the manipulation target object for the manipulation target object to be in the target state $z^{o,tgt}_t$ is expressed by Formula (39) by use of the current state $z^o_t$ and the target state $z^{o,tgt}_t$.

$$dz^{o,tgt}_t = z^{o,tgt}_t - z^o_t \qquad (39)$$

Note that in the present embodiment, it is assumed that a sufficiently large friction is present between the manipulation target object and the environment where the manipulation target object is placed, so that when the hand which is in contact with the manipulation target object is put in the state not in contact with the manipulation target object, the manipulation target object promptly stops its motion as explained in FIG. 12.

Therefore, a change velocity (differential of the position $s^o_t$) (hereinafter also referred to as a position change velocity) $\dot{s}^o_t$ of the position $s^o_t$ of the manipulation target object in a current state $z^o_t$ and a change velocity (differential of the posture $q^o_t$) (hereinafter also referred to as a posture change velocity) $\dot{q}^o_t$ of the posture $q^o_t$ immediately before the hand comes into contact with the manipulation target object in the current state $z^o_t$, as well as a position change velocity $\dot{s}^{o,tgt}_t$ of the target state $z^{o,tgt}_t$ of the manipulation target object and a posture change velocity $\dot{q}^{o,tgt}_t$ immediately after the hand is detached from the manipulation target object which has been in the target state $z^{o,tgt}_t$ become 0.

As a result, the target change in state $dz^{o,tgt}_t$ may substantially be defined as change of the position $s^i_t$ and the posture $q^i_t$ among the position $s^i_t$, the position change velocity $\dot{s}^i_t$, the posture $q^i_t$, and the posture change velocity $\dot{q}^i_t$ as the state $z^i_t$ defined by Formula (3).

Specifically, the target state change $dz^{o,tgt}_t$ of Formula (39) on the world coordinate system O is expressed by Formula (40) by use of the position $s^o_t$ and posture $q^o_t$ of the current state $z^o_t$, and the position $s^{o,tgt}_t$ and the posture $q^{o,tgt}_t$ of the target state $z^{o,tgt}_t$.

$$dz^{o,tgt}_t = \begin{bmatrix} ds^{o,tgt}_t \\ dq^{o,tgt}_t \end{bmatrix} \qquad (40)$$

$$= \begin{bmatrix} s^{o,tgt}_t - s^o_t \\ q^{o,tgt}_t - q^o_t \end{bmatrix}$$

In Formula (40), $ds^{o,tgt}_t$ represents a change in position (movement amount) that the position, among the states of the manipulation target object, is changed from the position $s^o_t$ of the current state $z^o_t$ to the position $s^{o,tgt}_t$ of the target state $z^{o,tgt}_t$. Hereinafter, $ds^{o,tgt}_t$ is also referred to as a target change in position.

Moreover in Formula (40), $dq^{o,tgt}_t$ represents a change in posture (rotation amount) that the posture, among the states of the manipulation target object, is changed from the posture $q^o_t$ of the current state $z^o_t$ to the posture $q^{o,tgt}_t$ of the target state $z^{o,tgt}_t$. Hereinafter, $dq^{o,tgt}_t$ is also referred to as a target change in posture.

The target change in state $dz^{o,tgt}_t$ in Formula (39) on the world coordinate system O is expressed by Formula (41) on the object reference coordinate system O" of the manipulation target object at time t.

$$dz^{o,tgt''}_t = \begin{bmatrix} ds^{o,tgt''}_t \\ dq^{o,tgt''}_t \end{bmatrix} \qquad (41)$$

In Formula (41), $dz^{o,tgt''}_t$ represents a target change in state on the object reference coordinate system O" (of the manipulation target object at time t). Moreover, $ds^{o,tgt''}_t$ also represents a target change in position on the object reference coordinate system O", while $dq^{o,tgt''}_t$ represents a target change in posture on the object reference coordinate system O".

Herein, the target change in posture, i.e., the change in posture (rotation amount) that the posture, among the states of the manipulation target object, changes from the posture $q^o_t$ of the current state $z^o_t$ to the posture $q^{o,tgt}_t$ of the target state $z^{o,tgt}_t$ is the same rotation amount (angle of rotation) as viewed from any two-dimensional coordinate system that can be defined on the two-dimensional plane where the manipulation target object (foreground #o) is present.

Therefore, the target change in posture $dq^{o,tgt}_t$ on the world coordinate system O in Formula (40) is equal to the target change in posture $dq^{o,tgt}_t$" on the object reference coordinate system O" in Formula (41) ($dq^{o,tgt}_t=dq^{o,tgt}_t$").

Further, relationship between the target change in position $ds^{o,tgt}_t$ on the world coordinate system O in Formula (40) and the target change in position $ds^{o,tgt}_t$" on the object reference coordinate system O" in Formula (41) is expressed by Formula (42) by use of an inverse function $RR^{-1}$ of the map function RR( ) defined in Formula (38).

$$ds_t^{o,tgt"}=RR^{-1}(ds_t^{o,tgt},q_t^o) \quad (42)$$

[Section 4.2 Expression of object Manipulation on object Reference Coordinate System O"]

In the manipulation model of the technology for use in manipulation (object manipulation) of the manipulation target object by the agent with the hand, the motions of the hand and (the foreground of) the manipulation target object are expressed on the reference frame O" of the manipulation target object as explained in FIG. 12.

Accordingly, the agent cuts from an actual image $\lambda^\sim_t$ a specified range on the basis of the object reference coordinate system O" of the manipulation target object included in the actual image $\lambda^\sim_t$, and rotates the specified range so that an inclination of the object reference coordinate system O" becomes 0. This generates an object reference image which is an image having the posture of the manipulation target object matching with the foreground appearance model $\mu^o$ of (the foreground #o of) the manipulation target object.

The agent then uses the object reference image to learn the manipulation model in which the motions of the hand and the manipulation target object are expressed on the reference frame O" of the manipulation target object.

Figure 16:
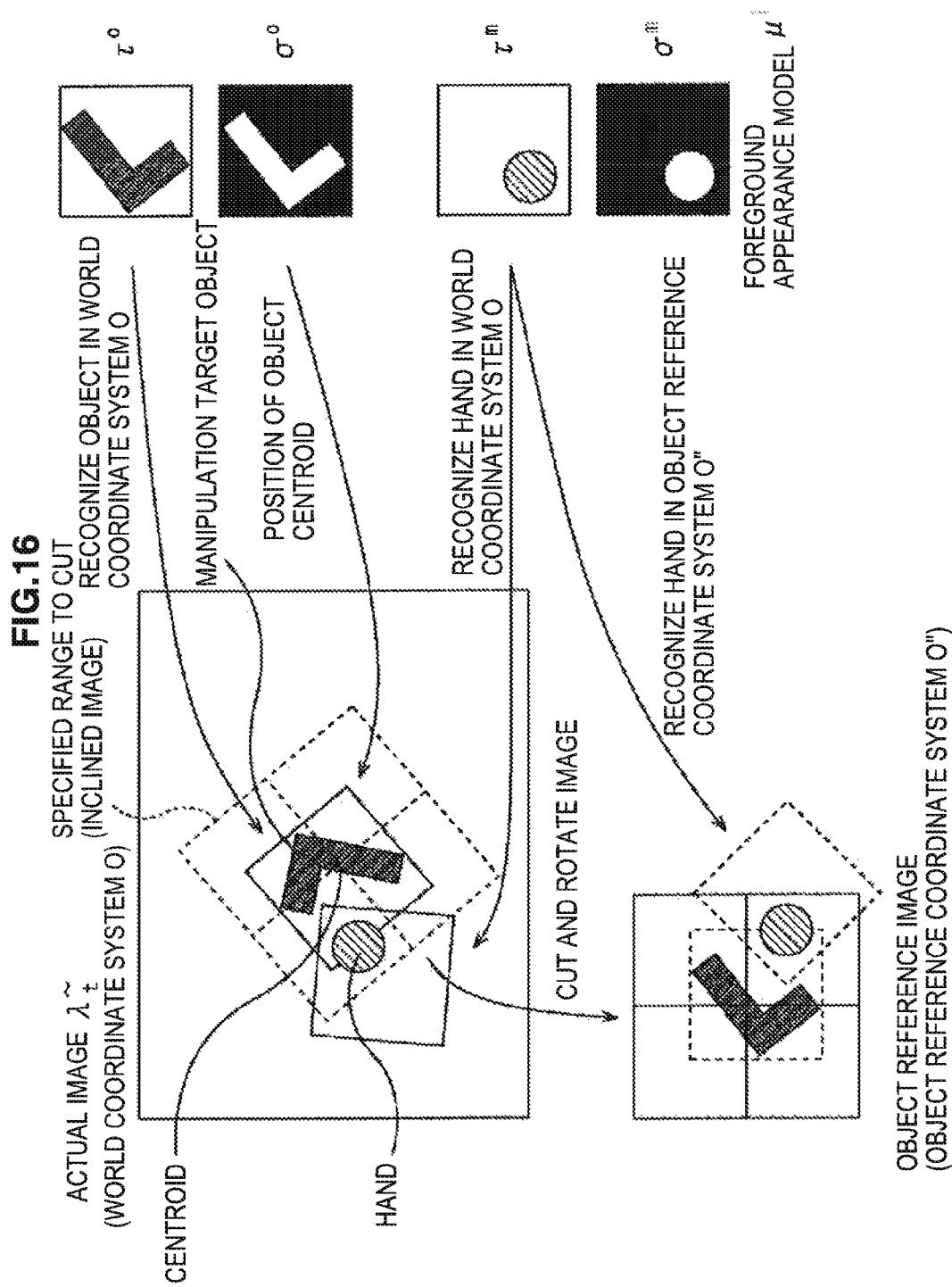
FIG. 16 is a view explaining generation of an object reference image.

FIG. 16 is a view explaining generation of the object reference image.

The agent uses the actual image $\lambda^\sim_t$ to recognize (the foreground #o of) the manipulation target object included in the actual image $\lambda^\sim_t$.

As a method for recognizing the manipulation target object by use of the actual image $\lambda^\sim_t$, there is a method involving, for example, state estimation (foreground state estimation) by use of the particle filter explained in sections 3.2 and 3.3.

In the case of recognizing the manipulation target object by state estimation by use of the particle filter, a state $z^o_t$ of (the foreground #o of) the manipulation target object obtained by state estimation by use of the particle filter (such as a maximum likelihood state $z^o_t$ calculated from L particles $z^{i(1)}_t$ through $z^{i(L)}_t$ which are obtained by state estimation by use of the particle filter) is regarded as a recognition result of the manipulation target object based on the actual image $\lambda^\sim_t$.

The agent then adopts the position $s^o_t$ that is a component of the state $z^o_t$ of the manipulation target object as the centroid (centroid of the manipulation target object on the world coordinate system O) of the manipulation target object, while adopting the posture $q^o_t$ that is a component of the state $z^o_t$ of the manipulation target object as the posture of the manipulation target object, and cuts a specified rectangular range, which has the centroid of the manipulation target object as a center and which is inclined with respect to the world coordinate system O by the posture $q^o_t$ of the manipulation target object, from the actual image $\lambda^\sim_t$ as an inclined image which is inclined by the posture $q^o_t$ with respect to the foreground appearance model $\mu^o$ of the manipulation target object as shown in FIG. 16.

Further, the agent rotates, as shown in FIG. 16, the inclined image so that the inclination of the object reference coordinate system becomes 0, i.e., reversely rotates the inclined image by an angle of rotation as the posture $q^o_t$ so as to generate an object reference image.

Therefore, the posture of the manipulation target object included in the object reference image matches with the posture of the manipulation target object included in the foreground appearance model $\mu^o$ of the manipulation target object.

In this case, adopted as the specified range for cutting the inclined image from the actual image $\lambda^\sim_t$ is a range large enough to include the hand positioned in the vicinity of the manipulation target object and the manipulation target object in case where the hand is positioned in the vicinity of the manipulation target object, i.e., a range large enough for a hand in contact with the manipulation target object, a hand immediately before coming into contact with the manipulation target object, and a hand immediately after separating from the manipulation target object to be included together with the manipulation target object.

Therefore, when the hand is not positioned in the vicinity of the manipulation target object in an actual image $\lambda^\sim_t$, the actual image $\lambda^\sim_t$ is not used for learning of the manipulation model.

Whether or not the hand is positioned in the vicinity of the manipulation target object in the actual image $\lambda^\sim_t$, i.e., whether or not the specified range for cutting an inclined image from the actual image $\lambda^\sim_t$ includes the hand besides the manipulation target object may be determined by recognizing the hand as well as by recognizing the manipulation target object from the actual image $\lambda^\sim_t$.

It is to be noted that the shape of the specified range for cutting the inclined image from the actual image $\lambda^\sim_t$ is not limited to a rectangular shape, but may be, for example, a circular shape.

Examples of the method for recognizing the manipulation target object from the actual image $\lambda^\sim_t$ include a method involving state estimation by use of the particle filter, as well as a method for matching the posture of the foreground texture model $\tau^o$ of the manipulation target object with the actual image $\lambda^\sim_t$ at various positions of the actual image $\lambda^\sim_t$ while the posture of the foreground texture model $\tau^o$ of the manipulation target object is variously changed (such as for calculating the sum total of differences of absolute values of pixel values). The same methods may be used as the method for recognizing the hand from the actual image $\lambda^\sim_t$.

As the centroid of the manipulation target object for cutting an inclined image, the position $s^o_t$ that is a component of the state $z^o_t$ of the manipulation target object is employed. In addition, it is also possible to use the foreground shape model $\sigma^o$ of the manipulation target object and employ the centroid of a probability distribution indicating that each position in the foreground shape model $\sigma^o$ is a foreground.

The centroid (hereinafter also referred to as a probability distribution centroid) of the probability distribution indicating each position of the foreground shape model $\sigma^o$ of the manipulation target object being a foreground can be calculated in accordance with Formula (43).

$$s_c^{o'} = \frac{\sum_{s' \in \mu^o}(\sigma^o(s')s')}{\sum_{s' \in \mu^o}\sigma^o(s')} \quad (43)$$

In Formula (43), $s^o_c{}'$ represents a probability distribution centroid on the local coordinate system O' of the manipulation target object, while s' represents a position on the local coordinate system O' of the manipulation target object.

Further, σ(s') represents a pixel value at the position s' on the local coordinate system O' of the manipulation target object in the foreground shape model t° of the manipulation target object, i.e., a probability of the position s' being a foreground.

Further, the summation (Σ) of Formula (43) is calculated in the case where the position s' on the local coordinate system O' of the manipulation target object is a point (position) on the foreground appearance model μ° of the manipulation target object.

Since the coordinates of a probability distribution centroid $s^o{}_c{}'$ on the local coordinate system O' of the manipulation target object is calculated by Formula (43), the coordinate of the probability distribution centroid $s^o{}_c{}'$ on the local coordinate system O' is converted into a coordinate on the world coordinate system O when an inclined in is cut.

It is to be noted that the centroid of the manipulation target object for cutting an inclined image is defined as an origin of the manipulation target object on the object reference coordinate system O''. Therefore, the centroid of the manipulation target object is aligned with the origin of the manipulation target object on the object reference coordinate system O.

After generating an object reference image as described in the foregoing, the agent recognizes the hand from the object reference image and acquires the state of the hand on the object reference coordinate system O'' as a recognition result.

Here, in the present embodiment, the hand has a circular shape so that the posture is unchanged as described before. Accordingly, in learning the manipulation model, information on the posture, among information on the state of the hand, is not used, but information on the position is used.

The agent learns the manipulation model by using the change in state of the manipulation target object on the object reference coordinate system O'' besides the state of the hand on the object reference coordinate system O''.

As for the object reference image generated by cutting, from the actual image $\tilde{\lambda}_t$ at time t, an inclined image around the centroid of the manipulation target object at time t, the centroid of the manipulation target object included in the object reference image is typically positioned at the center of the object reference image generated from the actual image $\tilde{\lambda}_t$ at time t, i.e., the origin of the object reference coordinate system O'' of the manipulation target object at time t.

Further, the posture of the manipulation target object included in the object reference image generated by cutting from the actual image $\tilde{\lambda}_t$ at time t an inclined image around the centroid of the manipulation target object at time t matches with the posture of the manipulation target object included in the foreground appearance model μ° of the manipulation target object.

Therefore, in the object reference image obtained by cutting from the actual image $\tilde{\lambda}_t$ a specified range on the basis of the object reference coordinate system O'' of the manipulation target object included in the actual image $\tilde{\lambda}_t$, and rotating the specified range so that an inclination of the object reference coordinate system O'' becomes 0, the state (position and posture) of the manipulation target object included in the object reference image does not change, which makes it difficult to observe the motion (change in state) of the manipulation target object.

Accordingly, in the technology, in the object reference coordinate system O'' of the manipulation target object at the time distanced by a fixed time Δt from current time t, such as at past time t−Δt, a state of the manipulation target object of current time t is calculated, and the calculated state is treated as a change in state of the manipulation target object from the time t−Δt to the (current) time t on the object reference coordinate system O''.

Specifically, a position and a posture of the manipulation target object at current time t on the object reference coordinate system O'' of the manipulation target object at time t−Δt are calculated as a change in position and a change in posture of the manipulation target object from the time t−Δt to the time t on the object reference coordinate system O''.

Figure 17:
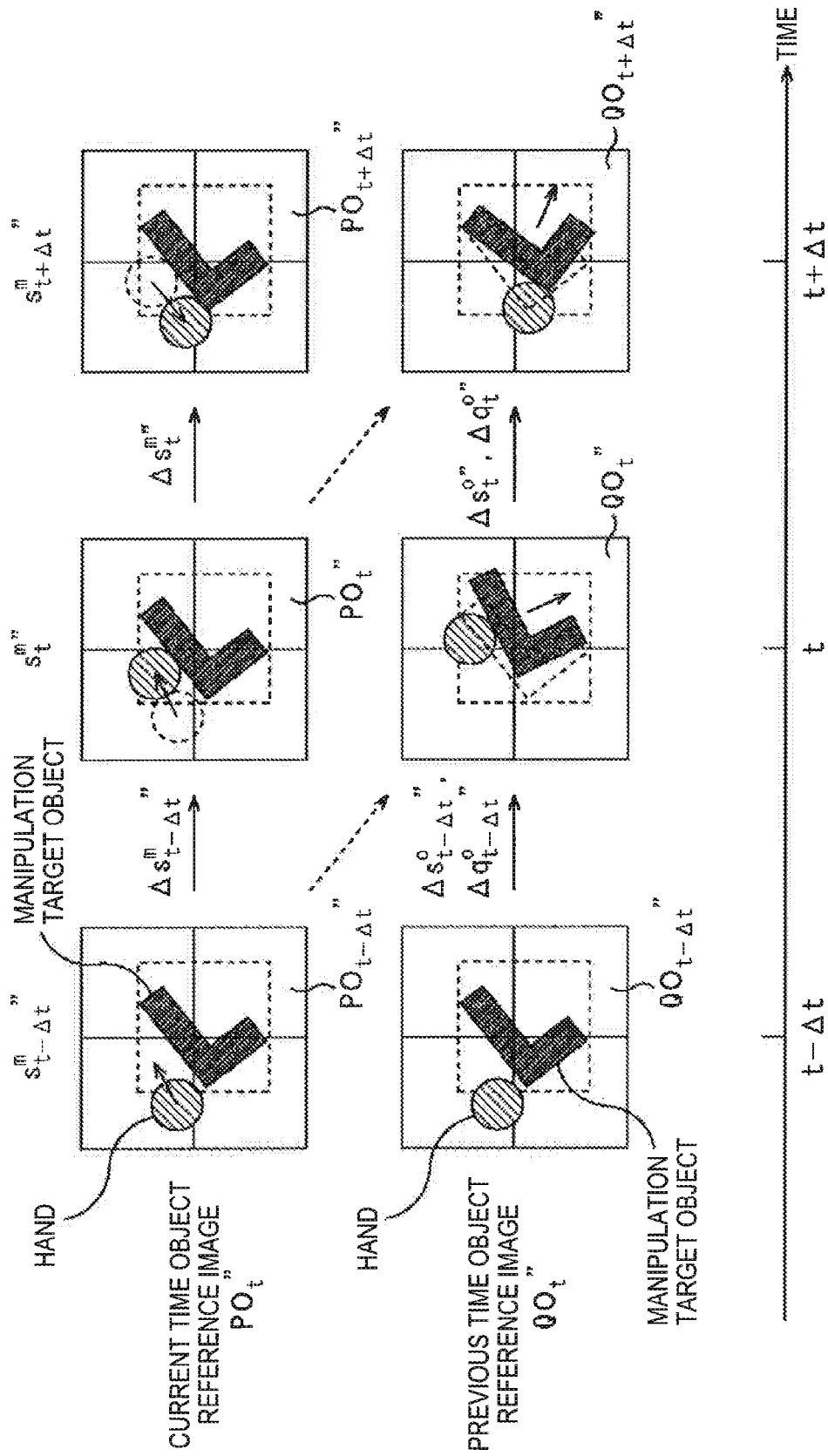
FIG. 17 is a view explaining how to obtain a state of the hand on the object reference coordinate system O" and a change in state of the manipulation target object on the object reference coordinate system O"

FIG. 17 is a view explaining how to obtain the state of the hand on the object reference coordinate system O'' and the change in state of the manipulation target object on the object reference coordinate system O''.

Note that although it has been presumed so far that the time t is continuous time (the state of an object changes every moment), hereinafter discrete time (time) is adopted as the time (time) t. That is, with specified constant time Δt as a unit time, the state of an object is assumed to be unchanged during the unit time Δt (the state of the object at time t−Δt is constant up to immediately before time t and is instantly changed at time t).

In connection with the discrete time being adopted as time t, a change in state of (the foreground #i) of the object from a state $z^i{}_{t-\Delta t}$ at time t−Δt to a state $z^i{}_t$ at next time t is treated as a change in state at time t−Δt (from time t−Δt to time t) and expressed as $\Delta z^i{}_{t-\Delta t}$.

Herein, while the state $z^i{}_t$ includes the position $s^i{}_t$ and the posture $q^i{}_t$, the change in position and the change in posture that are changes in the position $s^i{}_t$ and the posture $q^i{}_t$ are also expressed in the same way as the change in state $\Delta z^i{}_t$. In other words, the change in position is expressed as $\Delta s^i{}_t$ and the change in posture is expressed as $\Delta q^i{}_t$.

In connection with adopting the discrete time as time t, the hand action $u^m{}_t$ in the world coordinate system O is defined not by the position $s^m{}_t$ and the position velocity $s^m{}_t$ as in the aforementioned Formula (36), but is defined as a formula $u^m{}_t=[s^m{}_t, \Delta s^m{}_t]$ with the position $s^m{}_t$ and the position change $\Delta s^m{}_t$.

The action $u^m{}_t=[s^m{}_t, \Delta s^m{}_t]$ represents an action of moving the hand, which is at the position $s^m{}_t$ (in the world coordinate system O) at time t, by the position change $\Delta s^m{}_t$ (in the world coordinate system O) until next time t+Δt.

Note that also in the object reference coordinate system O'', the hand action $u^m{}_t{}''$ is similarly defined not with the position $s^m{}_t{}''$ and the position velocity $s^m{}_t{}''$ as shown in the aforementioned Formula (37), but is defined as a formula $u^m{}_t{}''=[s^m{}_t{}'', \Delta s^m{}_t{}'']$ with the position $s^m{}_t{}''$ and the position change $\Delta s^m{}_t{}''$.

The agent calculates the state (position) of the hand on the object reference coordinate system O'' as shown below.

Specifically, the agent generates an object reference image (hereinafter also referred to as a current time object reference image $PO_t''$) obtained by cutting from an actual image $\tilde{\lambda}_t$ of current time t a specified range on the basis of the object reference coordinate system O'' (hereinafter referred to as the object reference coordinate system $O_t''$ of current time t or simply referred to as the object reference coordinate system $O_t''$) with the manipulation target object included in the actual image $\tilde{\lambda}_t$, as a reference and rotating the specified range so that an inclination of the object reference coordinate system $O_t''$ of current time t becomes 0.

The agent then recognizes the hand from the current time object reference image $PO_t''$ and thereby calculates, as shown in FIG. 17, a position and a change in position (change in state) of the hand included in the current time object reference image $PO_t''$ as a position $s^m{}_t{}''$ and a change in position (change in state) $\Delta s^m{}_t{}''$ of the hand in the object reference coordinate system O''.

Here, in addition to the position $s^m_t$" of the hand in the object reference coordinate system O", the agent also calculates the change in position $\Delta s^m_t$".

The change in position $\Delta s^m_t$" of the hand at time t is herein a change in position of the hand from time t to time t+$\Delta$t, which can be obtained by calculating the position $s^m_t$" of the hand included in the current time object reference image PO$_t$" at time t, and further calculating a position $s^m_{t+\Delta t}$" included in the current time object reference image PO$_{t+\Delta t}$" at next time t+$\Delta$t, before subtracting the position $s^m_t$" at time t from the hand position $s^m_{t+\Delta t}$" at time t+$\Delta$t.

Therefore, strictly speaking, the position $s^m_t$" and the change in position $\Delta s^m_t$" at time t can be calculated after the position $s^m_{t+\Delta t}$" of the hand included in the current time object reference image PO$_{t+\Delta t}$" at next time t+$\Delta$t is calculated. However, in the following description, it is assumed that the position $s^m_t$" and the change in position $\Delta s^m_t$" of the hand at time t are appropriately calculated at the time t to provide simplified explanation.

The agent calculates the position $s^m_t$" and the change in position $\Delta s^m_t$" of the hand in the object reference coordinate system O" as mentioned above, and also calculates the change in state of the manipulation target object on the object reference coordinate system O" as described below.

That is, the agent generates an object reference image (hereinafter also referred to as a previous time object reference image QO$_t$") obtained by cutting from an actual image $\lambda^\sim_t$ of current time t a specified range on the basis of the object reference coordinate system O" (hereinafter referred to as an object reference coordinate system O$_{t-\Delta t}$" at previous time t–$\Delta$t or simply referred to as an object reference coordinate system O$_{t-\Delta t}$") with the manipulation target object, included in the actual image $\lambda^\sim_t$ at previous time t–$\Delta$t that is a time immediately before the current time t, as a reference and rotating the specified range so that an inclination of the object reference coordinate system O$_{t-\Delta t}$" at previous time t–$\Delta$t becomes 0.

The agent then recognizes the manipulation target object from previous time object reference image QO$_t$" and thereby calculates, as shown in FIG. 17, a position and a posture of the manipulation target object included in the previous time object reference image QO$_t$", i.e., a change in position and a change in posture of the manipulation target object from previous time t–$\Delta$t to current time t as a change in position $\Delta s^o_{t-\Delta t}$" and a change in posture $\Delta q^o_{t-\Delta t}$" of the manipulation target object in object reference coordinate system O".

Here, at (current) time t, the change in position $\Delta s^o_{t-\Delta t}$" and the change in posture $\Delta q^o_{t-\Delta t}$" of the manipulation target object calculated from the previous time object reference image QO$_t$" are the changes in position and posture of the manipulation target object at time t–$\Delta$t (from time t–$\Delta$t to time t).

Therefore, the change in position $\Delta s^o_t$" and the change in posture $\Delta q^o_t$" of the manipulation target object at time t are calculated after the position and posture of the manipulation target object included in the previous time object reference image QO$_{t+\Delta t}$" at next time t+$\Delta$t are calculated. However, in the following explanation, it is assumed that the change in position $\Delta s^o_{t-\Delta t}$" and the change in posture $\Delta q^o_{t-\Delta t}$" of the manipulation target object at time t are appropriately calculated at the time t to provide simplified explanation.

As described above, the agent calculates the position $s^m_t$" and the change in position $\Delta s^m_t$" of the hand in the object reference coordinate system O" from the current time object reference image PO$_t$" and also calculates the change in position $\Delta s^o_t$" and the change in posture $\Delta q^o_t$" of the manipulation target object in the object reference coordinate system O" from the previous time object reference image QO$_t$".

The agent then learns a manipulation model by use of the position $s^m_t$" and the change in position $\Delta s^m_t$" of the hand in the object reference coordinate system O" and the change in position $\Delta s^o_t$" and the change in posture $\Delta q^o_t$" of the manipulation target object in the object reference coordinate system O".

Figure 18:
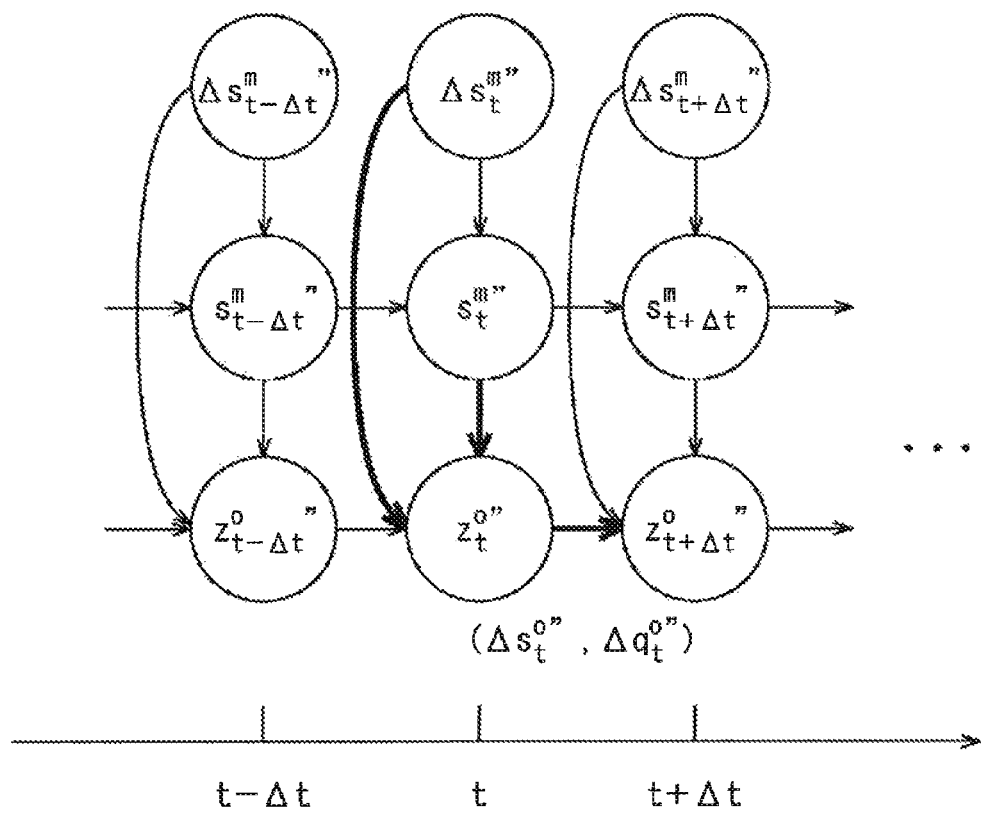
FIG. 18 is a graphical model showing relationship between each of a position $s^m_t{''}$ and a change in position $\Delta s^m_t{''}$ of the hand in the object reference coordinate system O" and each of a change in position $\Delta s^o_t{''}$ and a change in posture $\Delta q^o_t{''}$ of the manipulation target object in the object reference coordinate system O"

FIG. 18 is a graphical model showing respective relationship between the position $s^m_t$" and the change in position $\Delta s^m_t$" of the hand in the object reference coordinate system O" and the change in position $\Delta s^o_t$" and the change in posture $\Delta q^o_t$" of the manipulation target object in the object reference coordinate system O".

In the graphical model of FIG. 18, the hand is in the position $s^m_t$" (in the state of being in the position $s^m_t$") at time t, while the manipulation target object is in the state $z^o_t$.

When the hand in the position $s^m_t$" moves by a change in position $\Delta s^m_t$" during a period from time t to next time t+$\Delta$t (when the position of the hand is changed (in state) by $\Delta s^m_t$"), a change in state by ($\Delta s^o_t$", $\Delta q^o_t$"), i.e., a change in position by $\Delta s^o_t$" and a change in posture by $\Delta q^o_t$" occurs in the manipulation target object.

As a result, the manipulation target object is put in the state $z^o_{t+\Delta t}$ at time t+$\Delta$t.

Relationship between the position $s^m_t$" and the change in position $\Delta s^m_t$" of the hand in the object reference coordinate system O" and the change in position $\Delta s^o_t$" and the change in posture $\Delta q^o_t$" of the manipulation target object in the object reference coordinate system O" can be expressed by Formulas and (55) by use of functions F( ) and G( ).

$$(\Delta s^o_t", \Delta q^o_t") = F(s^m_t", \Delta s^m_t") \tag{44}$$

$$(s^m_t", \Delta s^m_t") = G(\Delta s^o_t", \Delta q^o_t") \tag{45}$$

Formula (44) expresses, on the basis of the manipulation target object, how the hand is changed from which position and how these changes of the hand cause change in state of the manipulation target object.

Therefore, the function F( ) of Formula (44) represents a prediction model (forward model) which predicts the change in position $\Delta s^o_t$" and the change in posture $\Delta q^o_t$", which are changes in state $\Delta z^o_t$" of the manipulation target object, based on the position (state) $s^m_t$" and the change in position (change in state) $\Delta s^m_t$" which are hand actions $u^m_t$".

In contrast, Formula (45) expresses how to move the hand from which position on the basis of the manipulation target object in order to generate a certain change in state of the manipulation target object when it is desired to generate the certain change in state as a target.

Therefore, the function G( ) of Formula (45) represents a control model (inverse model) which calculates, based on a targeted change in state $\Delta z^o_t$"=($\Delta s^o_t$", $\Delta q^o_t$") of the manipulation target object, the position (state) $s^m_t$" and the change in position (change in state) $\Delta s^m_t$" that are hand actions $u^m_t$" as hand control for generating that change in state $\Delta z^o_t$".

The agent learns the manipulation model as a function F( ) of Formula (44) that is a prediction model (hereinafter also referred to as a prediction model F( )) and a function G( ) of Formula (45) that is a control model (hereinafter also referred to as a control model G( )) by use of the position $s^m_t$" and the change in position $\Delta s^m_t$" of the hand in the object reference coordinate system O" and the change in position $\Delta s^o_t$" and the change in posture $\Delta q^o_t$" of the manipulation target object in the object reference coordinate system O".

[Section 4.3 Concrete Implementation of Manipulation Model]

The manipulation model as the prediction model F( ) and the control model G( ) can be formulized as a probability model.

For example, the prediction model F( ) can be formulized as a probability model that indicates a probability P of a change in position $\Delta s^o{}_t$" and a change in posture $\Delta q^o{}_t$", which are changes in state $\Delta z^o{}_t$", being generated in the manipulation target object ($\Delta s^o{}_t$", $\Delta q^o{}_t$"|$s^m{}_t$", $\Delta s^m{}_t$") when the position of the hand is changed from position $s^m{}_t$" by $\Delta s^m{}_t$".

As a method for implementing a manipulation model as a prediction model F( ) as a probability model, and learning the manipulation model by use of the position $s^m{}_t$" and the change in position $\Delta s^m{}_t$" of the hand, and the change in position $\Delta s^o{}_t$" and the change in posture $\Delta q^o{}_t$" of the manipulation target object, there is a method involving a frequency table being provided for counting a frequency of the change in position $\Delta s^o{}_t$" and the change in posture $\Delta q^o{}_t$" that occurs in the manipulation target object when a variable is discretized and the position of the hand is changed from the position $s^m{}_t$" by $\Delta s^m{}_t$".

Figure 19:
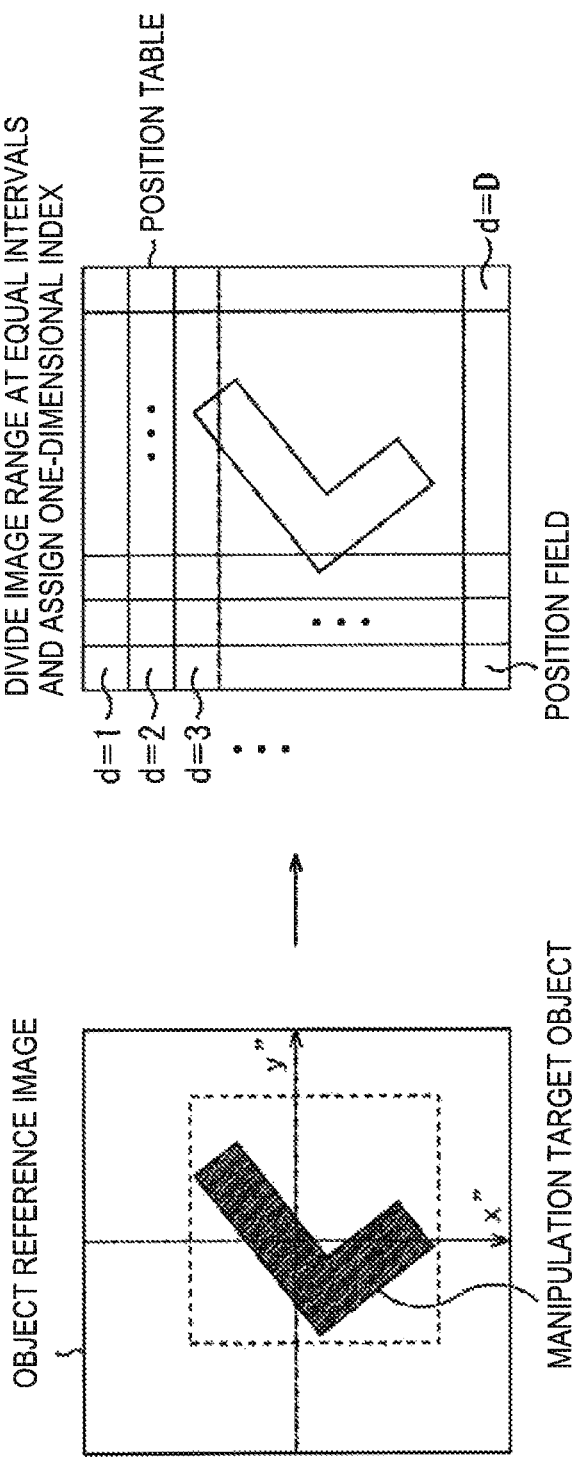
FIG. 19 is a view showing a position table.
Figure 20:
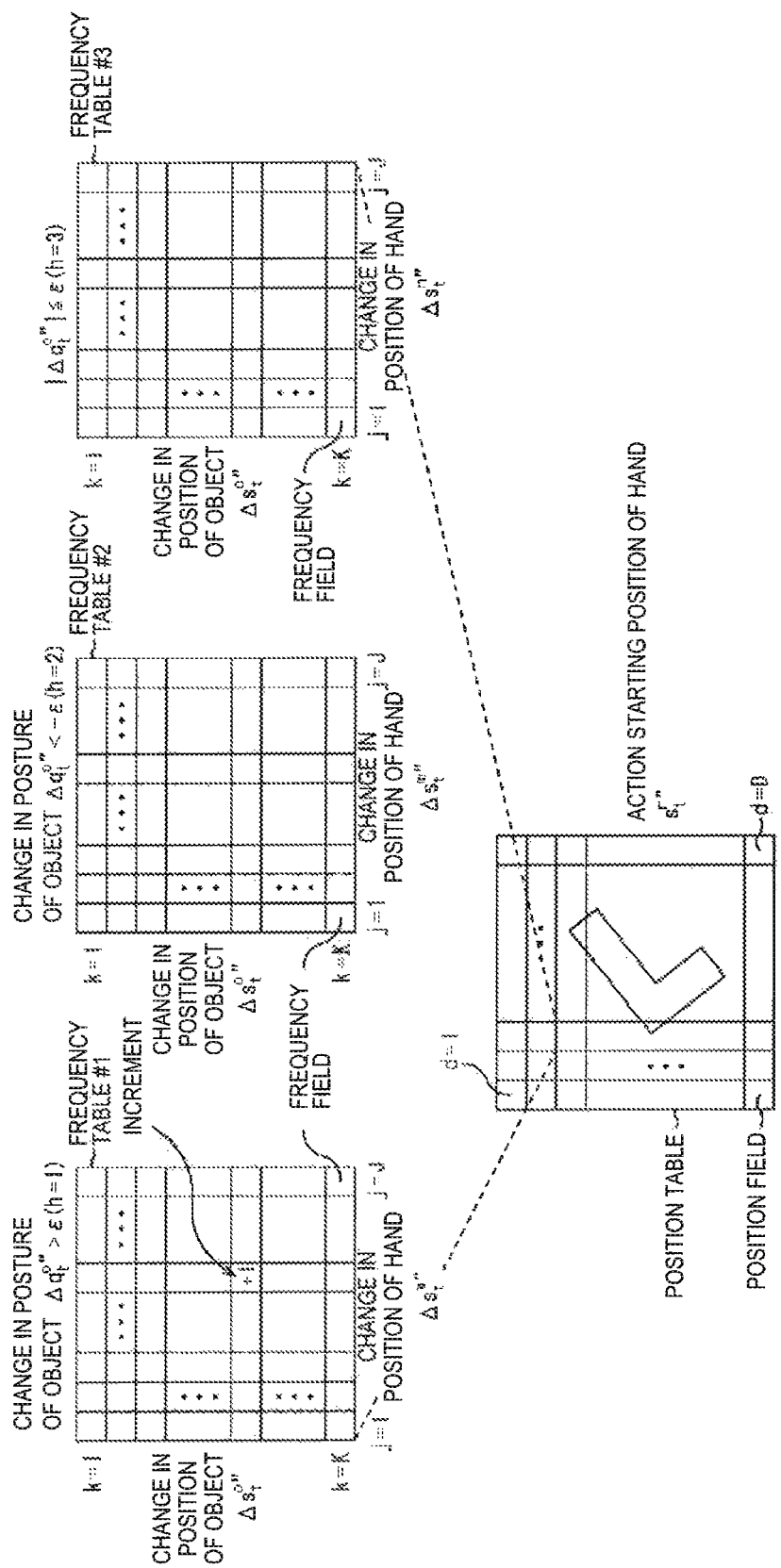
FIG. 20 is a view showing a frequency table.

FIGS. 19 and 20 are views showing examples of the manipulation model implemented as a probability model.

In the present embodiment, the manipulation model is constituted from a position table.

FIG. 19 is a view showing an example of the position table.

The position table is a two-dimensional table which divides a range identical to the specified range for use in cutting an inclined image explained in FIG. 16 into, for example, grid-like fields, and a unique index is allocated to each field.

In FIG. 19, the position table is divided at equal intervals in directions of x" axis and y" axis of the object reference coordinate system O" to have square-shaped D fields.

In FIG. 19, sequential integers from 1 are allocated as indexes #d to each field of the two-dimensional position table from the upper left field in the x" axis direction and also in the y" axis direction.

The indexes #d allocated to the fields of the position table (hereinafter also referred to as position fields) express the position $s^m{}_t$" of the hand discretized to D states.

Each position field in the position table has a frequency table for counting a frequency of the change in position $\Delta s^o{}_t$" and the change in posture $\Delta q^o{}_t$" that occurs in the manipulation target object when the position of the hand is changed by $\Delta s^m{}_t$" from the position $s^m{}_t$" in the position field (the position discretized to the position field).

FIG. 20 is a view showing an example of the frequency table.

Now, if the change in position $\Delta s^m{}_t$" of the hand is discretized to J states, the change in position $\Delta s^o{}_t$" of the manipulation target object is discretized to K states, and the change in posture $\Delta q^o{}_t$" of the manipulation target object is discretized to H states, respectively, each position field of the position table has a three-dimensional frequency table having J×K×H fields in width×length×height.

For example, three (three-dimensional) indexes #j, #k, and #h are allocated to a field that is the j-th field in the width direction from a specified peak of the three-dimensional frequency table, the k-th in the length direction, and the h-th field in the height direction.

The index #j represents the change in position $\Delta s^m{}_t$" of the hand which is discretized to J states, the index #k represents the change in position $\Delta s^o{}_t$" of the manipulation target object which is discretized to K states, and the index #h represents the change in posture $\Delta q^o{}_t$" of the manipulation target object which is discretized to H states, respectively.

Note that in the present embodiment, in order to prevent the number of fields in the frequency table from becoming huge, discretization of the change in position $\Delta s^m{}_t$" of the hand, the change in position $\Delta s^o{}_t$" of the manipulation target object, and the change in posture $\Delta q^o{}_t$" of the manipulation target object is performed, for example, as shown below.

That is, in the case of the change in position $\Delta s^m{}_t$" of the hand, a magnitude thereof is disregarded and only a direction (angle) thereof is treated.

More specifically, by calculating an arctangent function arctan 2($\Delta s^m{}_t$") which outputs a range of $-\pi$ through $\pi$, the change in position $\Delta s^m{}_t$" of the hand is converted into an angle in the range of $-\pi$ through $\pi$, and is discretized to (the index #j corresponding to) any one of J divisions which are obtained by dividing the range of $-\pi$ through $\pi$ at equal intervals.

The same procedures shall apply to the change in position $\Delta s^o{}_t$" of the manipulation target object. That is, by calculating an arctangent function arctan 2($\Delta s^o{}_t$"), the change in position $\Delta s^o{}_t$" of the manipulation target object is converted into an angle in the range of $-\pi$ through $\pi$, and is discretized to (the index #k corresponding to) any one of K divisions which are obtained by dividing the range of $-\pi$ through $\pi$ at equal intervals.

Moreover, in the case of the change in posture $\Delta q^o{}_t$" of the manipulation target object, whether or not the manipulation target object is rotated (whether or not the magnitude of a rotational angle can be regarded as 0) is used. If the manipulation target object is rotated (when the magnitude of the rotational angle is not regarded as 0), then the magnitude of the rotational angle is ignored, and only the direction of rotation is used.

More specifically, the change in posture $\Delta q^o{}_t$" of the manipulation target object is discretized to any one of rotation in a positive direction (e.g., counterclockwise rotation out of clockwise rotation and counterclockwise rotation), rotation in a negative direction, and no rotation (no change in posture).

Therefore, the change in posture $\Delta q^o{}_t$" of the manipulation target object is discretized to H=3.

In FIG. 20, the change in posture $\Delta q^o{}_t$" of the manipulation target object is discretized to index #h=1 if the change in posture $\Delta q^o{}_t$" is larger than a predetermined value $\epsilon$ (>0) (if the rotation is in the positive direction), and is discretized to index #h=2 if the change in posture $\Delta q^o{}_t$" is less than $-\epsilon$ (if the rotation is in the negative direction). Moreover, if it can be regarded that there is no change in posture $\Delta q^o{}_t$", i.e., an absolute value |$\Delta q^o{}_t$"| of the change in posture $\Delta q^o{}_t$" is equal to or less than the predetermined value $\epsilon$, the change in posture $\Delta q^o{}_t$" is discretized to index #h=3.

Here, in the three-dimensional frequency table having J×K×H fields, a two-dimensional table that is the h-th in the height direction and has J×K fields in width×length direction may be referred to as a frequency table #h.

In FIG. 20, since the change in posture $\Delta q^o{}_t$" of the manipulation target object is discretized to H=3 values, the three-dimensional frequency table has two-dimensional frequency tables #1, #2, and #3.

Note that in FIG. 20, in order to avoid complication of the drawing, the three-dimensional frequency table is divided into and shown side by side as two-dimensional frequency tables #1 through 43.

In the agent, learning of the manipulation model constituted from the position table having the frequency tables as described above is performed, for example, as shown below.

That is, the agent appropriately moves the hand from various positions in the environment so that the hand comes into collision with (comes into contact with) the manipulation target object in order to collect in every time $\Delta t$ a position $s^m{}_t$"

of the hand, a change in position $\Delta s^{m}{}_{t}{}''$ from the position $s^{m}{}_{t}{}''$, and a change in position $\Delta s^{o}{}_{t}{}''$ and a change in posture $\Delta q^{o}{}_{t}{}''$ of the manipulation target object when the hand moves by the change in position $\Delta s^{m}{}_{t}{}''$ from the position $s^{m}{}_{t}{}''$, as described in FIGS. 16 and 17 as learned data for use in learning the manipulation model from the actual image $\lambda^{\sim}{}_{t}$.

Further, the agent discretizes the position $s^{m}{}_{t}{}''$ and the change in position $\Delta s^{m}{}_{t}{}''$ of the hand, and the change in position $\Delta s^{o}{}_{t}{}''$ and the change in posture $\Delta q^{o}{}_{t}{}''$ of the manipulation target object as learned data into indexes #d, #j, #k, and #h.

The agent then performs additional learning of the manipulation model by use of the indexes #d, #j, #k, and #h obtained by discretizing the position $s^{m}{}_{t}{}''$ and the change in position $\Delta s^{m}{}_{t}{}''$ of the hand, and the change in position $\Delta s^{o}{}_{t}{}''$ and the change in posture $\Delta q^{o}{}_{t}{}''$ of the manipulation target object as learned data.

That is, the agent specifies, from the position table (FIG. 19), a position field where the index #d, which is obtained by discretizing the position $s^{m}{}_{t}{}''$ of the hand as learned data, is allotted.

Further, the agent specifies, from the frequency table (FIG. 20) included in the position field where the index d, which is obtained by discretizing the position $s^{m}{}_{t}{}''$ of the hand as the learned data, is allotted, a frequency field where the indexes #d, #j, and #h, which are respectively obtained by discretizing the change in position $\Delta s^{m}{}_{t}{}''$ of the hand, and the change in position $s^{m}{}_{t}{}''$ and the change in posture $\Delta q^{o}{}_{t}{}''$ of the manipulation target object as learned data, are allotted as a frequency field to be updated (hereinafter also referred to as an update target field).

The agent then applies only one increment to a frequency stored in the frequency field that is an update target field, i.e., a frequency of appearance of (the indexes #d, #j, #k, and #h obtained by discretizing) the position $s^{m}{}_{t}{}''$ and the change in position $\Delta s^{m}{}_{t}{}''$ of the hand, and the change in position $\Delta s^{o}{}_{t}{}''$ and the change in posture $\Delta q^{o}{}_{t}{}''$ of the manipulation target object as the learned data.

The frequency of appearance of the position $s^{m}{}_{t}{}''$ and the change in position $\Delta s^{m}{}_{t}{}''$ of the hand, and the change in position $\Delta s^{o}{}_{t}{}''$ and the change in posture $\Delta q^{o}{}_{t}{}''$ of the manipulation target object which is stored in the frequency field of the frequency table refers to the frequency (number of times) $N(\Delta s^{o}{}_{t}{}'', \Delta q^{o}{}_{t}{}'', s^{m}{}_{t}{}'', \Delta s^{m}{}_{t}{}'')$ that the change in position $\Delta s^{o}{}_{t}{}''$ and the change in posture $\Delta q^{o}{}_{t}{}''$ of the manipulation target object occurred when the hand at the position $s^{m}{}_{t}{}''$ moves by the change in position $\Delta s^{m}{}_{t}{}''$ in the object reference coordinate system O''.

If it is assumed that the frequency (number of times) that the hand at the position $s^{m}{}_{t}{}''$ moved by the change in position $\Delta s^{m}{}_{t}{}''$ irrespective of the change in position $\Delta s^{o}{}_{t}{}''$ and the change in posture $\Delta q^{o}{}_{t}{}''$ of the manipulation target object is expressed as $N(s^{m}{}_{t}{}'', \Delta s^{m}{}_{t}{}'')$, a probability $P(\Delta s^{o}{}_{t}{}'', \Delta q^{o}{}_{t}{}''|s^{m}{}_{t}{}'', \Delta s^{m}{}_{t}{}'')$ of the change in position $\Delta s^{o}{}_{t}{}''$ and the change in posture $\Delta q^{o}{}_{t}{}''$ occurring in the manipulation target object when the position of the hand changes by $\Delta s^{m}{}_{t}{}''$ from the position $s^{m}{}_{t}{}''$ may be calculated in accordance with Formula (46).

$$P(\Delta s^{o''}_t, \Delta q^{o''}_t \mid s^{m''}_t, \Delta s^{m''}_t) = \frac{N(\Delta s^{o''}_t, \Delta q^{o''}_t, s^{m''}_t, \Delta s^{m''}_t)}{N(s^{m''}_t, \Delta s^{m''}_t)} \quad (46)$$

In the frequency fields, the probability $P(\Delta s^{o}{}_{t}{}'', \Delta q^{o}{}_{t}{}''|s^{m}{}_{t}{}'', \Delta s^{m}{}_{t}{}'')$ may be stored together with the frequency $N(\Delta s^{o}{}_{t}{}'', \Delta q^{o}{}_{t}, s^{m}{}_{t}{}'', \Delta s^{m}{}_{t}{}'')$.

As described in the foregoing, the manipulation model includes the frequency table constituted from the frequency fields which store the frequency of appearance of (the index #j obtained by discretizing) the position $s^{m}{}_{t}{}''$ and the change in position (state) $\Delta s^{m}{}_{t}{}''$ of the hand when the state (position) of the hand is changed in (the index #d obtained by discretizing) each position $s^{m}{}_{t}{}''$ in the object reference coordinate system O'', and the change in position $\Delta s^{o}{}_{t}{}''$ and the change in posture $\Delta q^{o}$ of the manipulation target object (each discretized into the indexes #k and #h).

The agent performs (additional) learning of the manipulation model by incrementing the frequency stored in the frequency field of the frequency table corresponding to the position $s^{m}{}_{t}{}''$, the change in position $\Delta s^{m}{}_{t}{}''$, the change in position $\Delta s^{o}{}_{t}{}''$, and the change in posture $\Delta q^{o}{}_{t}$ when a specified change in position $\Delta s^{m}{}_{t}{}''$ occurs in the hand at a specified position $s^{m}{}_{t}{}''$ on the object reference coordinate system O'', and thereby a specified change in position $\Delta s^{o}{}_{t}{}''$ and a change in posture $\Delta q^{o}{}_{t}$ occur in the manipulation target object, i.e., the frequency of the specified change in position $\Delta s^{o}{}_{t}{}''$ and the change in posture $\Delta q^{o}{}_{t}$ caused in the manipulation target object by specified change in state $\Delta s^{m}{}_{t}{}''$ of the hand occurred at a specified position $s^{m}{}_{t}{}''$.

As a result, in the manipulation model, at each position $s^{m}{}_{t}{}''$ in the object reference coordinate system O'' with the manipulation target object as a reference, a position $s^{m}{}_{t}{}''$ and a change in position (state) $\Delta s^{m}{}_{t}{}''$ of the hand when the state of the hand is changed from the position $s^{m}{}_{t}{}''$ by the specified change in position $\Delta s^{m}{}_{t}{}''$ is associated with a change in position $\Delta s^{o}{}_{t}{}''$ and a change in posture $\Delta q^{o}{}_{t}$ as a change in state of the manipulation target object caused by the change in position $\Delta s^{m}{}_{t}{}''$ of the hand.

Specifically, in the manipulation model, it becomes possible to acquire a possibility (probability) of the change in position $\Delta s^{o}{}_{t}{}''$ and the change in posture $\Delta q^{o}{}_{t}$ occurring in the manipulation target object when the hand moves by a specified change in position $\Delta s^{m}{}_{t}{}''$ from the position $s^{m}{}_{t}{}''$ on the object reference coordinate system O''.

By use of the manipulation model as described in the foregoing, the agent determines an action of the hand as shown below.

That is, as explained in FIG. 15 and Formulas (39) through (41), it is assumed, for example, that a target change in state $dz^{o,tgt}{}_{t}{}''$ on the object reference coordinate system O'' for changing the manipulation target object from a current state to a target state has been calculated.

Based on the target state change $dz^{o,tgt}{}_{t}{}''$, the agent calculates, for example, a value, which is larger in proportion as the magnitude of a target change in position $ds^{o,tgt}{}_{t}{}''$ or a target change in posture $dq^{o,tgt}{}_{t}{}''$ which is a component of the target change in state $dz^{o,tgt}{}_{t}{}''$ (Formula (41)), as the number of actions (hereinafter also referred to as the number of times for achievement) $T_{tgt}$ performed to achieve the target change in state $dz^{o,tgt}{}_{t}{}''$.

Further, the agent divides the target change in state $dz^{o,tgt}{}_{t}{}''$ in accordance with Formula (47) based on the number of times for achievement $T_{tgt}$ so as to calculate a change in state $\Delta z^{o,tgt}{}_{t}{}''$ per unit time $\Delta t$ for achieving the target change in state $dz^{o,tgt}{}_{t}{}''$ with the number of times for achievement $T_{tgt}$, as an amount of change (hereinafter also referred to as a unit change amount) in state of the manipulation target object used at current time t for making the state $z^{o}{}_{t}$ of the manipulation target object equal to the target state $z^{o,tgt}{}_{t}$.

$$\Delta z_t^{o,tgt''} = \frac{1}{T_{tgt}} dz_t^{o,tgt''} = \frac{1}{T_{tgt}} \begin{bmatrix} ds_t^{o,tgt''} \\ dq_t^{o,tgt''} \end{bmatrix} \quad (47)$$

Note that, as the number of times for achievement $T_{tgt}$, not only the value calculated in proportion as the magnitude of the target change in state $dz_t^{o,tgt''}$, but also a predetermined fixed value may also be adopted for example.

Once the unit change amount $\Delta z_t^{o,tgt''}=(ds_t^{o,tgt''}/T_{tgt}, dq_t^{o,tgt''}/T_{tgt})$ of Formula (47) is calculated, the agent determines, as an action $u_t^{m''}$ of the hand, a position $s_t^{m''}$ and a change in position (state) $\Delta s_t^{m''}$ of the hand on the object reference coordinate system O'' having the highest frequency (probability) of causing the change in position $ds_t^{o,tgt''}/T_{tgt}$ and the change in posture $dq_t^{o,tgt''}/T_{tgt}$ as the change in state by unit change amount $\Delta z_t^{o,tgt''}$ in the manipulation target object by use of the manipulation model and in accordance with Formula (48).

$$(s_t^{m''*}, \Delta s_t^{m''*}) = \underset{s_t^{m''}, \Delta s_t^{m''}}{\operatorname{argmax}} P\left( \frac{ds_t^{o,tgt''}}{T_{tgt}}, \frac{dq_t^{o,tgt''}}{T_{tgt}} \Bigg| s_t^{m''}, \Delta s_t^{m''} \right) \quad (48)$$

In Formula (48), argmax represents calculation of $s_t^{m''}$ and $\Delta s_t^{m''}$ which maximize a probability $P(\Delta s_t^{o''}=ds_t^{o,tgt''}/T_{tgt}, \Delta q_t^{o''}=dq_t^{o,tgt''}/T_{tgt}|s_t^{m''},\Delta s_t^{m''})$, and $s_t^{m''*}$ and $\Delta s_t^{m''*}$ respectively represent $s_t^{m''}$ and $\Delta s_t^{m''}$ which maximize a probability $P(\Delta s_t^{o''}=ds_t^{o,tgt''}/T_{tgt}, \Delta q_t^{o''}=dq_t^{o,tgt''}/T_{tgt}|s_t^{m''},\Delta s_t^{m''})$.

Since the action $u_t^{m''}$ determined by use of the manipulation model is an action expressed on the object reference coordinate system O'', the agent converts the action $u_t^{m''}$ on the object reference coordinate system O'' into an action $u_t^m$ on the world coordinate system O in accordance with Formula (38), and causes the hand to perform the action $u_t^m$.

Herein, in the case of calculating an action that achieves a certain target change in state by solving an inverse model of the forward model which receives an input of a hand action and outputs a change in state of the manipulation target object, a plurality of action candidate are generally present for the action that achieves the certain target change in state, and this applies to the case of using the manipulation model of the technology.

However, even when a plurality of actions are present as the action of the hand that causes a specified change in state in the manipulation target object, it is very rare, in learning of the manipulation model, that each of a plurality of the actions are generated the same number of times (at the same frequency) for the specified change in state of the manipulation target object.

In other words, even when a plurality of actions are present as the action of the hand that causes a specified change in state in the manipulation target object, the frequency that each of a plurality of the actions, which are acquired in learning of the manipulation model and cause a specified change in state, are varied.

In the manipulation model, therefore, selecting an action of the hand having the highest frequency of causing a specified change in state in the manipulation target object makes it possible to determine, out of a plurality of actions (a plurality of solutions), one action (one solution) as the action to be performed by the hand even when a plurality of the actions are present as the action that causes the specified change in state.

Note that in the manipulation model, if a plurality of sets of the position $s_t^{m''}$ and the change in position $\Delta s_t^{m''}$ of the hand on the object reference coordinate system O'' having the highest frequency of causing the change in position $ds_t^{o,tgt''}/T_{tgt}$ and the change in posture $dq_t^{o,tgt''}/T_{tgt}$ as the change in state by unit change amount $\Delta z_t^{o,tgt''}=(ds_t^{o,tgt''}/T_{tgt},dq_t^{o,tgt''}/T_{tgt})$ of Formula (47), in the manipulation target object are present, the agent selects, for example, one set at random out of a plurality of these sets and determines, as an action $u_t^{m''}$ of the hand, the position $s_t^{m''}$ and the change in position $\Delta s_t^{m''}$ of the hand that constitute the one set.

Further in the manipulation model in the present embodiment, the position $s_t^{m''}$ and the change in position $\Delta s_t^{m''}$ of the hand, and the change in position $\Delta s_t^{o''}$ and the change in posture $\Delta q_t^{o''}$ of the manipulation target object are respectively discretized into and treated as indexes #d, #j, #k, and #h. Accordingly, determination of the action $u_t^{m''}$ of the hand by the agent is precisely made by use of the indexes #d, #j, #k, and #h.

Specifically, the agent discretizes the change in position $ds_t^{o,tgt''}/T_{tgt}$ and the change in posture $dq_t^{o,tgt''}/T_{tgt}$ as the change in state by unit change amount $\Delta z_t^{o,tgt''}$ into indexes #k and #h, respectively.

Now, if the indexes #k and #h which are obtained as a result of discretization of the change in position $ds_t^{o,tgt''}/T_{tgt}$ and the change in posture $dq_t^{o,tgt''}/T_{tgt}$ as the change in state by unit change amount $\Delta z_t^{o,tgt''}$ of the target change in state $dz_t^{o,tgt''}$ are expressed as #k* and #h*, respectively, the agent selects, out of frequency fields whose index #k and #h have a value of #k* and #h*, a frequency field (hereinafter also referred to as a maximum frequency field) which stores the maximum frequency in the manipulation model (FIG. 20).

Now, the index #d and #j which are obtained by discretizing the position $s_t^{m''}$ and the change in position $\Delta s_t^{m''}$ of the hand and which are allocated to the maximum frequency field are expressed as #d* and #j*.

The agent determines a representative value (such as an average value and a position with a minimum or maximum x'' and y'' coordinates) in the range of the positions (positions on the object reference coordinate system O'') of the hand discretized into index #d* as the position $s_t^{m''}$ serving as a component of the action $u_t^{m''}$ of the hand.

Further, the agent determines a representative value such as an average value and a minimum or maximum change in position) in the range of changes in position (changes in position in the object reference coordinate system O'') of the hand discretized into index #j* as the change in position $\Delta s_t^{m''}$ serving as a component of the action $u_t^{m''}$ of the hand.

Note that in the present embodiment, the change in position $\Delta s_t^{m''}$ of the hand is converted into an angle in the range of $-\pi$ through $\pi$ by a function arctan 2 ($\Delta s_t^{m''}$), and the angle is discretized into an index #j. Therefore, a representative value in the range of changes in position of the hand discretized into the index #j and by extension, a change in position $\Delta s_t^{m''}$ determined as the action $u_t^{m''}$ of the hand have only a direction (angle) and does not have magnitude.

Accordingly, the agent adopts, for example, a predetermined specified magnitude as the magnitude of the change in position $\Delta s_t^{m''}$ determined by the action $u_t^{m''}$ of the hand.

[Chapter 5 One Embodiment of Agent with the Technology Applied Thereto]

Figure 21:
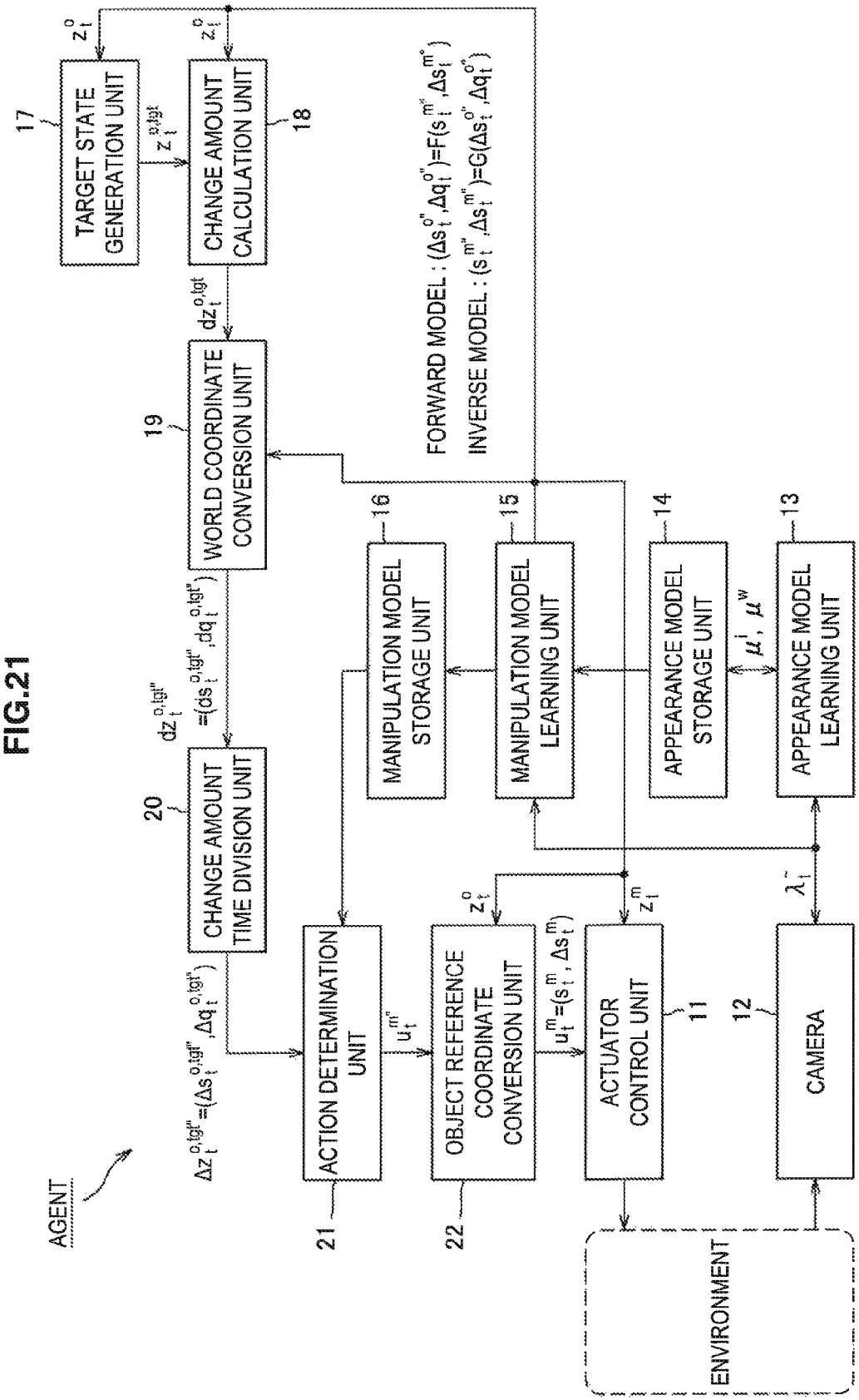
FIG. 21 is a block diagram showing a configuration example of one embodiment of an agent to which the technology is applied.

FIG. 21 is a block diagram showing a configuration example of one embodiment of the agent with the technology applied thereto.

In FIG. 21, the agent has an actuator control unit 11, a camera 12, an appearance model learning unit 13, an appearance model storage unit 14, a manipulation model learning unit 15, a manipulation model storage unit 16, a target state generation unit 17, a change amount calculation unit 18, a world coordinate conversion unit 19, a change amount time division unit 20, an action determination unit 21, and an object reference coordinate conversion unit 22.

The actuator control unit 11 receives a (current) state $z^i_t$ of the foreground #i supplied from the manipulation model learning unit 15 and an action $u^m_t$ of the hand on the world coordinate system O supplied from the object reference coordinate conversion unit 22.

Based on the state $z^m_t$ of the hand (foreground #m), which is included in the state $z^i_t$ of the foreground #i from the manipulation model learning unit 15, and the action $u^m_t$ from the object reference coordinate conversion unit 22, the actuator control unit 11 controls, for example, an actuator which drives an arm and the like of the agent, by which the hand attached to the top end of the arm performs the action $u^m_t$.

Specifically, the hand is moved from a current position $s^m_t$ as the state $z^m_t$ of (the foreground #m of) the hand, which is included in the state $z^i_t$ of the foreground #i supplied from the manipulation model learning unit 15, to the position (state) $s^m_t$ that is a component of the action $u^m_t$ supplied from the object reference coordinate conversion unit 22.

The hand is then moved from the current position, that is, the position $s^m_t$ which is a components of the action $u^m_t$ supplied from the object reference coordinate conversion unit 22 by a change in position (state) $\Delta s^m_t$ which is also a component of the action $u^m_t$ supplied from the object reference coordinate conversion unit 22.

The camera 12 takes an image of an environment in which the agent is placed at a specified frame rate, and supplies the image to the appearance model learning unit 13 and the manipulation model learning unit 15 as an observation value (actual image) $\tilde{\lambda}_t$ of an image that the agent can observe.

The appearance model learning unit 13 performs learning (learning of an appearance model) of a foreground appearance model $u^i$ and a background appearance model $\mu^w$ stored in the appearance model storage unit 14 by use of the actual image $\tilde{\lambda}_t$ from the camera 12.

The appearance model storage unit 14 stores the foreground appearance model $u^i$ and the background appearance model $\mu^w$ which are learned by the appearance model learning unit 13.

The manipulation model learning unit 15 learns the manipulation model stored in the manipulation model storage unit 16 by use of the actual image $\tilde{\lambda}_t$ from the camera 12, and the foreground appearance model $\mu^i$ stored in the appearance model storage unit 14 or the like.

Note that in learning of the manipulation model, the manipulation model learning unit 15 estimates a state $z^i_t$ of the foreground gi by use of the actual image $\tilde{\lambda}_t$ from the learning camera 12, and the foreground appearance model $\mu^i$ and the background appearance model $\mu^w$ stored in the appearance model storage unit 14. The state $z^i_t$ of the foreground #i estimated in the manipulation model learning unit 15 is supplied to the actuator control unit 11, the target state generation unit 17, the change amount calculation unit 18, the world coordinate conversion unit 19, and the object reference coordinate conversion unit 22.

The manipulation model storage unit 16 stores the manipulation model learned by the manipulation model learning unit 15.

The target state generation unit 17 generates a target state $z^{o,tgt}_t$ of (a foreground #o of) the manipulation target object, and supplies the generated target state to the change amount calculation unit 18.

Specifically, when the state $z^o_t$ of (the foreground #o of) the manipulation target object, which is included in the state $z^i_t$ of the foreground flu supplied from the manipulation model learning unit 15, does not match with a target state $z^{o,tgt}_t$ that was generated immediately before, i.e., when the manipulation target object is not in the target state $z^{o,tgt}_t$ that was generated immediately before, the target state generation unit 17 supplies (keeps on supplying) the target state $z^{o,tgt}_t$ generated immediately before to the change amount calculation unit 18.

On the contrary, when the state $z^o_t$ of the manipulation target object supplied from the manipulation model learning unit 15 matches with the target state $z^{o,tgt}_t$ generated immediately before, i.e., when the manipulation target object is in the target state $z^{o,tgt}_t$ that was generated immediately before, the target state generation unit 17 generates a new target state $z^{o,tgt}_t$ and supplies the new state to the change amount calculation unit 18.

Note that in the target state generation unit 17, the target state $z^{o,tgt}_t$ of the manipulation target object may be generated, for example, by operation of a user or in accordance with a specified algorithm. In addition to these, in the target state generation unit 17, the target state $z^{o,tgt}_t$ may also be generated, for example, at random.

By use of the (current) state $z^o_t$ of the manipulation target object, which is included in the state $z^i_t$ of the foreground #i supplied from the manipulation model learning unit 15 and the target state $z^{o,tgt}_t$ of the manipulation target object from the target state generation unit 17 and in accordance with Formula (40), the change amount calculation unit 18 calculates a target change in state $dz^{o,tgt}_t$ (target change in position $dq^{o,tgt}_t$ and target change in posture $dq^{o,tgt}_t$) on the world coordinate system O, and supplies the target state to the world coordinate conversion unit 19.

By calculating Formula (42) by use of the posture $q^o_t$ as the state $z^o_t$ of the manipulation target object, which is included in the state $z^i_t$ of the foreground #i supplied from the manipulation model learning unit 15, the world coordinate conversion unit 19 converts the target change in state $dz^{o,tgt}_t$ (target change in position $dsq^{o,tgt}_t$ and the target change in posture $dq^{o,tgt}_t$ on the world coordinate system O from the change amount calculation unit 18 into a target change in state $dz^{o,tgt}_t{}''$ (target change in position $dq^{o,tgt}_t{}''$ and a target change in posture $dq^{o,tgt}_t{}''$) on the object reference coordinate system O" of Formula (41), and supplies the converted state to the change amount time division unit 20.

In accordance with Formula (47), the change amount time division unit 20 divides the target change in state $dz^{o,tgt}_t{}''$ supplied from the world coordinate conversion unit 19 based on the number of times for achievement $T_{tgt}$ so as to calculate a unit change amount $\Delta z^{o,tgt}_t{}'' = (\Delta s^{o,tgt}_t{}'', \Delta q^{o,tgt}_t{}'') = (ds^{o,tgt}_t{}''/T_{tgt}, dq^{o,tgt}_t{}''/T_{tgt})$, and supplies the calculated amount to the action determination unit 21.

By using the manipulation model stored in the manipulation model storage unit 16, the action determination unit 21 determines, as an action $u^m_t{}''$ of the hand, a position $s^m_t{}''$ and a change in position $\Delta s^m_t{}''$ of the hand on the object reference coordinate system O" having the highest frequency (probability) of causing the change in position $\Delta s^{o,tgt}_t{}''=ds^{o,tgt}_t{}''/T_{tgt}$ and the change in posture $\Delta q^{o,tgt}_t{}''=dq^{o,tgt}_t{}''/T_{tgt}$, as the change in state by unit change amount $\Delta z^{o,tgt}_t{}'$ supplied from the change amount time division unit 20, in the manipulation target object, and supplies the determined action $u^m_t{}''$ to the object reference coordinate conversion unit 22.

By calculating Formula (38) by use of the posture $q^o_t$ as the state $z^o_t$ of the manipulation target object, which is included in the state $z^i_t$ of the foreground supplied from the manipulation model learning unit 15, the object reference coordinate conversion unit 22 converts the action $u^m_t{}''$ of the hand supplied from the action determination unit 21, i.e., the action $u^m_t{}''$ expressed with the object reference coordinate system O'', into the action $u^m{}_t$ expressed with the world coordinate system O, and supplies the converted action $u^m{}_t$ to the actuator control unit 11.

Figure 22:
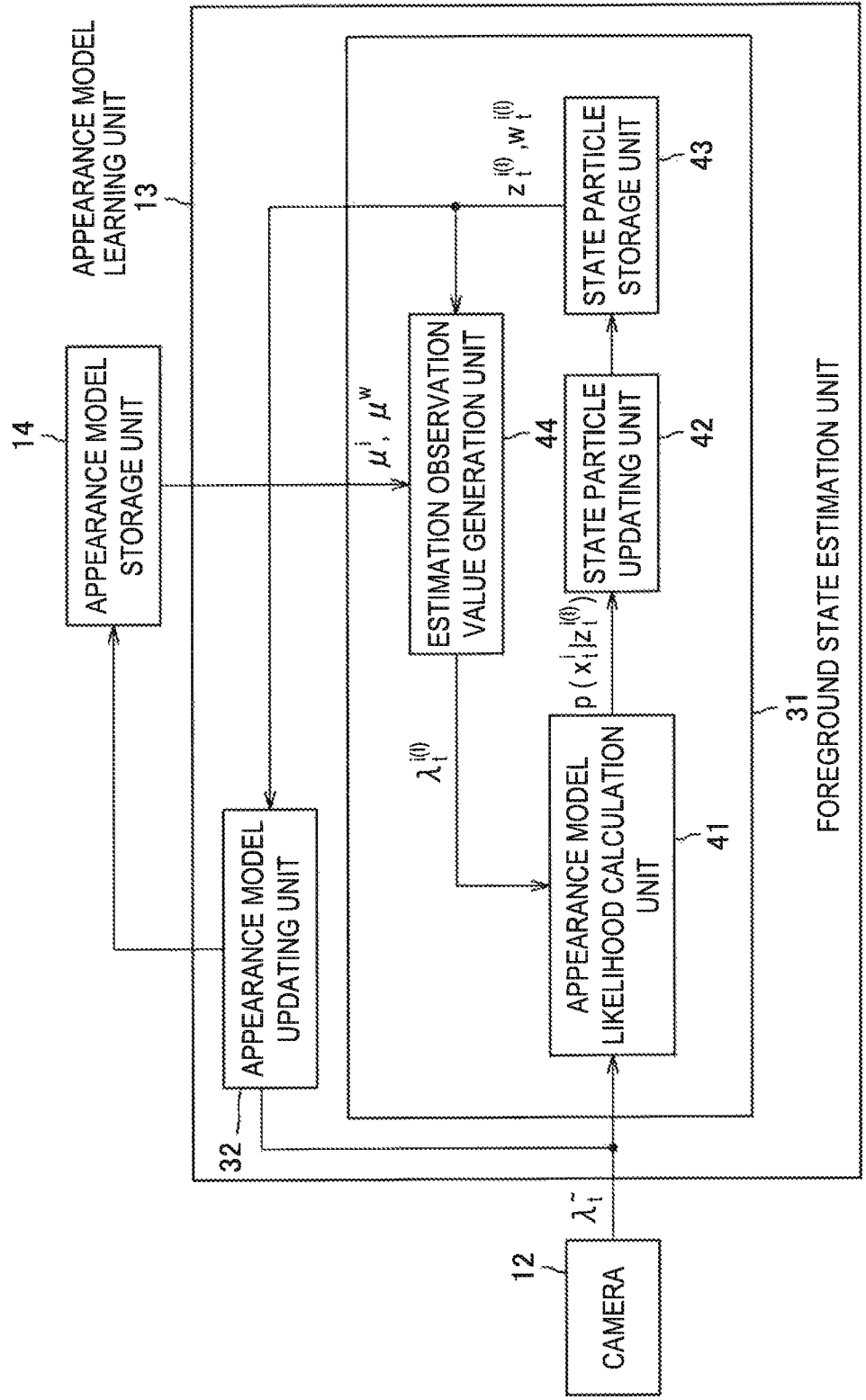
FIG. 22 is a block diagram showing a configuration example of an appearance model learning unit 13.

FIG. 22 is a block diagram showing a configuration example of the appearance model learning unit 13 of FIG. 21.

The model learning unit 13 has a foreground state estimation unit 31 and an appearance model updating unit 32.

An actual image $\tilde{\lambda}_t$ is supplied to the foreground state estimation unit 31 and the appearance model updating unit 32 from the camera 12.

The foreground state estimation unit 31 estimates the state $z^i{}_t$ of the foreground #i on the actual image $\tilde{\lambda}_t$ supplied from the camera 12 by use of the actual image $\tilde{\lambda}_t$, the foreground appearance model and the background appearance model $\mu^w$ stored in the appearance model storage unit 14, and supplies a particle $z^{i(1)}{}_t$ of the state $z^i{}_t$ and a weight $w^{i(1)}{}_t$ as a result of the estimation to the appearance model updating unit 32.

The appearance model updating unit 32 updates the foreground appearance model $\mu^i$ and the background appearance model $\mu^w$ stored in the appearance model storage unit 14 by using the actual image $\tilde{\lambda}_t$ from the camera 12, and the particle $z^{i(1)}{}_t$ of state $z^i{}_t$ and the weight $w^{i(1)}{}_t$ as a result of the estimation of the state $z^i{}_t$ of the foreground #1 supplied from the foreground state estimation unit 31.

Specifically, the appearance model updating unit 32 updates a foreground texture model $\tau^i$ in the foreground appearance model $\mu^i$ in accordance with Formulas (21) through (24), and updates a foreground shape model $\sigma^i$ in the foreground appearance model $\mu^i$ in accordance with Formulas (31) through (35).

Moreover, the appearance model updating unit 32 updates a background appearance model $\mu^w$ (background texture model $\tau^w$) in accordance with Formulas (25) through (30).

Here, in FIG. 22, the foreground state estimation unit 31 has an appearance model likelihood calculation unit 41, a state particle updating unit 42, a state particle storage unit 43, and an estimation observation value generation unit 44.

The appearance model likelihood calculation unit 41 receives an observation value (actual image) $\tilde{\lambda}_t$ of an image supplied from the camera 12 and also an observation image (image generated from the foreground appearance model $\mu^i$ and the background appearance model $z^q$ as a generation model) $\lambda^{i(1)}{}_t$ observed in the generation model supplied from the estimation observation value generation unit 44.

By use of an actual image $\tilde{\lambda}_t$ from the camera 12, and an observation image $\lambda^{i(1)}{}_t$ from the estimation observation value generation unit 44 and in accordance with Formula (19), the appearance model likelihood calculation unit 41 calculates an observation likelihood $p(x^i{}_t|z^{i(1)}{}_t)$ of an observation value $x^i{}_t$ of a foreground #i of interest when the foreground #i is in a state $z^{i(1)}{}_t$ as a particle, and supplies the calculated likelihood to the state particle updating unit 42.

The state particle updating unit 42 performs prediction (calculation) of particle transition destination which is to calculate the particle $z^{i(1)}{}_t$ as a state $z^i{}_t$ at next time t based on a state $z^{i(1)}{}_{t-1}$ as a particle at time t−1 stored in the state particle storage unit 43 in accordance with Formula (18).

The state particle updating unit 42 supplies the particle $z^{i(1)}{}_t$ as the state $z^i{}_t$ at next time t to the state particle storage unit 43, and stores the particle $z^{i(1)}{}_t$ therein in place of the state $z^{i(1)}{}_{t-1}$ at time t−1 as a particle.

Further, the state particle updating unit 42 calculates a weight $w^{i(1)}{}_t$ of the particle $z^{i(1)}{}_t$ in accordance with Formula (12) by use of the observation likelihood $p(x^i{}_t|z^{i(1)}{}_t)$ from the appearance model likelihood calculation unit 41, and the calculated weight $w^{i(1)}{}_t$ is supplied to and stored in the state particle storage unit 43 as in the case of the particle $z^{i(1)}{}_t$.

Further, the state particle updating unit 42 performs resampling that is to select a particle $z^{i(1)}{}_t$ with a probability corresponding to the weight $w^{i(1)}{}_t$ of the particle $z^{i(1)}{}_t$, and rewrites the particle $z^{i(1)}{}_t$ stored in the state particle storage unit 43 with the resampled result.

The particle $z^{i(1)}{}_t$ as a resampling result is used for predicting a particle $z^{i(1)}{}_{t+1}$ as a state $z^i{}_{t-1}$ at time t+1 in accordance with Formula (18) after an observation likelihood $p(x^i{}_{t+1}|z^{i(1)}{}_{t+1})$ at next time t+1 is obtained.

The state particle storage unit 43 stores the particle $z^{i(1)}{}_t$ as the state $z^i{}_t$ of the foreground and the weight $w^{i(1)}{}_t$ thereof which are updated by the state particle updating unit 42.

By using the foreground appearance model $\mu^i$ and the background appearance model $\mu^w$ stored in the appearance model storage unit 14, the estimation observation value generation unit 44 generates an observation image (image observed in the generation model) $\lambda^{i(1)}{}_t$ in which the foreground is in the state $z^{i(1)}{}_t$ as each particle stored in the state particle storage unit 43 in accordance with Formula (20), and supplies the observation image to the appearance model likelihood calculation unit 41.

Figure 23:
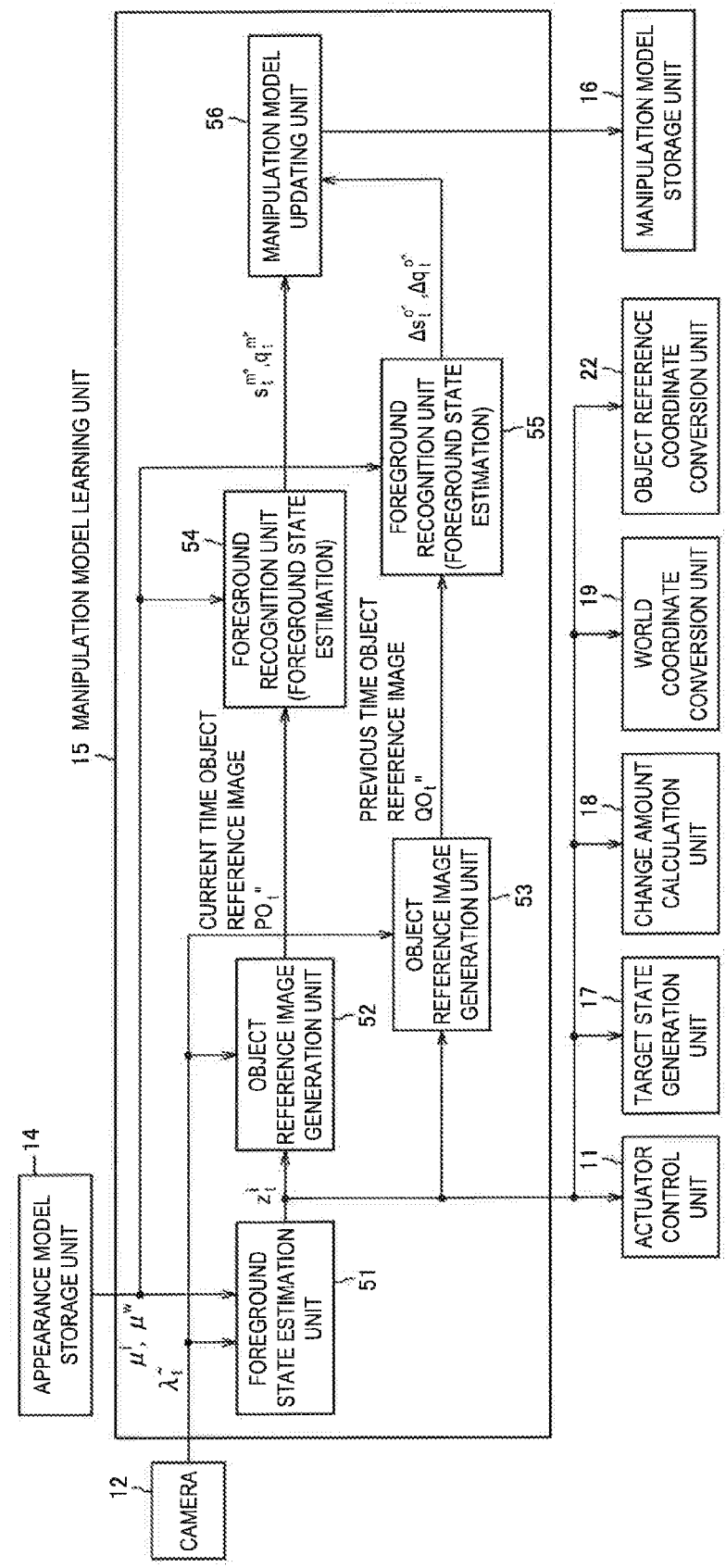
FIG. 23 is a block diagram showing a configuration example of a manipulation model learning unit 15.

FIG. 23 is a block diagram showing a configuration example of the manipulation model learning unit 15 of FIG. 21.

The manipulation model learning unit 15 has a foreground state estimation unit 51, object reference image generation units 52 and 53, foreground recognition units 54 and 55, and a manipulation model updating unit 56.

The foreground state estimation unit 51 and the object reference image generation units 52 and 53 receive an actual image $\tilde{\lambda}_t$ supplied from the camera 12.

The foreground state estimation unit 51 is configured in the same way as in the case of the foreground state estimation unit 31 of FIG. 22.

Like the foreground state estimation unit 31 of FIG. 22, the foreground state estimation unit 51 estimates the state $z^i{}_t$ of the foreground #i on the actual image $\tilde{\lambda}_t$ supplied from the camera 12 by use of the actual image $\tilde{\lambda}_t$, the foreground appearance model $\mu^i$ and the background appearance model $\mu^w$ stored in the appearance model storage unit 14.

The foreground state estimation unit 51 then supplies the state $z^i{}_t$ of the foreground #i to the actuator control unit 11, the target state generation unit 17, the change amount calculation unit 18, the world coordinate conversion unit 19, and the object reference coordinate conversion unit 22.

Note that, in the foreground state estimation unit 51 like the foreground state estimation unit 31 of FIG. 22, the state $z^i{}_t$ of the foreground #i on the actual image $\tilde{\lambda}_t$ from the camera 12 is estimated, and as a result of the estimation, L particles $z^{i(1)}{}_t$ of the state $z^i{}_t$ and their weight $w^{i(1)}{}_t$ are calculated.

For example, the foreground state estimation unit 51 calculates a weighted average value of L particles $z^{i(1)}{}_t$ by using the weight $w^{i(1)}{}_t$ of the particles $z^{i(1)}{}_t$ as a weight, and outputs the weighted average value of the L particles $z^{i(1)}{}_t$ as a (maximum likelihood) state $z^i{}_t$ of the foreground #i.

In this case, the foreground state estimation unit 51 is configured in the similar way as in the foreground state estimation unit 31 of FIG. 22, and so the same processing is performed. Accordingly, it suffices that any one of the foreground state estimation unit 51 and the foreground state estimation units 31 of FIG. 22 is provided in actuality.

As described in FIGS. 16 and 17, the object reference image generation unit 52 generates a current time object reference image $PO_t''$ by cutting, from an actual image $\tilde{\lambda}_t$ of current time t supplied from the camera 12, a specified range on the basis of an object reference coordinate system $O_t"$ of current time t that is based on the manipulation target object included in the actual image $\lambda^\sim_t$ of current time t, and rotating the specified range so that an inclination of the object reference coordinate system $O_t"$ of current time t becomes 0, and supplies the generated image to the foreground recognition unit 54.

Specifically, the object reference image generation unit 52 adopts, for example, a position $s^o_t$, which is included in the state $z^o_t$ of (the foreground #o of) the manipulation target object of (current) time t, included in the state $z^i_t$ of the foreground #i from the foreground state estimation unit 51, as a centroid of the manipulation target object of current time t, while adopting a posture $q^o_t$, among the states $z^o_t$ of the manipulation target object, also as the posture of the manipulation target object of current time t, and cuts a rectangular specified range, which has a centroid $s^o_t$ of the manipulation target object of current time t as a center and which is inclined with respect to the world coordinate system O by posture $q^o_t$ of the manipulation target object of current time t, from the actual image $\lambda^\sim_t$ as an inclined image.

The object reference image generation unit 52 then generates a current time object reference image $PO_t"$ by rotating the inclined image so that an inclination of the object reference coordinate system $O_t"$ at current time t (posture $q^o_t$ of the manipulation target object at current time t) becomes 0.

As described in FIGS. 16 and 17, the object reference image generation unit 53 generates a previous time object reference image $QO_t"$ by cutting, from an actual image $\lambda^\sim_t$ of current time t supplied from the camera 12, a specified range on the basis of an object reference coordinate system $O_{t-\Delta t}"$ at previous time t–$\Delta$t that is based on the manipulation target object included in the actual image $\lambda^\sim_t$ at previous time t–$\Delta$t that is a time immediately before the current time t, and rotating the specified range so that an inclination of the object reference coordinate system $O_{t-\Delta t}"$ at previous time t–$\Delta$t becomes 0, and supplies the generated image to the foreground recognition unit 55.

Specifically, the object reference image generation unit 53 adopts, for example, a position $s^o_{t-\Delta t}$, which is included in the state $z^o_{t-\Delta t}$ of (the foreground #o of) the manipulation target object at previous time t–$\Delta$t, included in the state $z^i_{t-\Delta}$ at previous time t–$\Delta$t of the foreground #i supplied from the foreground state estimation unit 51 at previous time t–$\Delta$t, as a centroid of the manipulation target object at previous time t–$\Delta$t, while adopting a posture $q^o_{t-\Delta t}$, among the states $z^o_{t-\Delta t}$ of the manipulation target object, also as the posture of the manipulation target object at previous time t–$\Delta$t, and cuts a rectangular specified range, which has a centroid $s^o_{t-\Delta t}$ of the manipulation target object at previous time t–$\Delta$t as a center and which is inclined with respect to the world coordinate system O by posture $q^o_{t-\Delta t}$ of the manipulation target object at previous time t–$\Delta$t, from the actual image $\lambda^\sim_t$ as an inclined image.

The object reference image generation unit 52 then generates a previous time object reference image $QO_t"$ by rotating the inclined image so that an inclination of the object reference coordinate system $O_{t-\Delta t}"$ at previous time t–$\Delta$t (posture $q^o_{t-\Delta t}$ of the manipulation target object at previous time t–$\Delta$t) becomes 0.

By recognizing the hand whose foreground appearance model $\mu^m$ is stored in the appearance model storage unit 14 from the current time object reference image $PO_t"$ supplied from the object reference image generation unit 52, the foreground recognition unit 54 calculates a position and a change in position of the hand which is included in the current time object reference image $PO_t"$ as a position $s^m_t"$ and a change in position $\Delta s^m_t"$ of the hand in the object reference coordinate system O", and supplies them to the manipulation model updating unit 56 as described in FIG. 17.

Here, recognition of the hand from the current time object reference image $PO_t"$ in the foreground recognition unit 54 may be implemented by, for example, estimating a state $z^m_t"$ of the hand on the current time object reference image $PO_t"$ by use of the foreground appearance model $\mu^m$ of (the foreground #m of) the hand stored in the appearance model storage unit 14, and the like as in the case of estimating the state $z^i_t$ of the foreground #i on the actual image $\lambda^\sim_t$ in the foreground state estimation unit 51 (foreground state estimation unit 31 of FIG. 22).

Note that in the case of estimating the state $z^m_t"$ of the hand on the current time object reference image $PO_t"$ in the same way as in the foreground state estimation unit 51, not only the foreground appearance model $\mu^m$ of the hand but also a background appearance model of the background included in the current time object reference image $PO_t"$ are used. For example, out of the background appearance models $\mu^w$ stored in the appearance model storage unit 14, an image in the same range as the range of the inclined image cut as the current time object reference image $PO_t"$ by the object reference image generation unit 52 may be adopted as the background appearance model of the background included in the current time object reference image $PO_t"$.

By recognizing the manipulation target object whose foreground appearance model $\mu^o$ is stored in the appearance model storage unit 14 from the previous time object reference image $QO_t"$ supplied from the object reference image generation unit 53, the foreground recognition unit 55 calculates a position and a posture of the manipulation target object which is included in the previous time object reference image $QO_t"$ as a change in position $\Delta s^o_{t-\Delta t}"$ and a change in posture $\Delta q^o_{t-\Delta t}"$ of the manipulation target object in the object reference coordinate system O", and supplies them to the manipulation model updating unit 56 as described in FIG. 17.

Here, recognition of the manipulation target object from the previous time object reference image $QO_t"$ in the foreground recognition unit 55 may be implemented by, for example, estimating a state $z^o_t"$ of the manipulation target object on the previous time object reference image $QO_t"$ by use of the foreground appearance model $\mu^o$ of (the foreground #o of) the manipulation target object stored in the appearance model storage unit 14, and the like in the same way as in the aforementioned foreground recognition unit 54.

Note that in this case, a background appearance model of the background included in the previous time object reference image $QO_t"$ is used besides the foreground appearance model $\mu^o$ of the manipulation target object. For example, out of the background appearance model $\mu^w$ stored in the appearance model storage unit 14, an image in the same range as that of the inclined image cut as the previous time object reference image $QO_t"$ by the object reference image generation unit 53 may be adopted as a background appearance model of the background included in the previous time object reference image $QO_t"$.

By use of the position $s^m_t"$ and the change in position $\Delta s^m_t"$ of the hand in the object reference coordinate system O" supplied from the foreground recognition unit 54 and the change in position $\Delta s^o_t"$ and the change in posture $\Delta q^o_t"$ of the manipulation target object in the object reference coordinate system O" supplied from the foreground recognition unit 55 as learned data of the manipulation model, the manipulation model updating unit 56 updates the manipulation model stored in the manipulation model storage unit 16 based on the learned data.

Specifically, the manipulation model updating unit 56 discretizes the position $s^m_t$," and the change in position $\Delta s^m_t$," of the hand, and the change in position $\Delta s^o_t$," and the change in posture $\Delta q^o_t$," of the manipulation target object as learned data into indexes #d, #j, #k, and #h.

The manipulation model updating unit 56 then specifies, from the position table of the manipulation model (FIG. 19), a position field where the index which is obtained by discretizing the position $s^m_t$," of the hand as learned data, is allotted, and specifies, from the frequency table (FIG. 20) included in the position field, a frequency field where the indexes #d, #j, #k, and #h, which are respectively obtained by discretizing t the change in position $\Delta s^m_t$," of the hand, and the change in position $\Delta s^o_t$," and the change in posture $\Delta q^o_t$," of the manipulation target object as learned data, are allotted as an update target field to be updated.

The manipulation model updating unit 56 then applies only one increment to a frequency stored in the frequency field that is an update target field, i.e., a frequency of appearance of (the indexes #d, #j, #k, and #h obtained by discretizing) the position $s^m_t$," and the change in position $\Delta s^m_t$," of the hand, and the change in position $\Delta s^o_t$," and the change in posture $\Delta q^o_t$," of the manipulation target object as the learned data.

Figure 24:
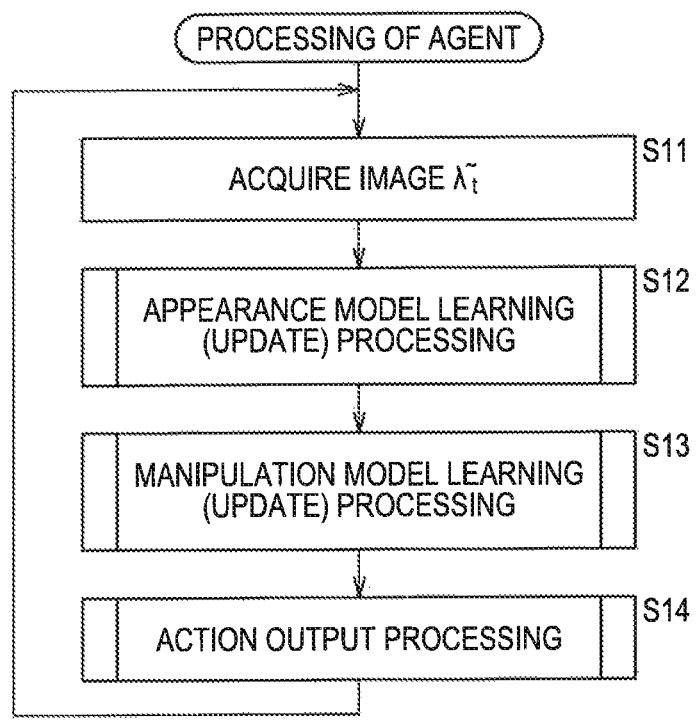
FIG. 24 is a flow chart explaining processing of the agent.

FIG. 24 is a flow chart explaining processing of the agent of FIG. 21.

In step S11, an actual image $\lambda^\sim_t$ is acquired by taking an image with the camera 12 of the agent, and the actual image $\lambda^\sim_t$ is supplied to the appearance model learning unit 13 and the manipulation model learning unit 15, by which the processing proceeds to step S12.

In step S12, the appearance model learning unit 13 performs appearance model learning processing to learn the foreground appearance model $\mu^i$ and the background appearance model $\mu^w$ stored in the appearance model storage unit 14 by use of the actual image $\lambda^\sim_t$ from the camera 12, and the processing proceeds to step S13.

In step S13, the manipulation model learning unit 15 performs manipulation model learning processing that is to learn the manipulation model stored in the manipulation model storage unit 16 by use of the actual image $\lambda^\sim_t$ from the camera 12, the foreground appearance model stored in the appearance model storage unit 15, and the like, by which the processing proceeds to step S14.

In step S14, the actuator control unit 11, and the target state generation unit 17 through the object reference coordinate conversion unit 22 perform action output processing to cause the hand to perform an action, and the process returns to step S11.

Note that in FIG. 24, the appearance model learning processing (step S12), the manipulation model learning processing (step S13), and the action output processing (step S14) are performed whenever an actual image $\lambda^\sim_t$ is taken in camera 12. However, in addition to the above procedures, it is also possible to perform, for example, the appearance model learning processing and the manipulation model learning processing by use of a sufficient number of actual images and then to perform the action output processing whenever an actual image $\lambda^\sim_t$ is taken in the camera 12.

Specifically, the appearance model learning processing and the manipulation model learning processing may be executed, in a sense, in parallel by using actual images, and this parallel execution may be repeated a sufficient number of times. Then, whenever an actual image $\lambda^\sim_t$ is taken in the camera 12, the action output processing may be performed.

Or alternatively, it is also possible to perform the appearance model learning processing by use of a sufficient number of actual images, and to perform the manipulation model teaming processing by use of a sufficient number of actual images after high-precision foreground appearance model $\mu^i$ and background appearance model are obtained, and then to perform the action output processing whenever an actual image $\lambda^\sim_t$ is taken in the camera 12.

Figure 25:
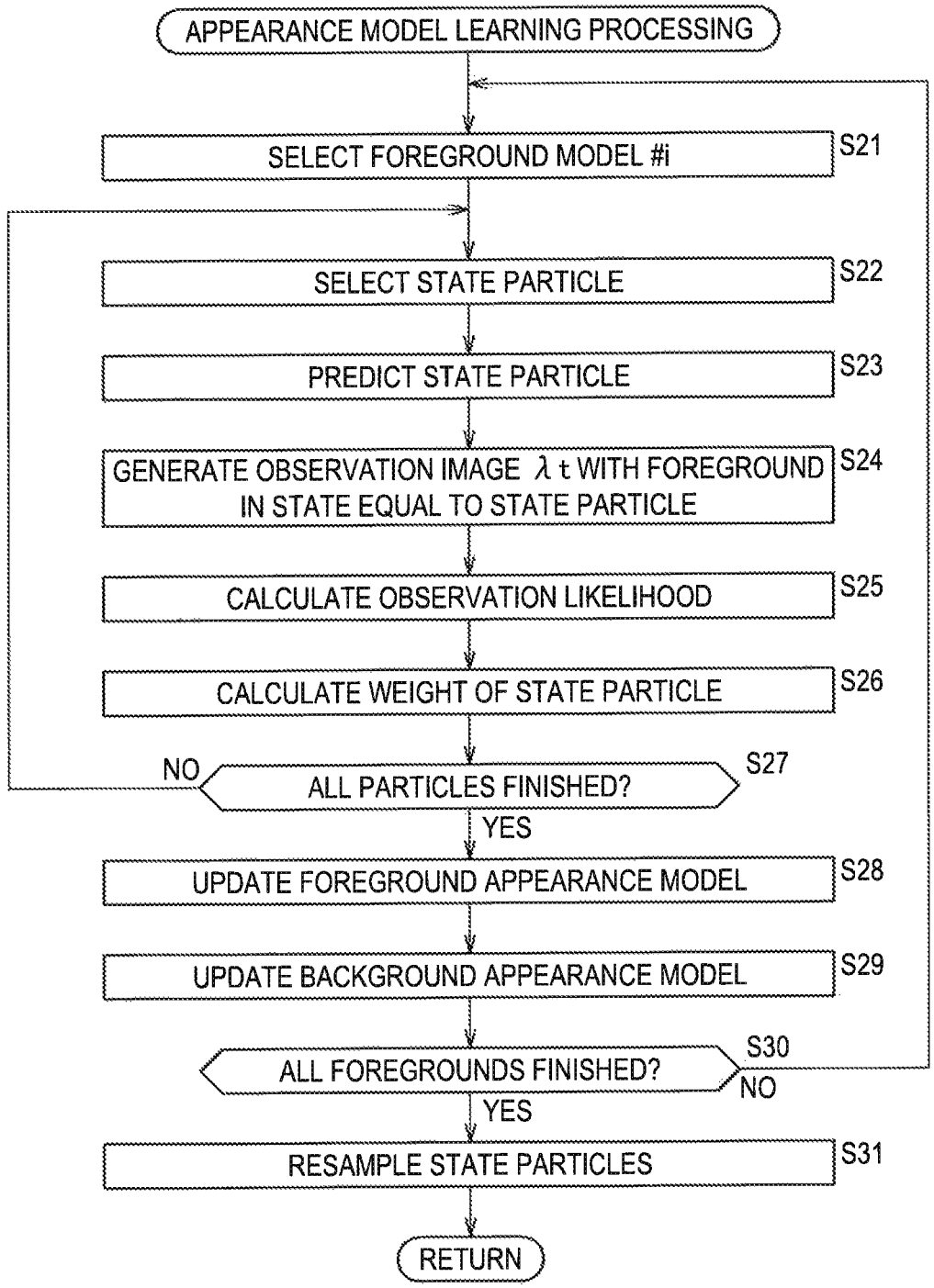
FIG. 25 is a flow chart explaining appearance model learning processing performed in step S12.

FIG. 25 is a flow chart explaining appearance model learning processing performed in step S12 of FIG. 24.

In the appearance model learning processing, the actual image $\lambda^\sim_t$ taken with the camera 12 is supplied to the foreground state estimation unit 31 and the appearance model updating unit 32 in the appearance model learning unit 13 (FIG. 22).

In step S21, the foreground state estimation unit 31 selects a foreground model #i (foreground appearance model $\mu^i$), which is not yet selected as a model of interest, as a model of interest in the actual image $\lambda^\sim_t$, and the processing proceeds to step S22.

In step S22, the state particle updating unit 42 of the foreground state estimation unit 31 selects, as a state particle of interest, one state particle $z^{i(1)}_{t-1}$ which is not yet selected as a state particle of interest, out of states (hereinafter also referred to as state particles) $z^{i(1)}_{t-1}$ through $z^{i(L)}_{t-1}$ of the foreground #i at time t−1 as L particles stored in the state particle storage unit 43, by which the processing proceeds to step S23.

In step S23, the state particle updating unit 42 predicts a state particle of interest $z^{i(1)}_t$ at time t based on the state particle of interest $z^{i(1)}_{t-1}$ stored in the state particle storage unit 43 in accordance with Formula (18).

Further, the state particle updating unit 42 supplies the state particle of interest $z^{i(1)}_t$ at time t to the state particle storage unit 43, and stores the state particle) $z^{i(1)}_t$ in place of the state particle of interest $z^{i(1)}_{t-1}$ at time t−1, by which the processing proceeds from step S23 to step S24.

In step S24, by use of the foreground appearance model $\mu_t$ and the background appearance model $\mu^w$ stored in the appearance model storage unit 14, the estimation observation value generation unit 44 in the foreground state estimation unit 31 generates an observation image (image observed in the generation model) $\lambda^{i(1)}_t$ in which the state of the foreground #i, which is a model of interest, is equal to the state particle of interest $z^{i(1)}_t$ stored in the state particle storage unit 43 in accordance with Formula (20).

The estimation observation value generation unit 44 supplies the observation image $\lambda^{i(1)}_t$ to the appearance model likelihood calculation unit 41, and the processing proceeds from step S24 to step S25.

In step S25, by use of the actual image X supplied to the foreground state estimation unit 31 from the camera 12 and the observation image $\lambda^{i(1)}_t$ from the estimation observation value generation unit 44, the appearance model likelihood calculation unit 41 calculates an observation likelihood $p(x^i_t|z^{i(1)}_t)$ of an observation value $x^i_t$ of the foreground #i when the foreground #i, which is a model of interest, is in the state $z^{i(1)}_t$ as a state particle of interest in accordance with Formula (19).

Further, the appearance model likelihood calculation unit 41 supplies the observation likelihood $p(x^i_t|z^{i(1)}_t)$ to the state particle updating unit 42, and the processing proceeds from step S25 to step S26.

In step S26, the state particle updating unit 42 calculates a weight $w^{i(1)}_t$ of the particle of interest $z^{i(1)}_t$ in accordance with Formula (12) by use of the observation likelihood $p(x^i_t|z^{i(1)}_t)$ from the appearance model likelihood calculation unit 41, and the calculated weight $w^{i(1)}_t$ is supplied to and stored in the state particle storage unit 43 in the similar way as in the case of the state particle $z^{i(1)}_t$, by which the processing proceeds to step S27.

In step S27, the state particle updating unit 42 determines whether or not all of the L state particles $z^{i(l)}_{t-1}$ through $z^{i(L)}_{t-1}$ at time t−1 which are stored in the state particle storage unit 43 have been selected as a state particle of interest.

When it is determined in step S27 that L state particles $z^{i(1)}_{t-1}$ through $s^{i(1)}_{t-1}$ have not yet been selected as a state particle of interest, the process returns to step S22, and the state particle updating unit 42 newly selects, as a state particle of interest, one state particle which is not yet selected as a state particle of interest, out of L state particles $z^{i(1)}_{t-1}$ through $z^{i(L)}_{t-1}$ state particles, by which the same process is repeated afterward.

When it is determined in step S27 that all of the L state particles through $z^{i(L)}_{t-1}$ have been selected as a state particle of interest, the processing proceeds to step S28, and the appearance model updating unit 32 uses the actual image $\tilde{\lambda}_t$ supplied from the camera 12, the state particle $z^{i(1)}_t$ at time t stored in the state particle storage unit 43 in step S23 and the weight $w^{(1)}_t$ stored in the state particle storage unit 43 in step S26 to update the foreground appearance model stored in the appearance model storage unit 14, by which the processing proceeds to step S29.

Specifically, the appearance model updating unit 32 updates a foreground texture model $\tau^i$ in the foreground appearance model $\mu^i$, in accordance with Formulas (21) through (24) and updates a foreground shape model $\sigma^i$ in the foreground appearance model $\mu^i$ in accordance with Formulas (31) through (35).

In step S29, the appearance model updating unit 32 updates the background appearance model $\mu^w$ stored in the appearance model storage unit 14 by using the actual image $\tilde{\lambda}_t$ supplied from the camera 12, the state particle $z^{i(1)}_t$ at time t stored in the state particle storage unit 43 in step S23 and the weight $w^{i(L)}_t$ stored in the state particle storage unit 43 in step S26, and the processing proceeds to step S30.

Specifically, the appearance model updating unit 32 updates the background appearance model $\mu^w$ (background texture model $\tau^w$) in accordance with Formulas (25) through (30).

In step S30, the agent determines whether or not all of N foreground models #1 through #N have been selected as a model of interest in the actual image $\tilde{\lambda}_t$.

In step S30, when it is determined that all the N foreground models #1 through #N are not yet selected as a model of interest, the process returns to step S21. In step S21, the foreground state estimation unit 31 newly selects, as a model of interest, one of the foreground models #i which have not yet been selected as a model of interest in the actual image $\tilde{\lambda}_t$, and the same process is repeated afterward.

Further, when it is determined in step S30 that all of N foreground models #1 through #N have been selected as a model of interest, the process returns to step S31, and the state particle updating unit 42 performs resampling to select the state particle $z^{i(1)}_t$ stored in the state particle storage unit 43 with a probability corresponding to the weight $w^{i(1)}_t$ similarly stored in the state particle storage unit 43, and rewrites the state particle $z^{i(l)}_t$ stored in the state particle storage unit 43 with the resampled result, by which the process is returned.

The state particle $z^{i(1)}$, obtained as a result of resampling in step S13 is used for predicting a state particle $z^{i(1)}_{t-1}$ as a state $z^i_{t-1}$ at time t+1 in accordance with Formula (18) after an observation likelihood $p(x^i_{t+1}|z^{i(1)}_{t+1})$ at next time t+1 is obtained.

In FIG. 25, the steps S22 through S27 are equivalent to the E step of the EM algorithm, while the steps S28 and S29 are equivalent to the M step of the EM algorithm.

Figure 26:
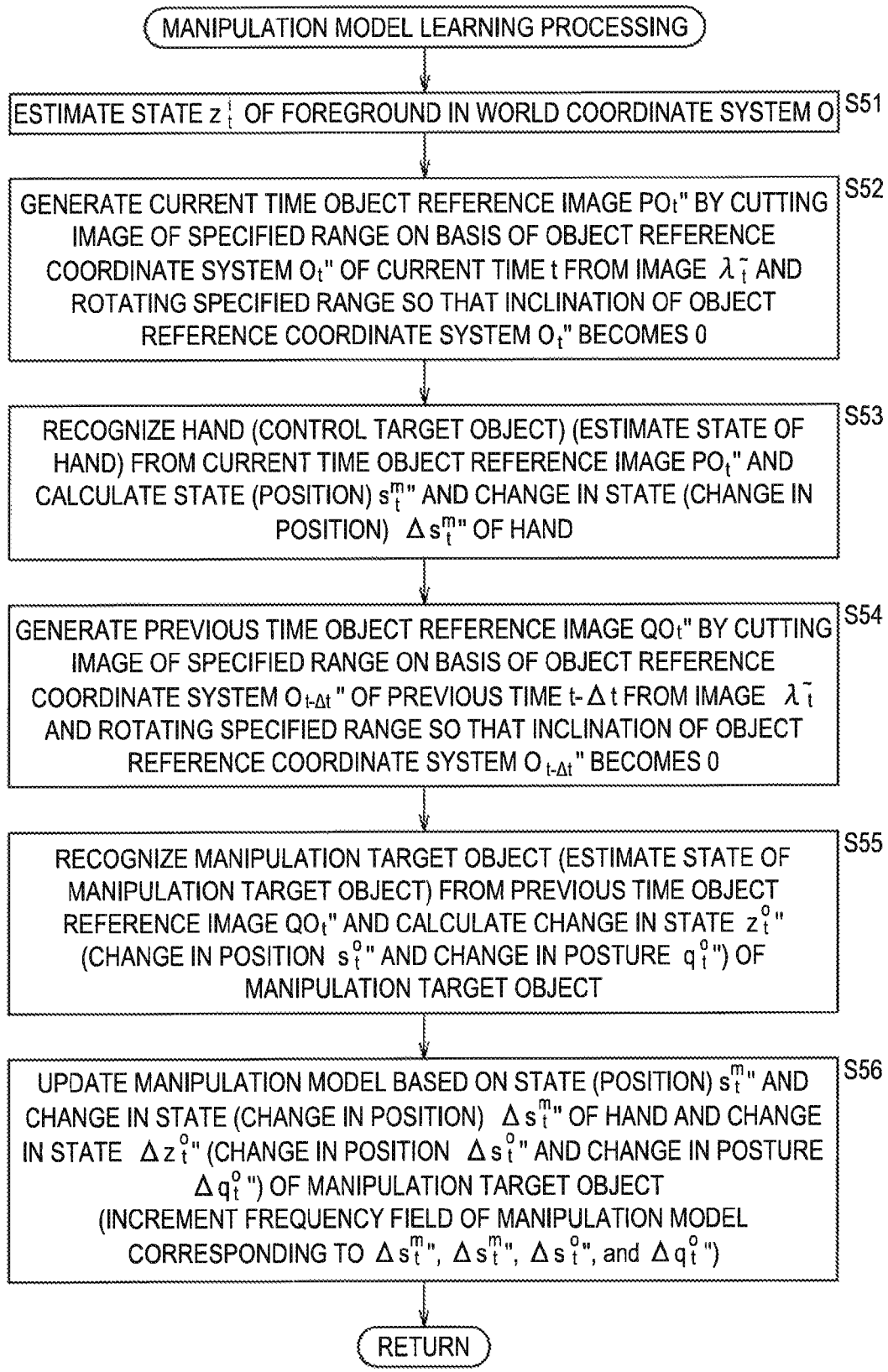
FIG. 26 is a flow chart explaining manipulation model learning processing performed in step S13.

FIG. 26 is a flow chart explaining manipulation model learning processing performed in step S13 of FIG. 24.

In the manipulation model learning processing, the actual image $\tilde{\lambda}_t$ taken with the camera 12 is supplied to the foreground state estimation unit 51 and to the object reference image generation units 52 and 53 in the manipulation model learning unit 15 (FIG. 23).

The foreground state estimation unit Si estimates the state $z^i_t$ of the foreground #i on the actual image $\tilde{\lambda}_t$ supplied from the camera 12 by use of the actual image $\tilde{\lambda}_t$ supplied from the camera 12, the foreground appearance model $\mu^i$ and the background appearance model $\mu^w$ stored in the appearance model storage unit 14, and supplies the state $z^i_t$ to the actuator control unit 11, the target state generation unit 17, the change amount calculation unit 18, the world coordinate conversion unit 19, and the object reference coordinate conversion unit 22, by which the processing proceeds to step S52.

Specifically, the foreground state estimation unit 51 like the foreground state estimation unit 31 of FIG. 22 estimates the state $z^i_t$ of the foreground #i on the actual image $\tilde{\lambda}_t$ from the camera 12 and calculates, as a result of the estimation, L particles $z^{i(1)}_t$ of the state $z^i_t$ and their weight $w^{i(1)}_t$.

Furthermore, the foreground state estimation unit 51 calculates, for example, a weighted average value of L particles $z^{i(1)}_t$ by using the weight $w^{i(l)}_t$ of the particles $z^{i(1)}_t$ as a weight. The foreground state estimation unit 51 then supplies the weighted average value of L particles $z^{i(1)}_t$ as the state $z^i_t$ of the foreground #1 to the actuator control unit 11, the target state generation unit 17, the change amount calculation unit 18, the world coordinate conversion unit 19, and the object reference coordinate conversion unit 22.

In step S52, the object reference image generation unit 52 recognizes a position $s^o_t$ and a posture $q^o_t$, which are included in the state of (the foreground #o of) the manipulation target object at current time t, included in the state $z^i_t$ of the foreground #i at current time t supplied from the foreground state estimation unit 51, as an origin and a posture of the object reference coordinate system $O_t''$ of current time t (object reference coordinate system $O''$ on the basis of the manipulation target object included in the actual image $\tilde{\lambda}_t$ of current time t).

Further, the object reference image generation unit 52 cuts as an inclined image a specified range on the basis of the object reference coordinate system $O_t''$ of current time t from the actual image $\tilde{\lambda}_t$ of current time t supplied from the camera 12 as explained in FIGS. 16 and 17.

The object reference image generation unit 52 then generates a current time object reference image $PO_t''$ by rotating the inclined image so that an inclination of the object reference coordinate system $O_t''$ of current time t becomes 0, and supplies the image to the foreground recognition unit 54, by which the processing proceeds from step S52 step to S53.

In step S53, by recognizing the hand whose foreground appearance model $\mu^m$ is stored in the appearance model storage unit 14 from the current time object reference image $PO_t''$ supplied from the object reference image generation unit 52, the foreground recognition unit 54 calculates a position $s^m_t{}''$ and a change in position $\Delta s^m_t{}''$ of the hand in the object reference coordinate system $O''$ as explained in FIG. 17, and supplies them to the manipulation model updating unit 56, by which the processing proceeds to step S54.

In step S54, the object reference image generation unit 53 recognizes a position $s^o_{t-\Delta t}$ and a posture $q^o_{t-\Delta t}$, which are included in the states $z^o_{t-\Delta}t$ of (the foreground #o of) the manipulation target object at previous time t−Δt, included in the state $z^i_{t-\Delta t}$ of the foreground #i at previous time t−Δt supplied from the foreground state estimation unit 51, as an origin and a posture of the object reference coordinate system $O_{t-\Delta t}"$ at previous time t−Δt (object reference coordinate system O" on the basis of the manipulation target object included in the actual image $\tilde{\lambda}^\sim_{t-\Delta t}$ at previous time t−Δt).

Further, the object reference image generation unit 53 cuts as an inclined image a specified range on the basis of the object reference coordinate system $O_t-\Delta t"$ at previous time t−Δt from the actual image $\tilde{\lambda}^\sim_t$ of current time t supplied from the camera 12 as explained in FIGS. 16 and 17.

The object reference image generation unit 53 then generates a previous time object reference image $QO_t"$ by rotating the inclined image so that an inclination of the object reference coordinate system $O_{t-\Delta t}"$ at previous time t−Δt becomes 0, and supplies the image to the foreground recognition unit 55, by which the processing proceeds from step S54 step to S55.

In step S55, by recognizing the manipulation target object whose foreground appearance model $\mu^o$ is stored in the appearance model storage unit 14 from the previous time object reference image $QO_t"$ supplied from the object reference image generation unit 53, the foreground recognition unit 55 calculates a change in position $\Delta s^o_t"$ and a change in posture $\Delta q^o_t"$ of the manipulation target object in the object reference coordinate system O" as explained in FIG. 17, and supplies them to the manipulation model updating unit 56, by which the processing proceeds to step S56.

In step S56, by use of the position $s^m_t"$ and the change in position $\Delta s^m_t"$ of the hand in the object reference coordinate system O" supplied from the foreground recognition unit 54 and the change in position $\Delta s^o_t"$ and the change in posture $\Delta q^o_t"$ of the manipulation target object in the object reference coordinate system O" supplied from the foreground recognition unit 55 as learned data of the manipulation model, the manipulation model updating unit 56 updates the manipulation model stored in the manipulation model storage unit 16 based on the learned data, and the process is returned.

Specifically, the manipulation model updating unit 56 updates the manipulation mode by specifying, out of frequency fields of the frequency table for the manipulation model (FIG. 20), a frequency field corresponding to the position $s^m_t"$ and the change in position $\Delta s^m_t"$ of the hand, and the change in position $\Delta s^o_t"$ and the change in posture $\Delta q^o_t"$ of the manipulation target object as learned data (a frequency field where the indexes ∩d, #j, #k, and #h, which are respectively obtained by discretizing the position $s^m_t"$ and the change in position $\Delta s^m_t"$ of the hand, and the change in position $\Delta s^o_t"$ and the change in posture $\Delta q^o_t"$ of the manipulation target object, are allotted) as an update target field to be updated, and applying one increment to the frequency stored in the update target field.

Figure 27:
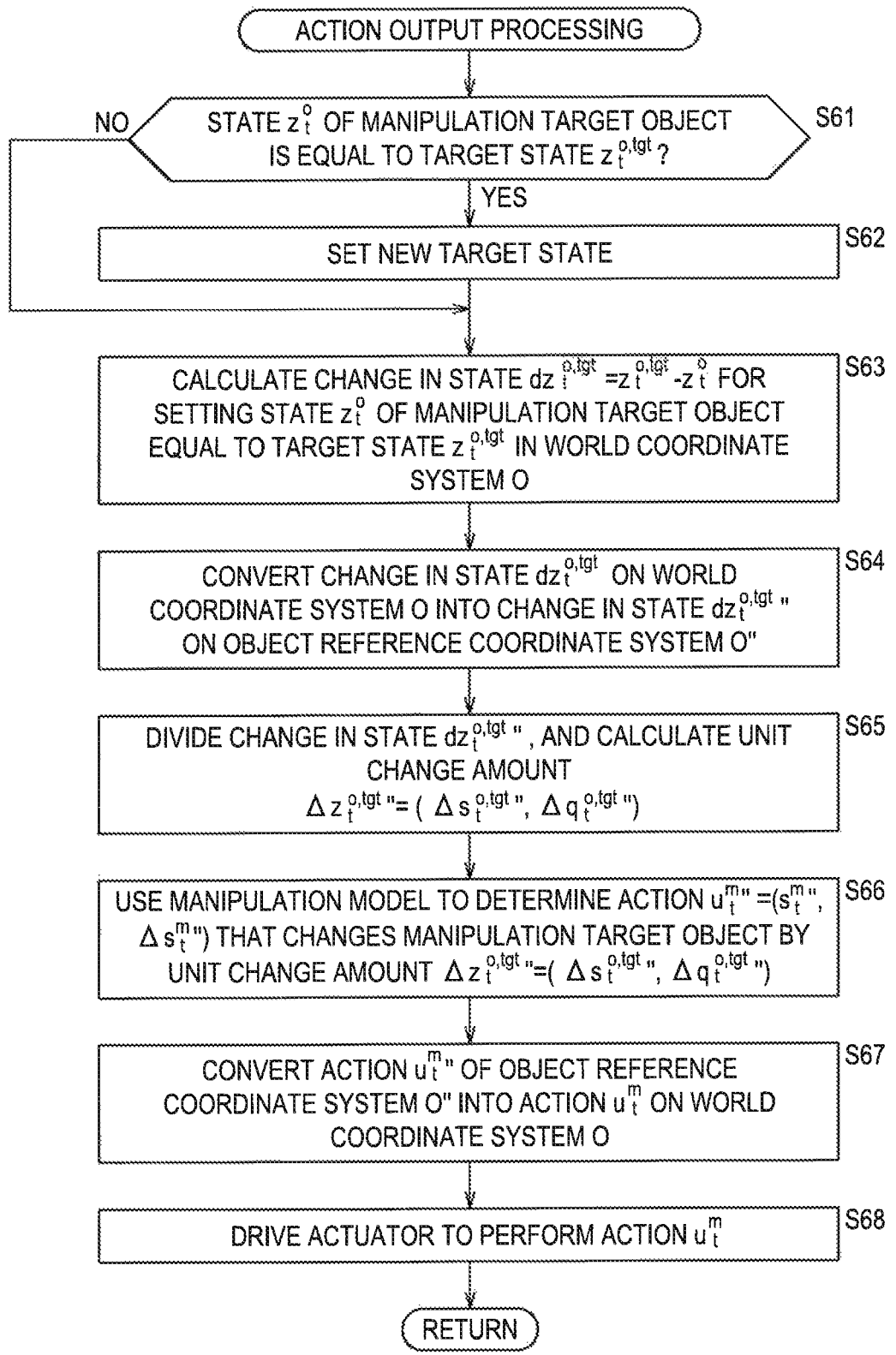
FIG. 27 is a flow chart explaining action output processing performed in step S14.

FIG. 27 is a flow chart explaining action output processing performed in step S14 of FIG. 24.

Upon reception of the state $z^i_t$ of each foreground #i supplied from the manipulation model learning unit 15, the target state generation unit 17 determines in step S61 whether or not a state $z^o_t$ of (the foreground #o of) the manipulation target object, which is included in the state $z^i_t$ of each foreground #i, matches with a target state $z^{o,tgt}_t$ generated immediately before.

When it is determined in step S61 that the state $z^o_t$ of the manipulation target object matches with the target state $z^{o,tgt}_t$ generated immediately before, i.e., when the manipulation target object is in the target state $z^{o,tgt}_t$ generated immediately before, the processing proceeds to step S62, where the target state generation unit 17 generates a new target state $z^{o,tgt}_t$ and supplies the new state to the change amount calculation unit 18, by which the processing proceeds to step S63.

When it is determined in step S61 that the state $z^o_t$ of the manipulation target object does not match with the target state $z^{o,tgt}_t$ generated immediately before, i.e., when the manipulation target object is not in the target state $z^{o,tgt}_t$ generated immediately before, the target state generation unit 17 supplies (keeps on supplying) the target state $z^{o,tgt}_t$ generated immediately before to the change amount calculation unit 18, and the process skips step S62 and proceeds to step S63.

In step S63, by use of the (current) state $z^o_t$ of the manipulation target object, which is included in the state $z^i_t$ of the foreground #i supplied from the manipulation model learning unit 15, and the target state $z^{o,tgt}_t$ of the manipulation target object from the target state generation unit 17 and in accordance with Formula (40), the change amount calculation unit 18 calculates a target change in state $dz^{o,tgt}_t$ (a target change in position $dq^{o,tgt}_t$ and a target change in posture $dq^{o,tgt}_t$) on the world coordinate system O, and supplies the target state to the world coordinate conversion unit 19, by which the processing proceeds to step S64.

In step S64, by use of the posture $q^o_t$ of the state $z^o_t$ of the manipulation target object, which is included in the state $z^i_t$ of the foreground #i supplied from the manipulation model learning unit 15, and in accordance with Formula (42), the world coordinate conversion unit 19 converts the target change in state $dz^{o,tgt}_t$ (the target change in position $dsq^{o,tgt}_t$ and the target change in posture $dq^{o,tgt}_t$) on the world coordinate system O from the change amount calculation unit 18 into a target change in state $dz^{o,tgt}_t"$ (a target change in position $dq^{o,tgt}_t"$ and a target change in posture $dq^{o,tgt}_t"$) on the object reference coordinate system O" of Formula (41).

The world coordinate conversion unit 19 then supplies the target change in state $dz^{o,tgt}_t"$ on the object reference coordinate system O" of Formula (41) to the change amount time division unit 20, and the processing proceeds from step S64 to step S65.

In step S65, in accordance with Formula (47), the change amount time division unit 20 divides the target change in state $dz^{o,tgt}_t"$ supplied from the world coordinate conversion unit 19 based on the number of times for achievement $T_{tgt}$ so as to calculate a unit change amount $\Delta z^{o,tgt}_t" = (\Delta s^{o,tgt}_t", \Delta q^{o,tgt}_t") = (ds^{o,tgt}_t"/T_{tgt}, dq^{o,tgt}_t"/T_{tgt})$.

The change amount time division unit 20 then supplies the unit change amount $\Delta z^{o,tgt}_t"$ to the action determination unit 21, and the processing proceeds from step S65 to step S66.

In step S66, by using the manipulation model stored in the manipulation model storage unit 16, the action determination unit 21 determines, as the action $u^m_t"$ of the hand, a position $s^m_t"$ and a change in position $\Delta s^m_t"$ of the hand on the object reference coordinate system O" having the highest frequency (probability) of causing the change in position $\Delta s^{o,tgt}_t" = ds^{o,tgt}_t"/T_{tgt}$ and the change in posture $\Delta q^{o,tgt}_t" = dq^{o,tgt}_t"/T_{tgt}$ as the change in state by unit change amount $\Delta z^{o,tgt}_t"$ supplied from the change amount time division unit 20, in the manipulation target object and supplies the determined action $u^m_t"$ to the object reference coordinate conversion unit 22.

Then, the processing proceeds from step S66 to step S67, and by use of the posture $q^o_t$ which is included in the state $z^o_t$ of the manipulation target object, included in the state $z^i_t$ of the foreground #i supplied from the manipulation model learning unit 15, and in accordance with Formula (38), the object reference coordinate conversion unit 22 converts the action $u^m_t"$ of the hand supplied from the action determination unit 21, i.e., the action $u^m_t"$ expressed with the object reference coordinate system O", into the action $u^m_t$ expressed with the world coordinate system O.

The object reference coordinate conversion unit 22 supplies the action $u^m_t$ obtained as described in the foregoing, i.e., the action $u^m_t$ of the hand (which has high possibility of) causing a change in state by unit change amount $\Delta z^{o,tgt}_t$ in the manipulation target object to the actuator control unit 11, and the processing proceeds from step S67 to step S68.

In step S68, based on the state $z^m_t$ of (the foreground #m of) the hand, which is included in the state $z^i_t$ of the foreground #i from the manipulation model learning unit 15, and the action $u^m_t$ from the object reference coordinate conversion unit 22, the actuator control unit 11 controls an actuator which drives an arm and the like of the agent, and the process is returned.

With the actuator control unit 11 controlling the actuator in step S68, the hand attached to the top end of the arm performs the action $u^m_t$.

As described in the foregoing, by use of an actual image $\lambda^\sim_t$ including the manipulation target object and the hand, the agent learns a manipulation model which associates a position $s^m_t$ and a change in position $\Delta s^m_t$ of the hand, when the position $s^m_t$ as a state of the hand changes at each position of the object reference coordinate system O" on the basis of the manipulation target object, with a change in position $\Delta s^o_t$ and a change in posture $\Delta q^o_t$ as the change in state of the manipulation target object caused by the change in state of the hand, so that a manipulation model with high versatility can be provided.

Specifically, in the manipulation model, a position $s^m_t$" and a change in position $\Delta s^m_t$" of the hand on the object reference coordinate system O", i.e., a position $s^m_t$" and a change in position $\Delta s^m_t$" of the hand as viewed from the manipulation target object, is associated with a change in position $\Delta s^o_t$" and a change in posture $\Delta q^o_t$" on the object reference coordinate system O" occurring in the manipulation target object, so that relationship between the position $s^m_t$" and the change in position $\Delta s^m_t$" of the hand and the change in position $\Delta s^o_t$" and the change in posture $\Delta q^o_t$" occurring in the manipulation target object can be acquired with smaller learned data (experience), as compared with the case where the position $s^m_t$ and the change in position $\Delta s^m_t$ of the hand on the world coordinate system O are associated with the change in position $\Delta s^m_t$ and the change in posture $\Delta q^o_t$ on the world coordinate system O occurring in the manipulation target object. This makes it possible to provide a manipulation model which can precisely manipulate an object through learning for short time.

Further in the manipulation model, if relationship of each position $s^m_t$" and each change in position $\Delta s^m_t$" of the hand on the object reference coordinate system O" with a change in position $\Delta s^o_t$" and a change in posture $\Delta q^o_t$" which occurs in the manipulation target object has been acquired, it becomes possible to repeatedly use the manipulation mode and to determine a position $s^m_t$" and a change in position $\Delta s^m_t$" as an action $u^m_t$" of the hand on the object reference coordinate system O" and by extension, an action $u^m_t$ of the hand on the world coordinate system O which allow precise manipulation of the manipulation target object even if the manipulation target object is placed in unknown positions or postures on the world coordinate system O.

Moreover, since additional learning can be performed in the manipulation model, the manipulation model can be updated so as to be adaptable to environmental change and the like, which makes it possible to prevent disagreement (inconsistency) from arising between a changed environment and the manipulation model.

Further in the present embodiment, since learning of the foreground appearance model, the background appearance model, and the manipulation model is performed, it becomes possible to omit manually constructing models with respect to geometric shapes and appearance of the hand and the manipulation target object, which serve as foregrounds, appearance of an environment serving as a background, and motions of the manipulation target object. As a result, it becomes possible Cu save time and effort taken for constructing such models.

[Chapter 6 Simulation]

Figure 28:
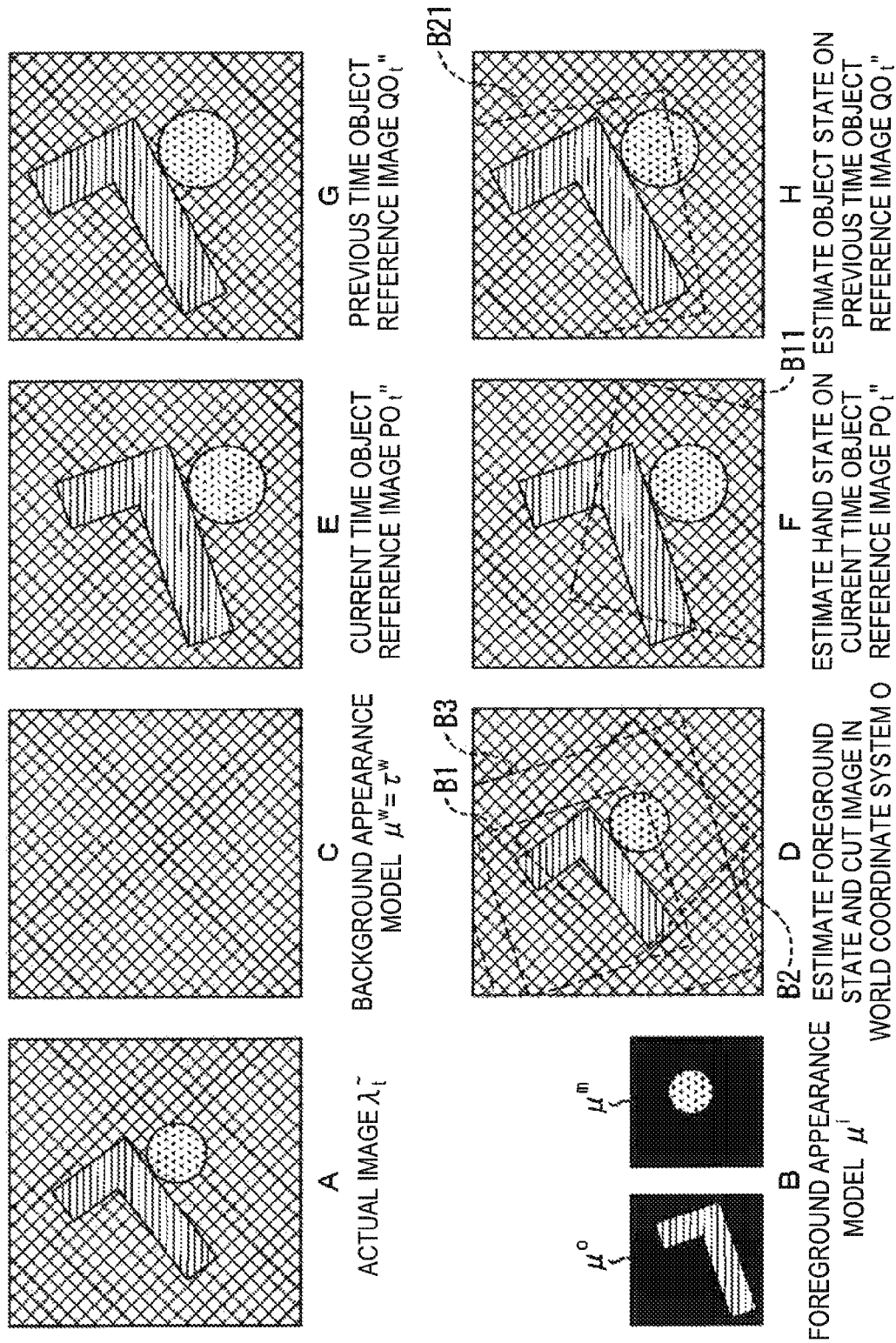
FIG. 28 is a view schematically showing results of simulations of the appearance model learning processing and the manipulation model learning processing.

FIG. 28 is a view schematically showing simulation results of the appearance model learning processing and the manipulation model learning processing performed by using as an actual image $\lambda^\sim_t$ an image created by combining a foreground #o of the manipulation target object and a foreground #m of the hand onto the background in a computer.

In the simulation, appearance model learning processing and manipulation model learning processing were performed by using as an actual image $\lambda^\sim_t$ an image including an L-shaped manipulation target object as a foreground #o being manipulated by a circular hand as a foreground #m.

FIG. 28A shows an actual image $\lambda^\sim_t$ at time t for use in simulation of appearance model learning processing and manipulation model learning processing.

FIG. 28B shows a foreground appearance model $\mu^o$ of the foreground #o of the manipulation target object and a foreground appearance model $\mu^m$ of the foreground #m of the hand obtained by appearance model learning processing.

FIG. 28C shows a background appearance model $\mu^w = \tau^w$ obtained by appearance model learning processing.

FIG. 28D shows a recognition result of recognizing (the foreground #o of) the manipulation target object and (the foreground #m of) of the hand from the actual image $\lambda^\sim_t$ of FIG. 28A and a specified range cut from the actual image $\lambda^\sim_t$ as an inclined image.

In FIG. 28D, a portion B1 enclosed with a dotted line represents an outer edge of a foreground appearance model $\mu^o$ of the manipulation target object when the foreground appearance model $\mu^o$ is placed in a state (position and posture) acquired from the actual image $\lambda^\sim_t$ by performing state estimation that recognizes the manipulation target object.

Moreover, a portion B2 enclosed with a dotted line represents an outer edge of a foreground appearance model $\mu^m$ of the hand when the foreground appearance model $\mu^m$ is placed in a state acquired from actual image $\lambda^\sim_t$ by performing state estimation that recognizes the hand.

Further, a portion B3 enclosed with a dotted line, like the portions B1 and B2 enclosed with a dotted line, represents a specified range (inclined image) cut on the basis of the object reference coordinate system $O_t$" at time t (current time t) from the actual image $\lambda^\sim_t$ when the manipulation target object and the hand have been recognized.

FIG. 28E shows a current time object reference image $PO_t$" generated from the actual image $\lambda^\sim_t$ of FIG. 28A.

FIG. 28F shows a recognition result of recognizing (the foreground #m of) the hand from the current time object reference image $PO_t$" of FIG. 28E.

In FIG. 28F, a portion B11 enclosed with a dotted line represents an outer edge of a foreground appearance model $\mu^m$ of the hand when the foreground appearance model $\mu^m$ is placed in a state (position and posture) acquired from current time object reference image $PO_t$" by performing state estimation that recognizes the hand.

FIG. 28G shows a previous time object reference image $QO_t$" generated from the actual image $\lambda^\sim_t$ of FIG. 28A.

FIG. 28H shows a recognition result of recognizing (the foreground #o of) the manipulation target object from the previous time object reference image $QO_t$" of FIG. 28G.

In FIG. 28H, a portion B21 enclosed with a dotted line represents an outer edge of a foreground appearance model $\mu^o$ of the manipulation target object when the foreground appearance model $\mu^o$ is placed in a state (position and posture) acquired from the previous time object reference image $QO_t''$ by performing state estimation that recognizes the manipulation target object.

In the simulation of FIG. 28, appearance model learning processing was performed until the foreground appearance model $\mu^i$ and the background appearance model $\mu^w$ were completed, and then manipulation model learning processing was performed by use of the foreground appearance model $\mu^i$ and the background appearance model $\mu^w$. Accordingly, from the beginning of the manipulation model learning processing, high-precision state estimation results could be obtained with respect to the hand or the manipulation target object.

In the case where appearance model learning processing is performed on one actual image $\lambda^\sim_t$, and then manipulation model learning processing is repeated afterward, state estimation results with respect to the hand and the manipulation target object in the manipulation model learning processing are low in precision until the foreground appearance model $\mu^i$ and the background appearance model $\mu^w$ are completed to some extent. However, as the foreground appearance model $\mu^i$ and the background appearance model $\mu^w$ are gradually completed, the precision of the state estimation results with respect to the hand and the manipulation target object in the manipulation model learning processing becomes better.

Figure 29:
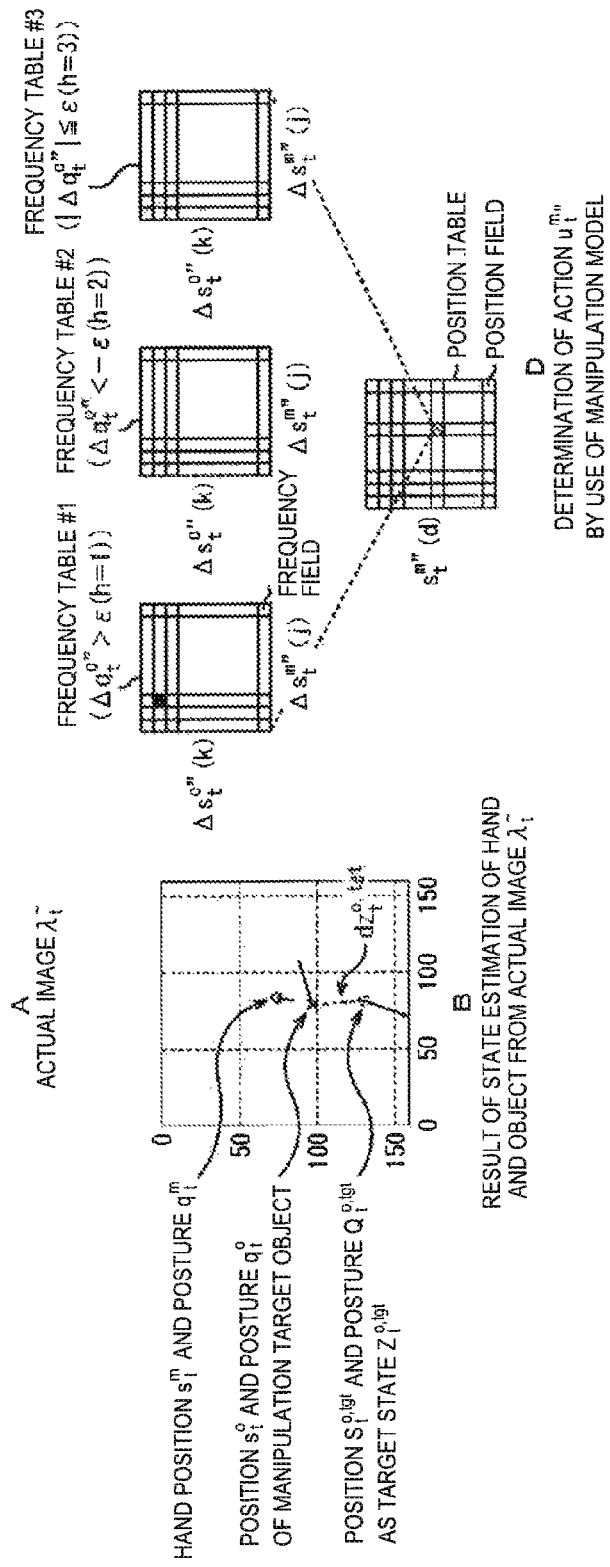
FIG. 29 is a view schematically showing a result of a simulation of the action output processing by use of the manipulation model.

FIG. 29 is a view schematically showing a simulation result of the action output processing by use of the manipulation model.

FIG. 29A shows an actual image $\mu^\sim_t$ at time t for use in simulation of action output processing.

FIG. 29B shows states as a result of state estimation of the hand and the manipulation target object from the actual image $\lambda^\sim_t$ of FIG. 29A, and a target state $z^{o,tgt}_t$, and a target change in state $dz^{o,tgt}_t$.

Specifically, FIG. 29B shows a position $s^m_t$ and a posture $q^m_t$ as the state of the hand, a position $s^o_t$ and a posture $q^o_t$ as the state of the manipulation target object, a position $s^{o,tgt}_t$ and a posture $q^{o,tgt}_t$ as the target state $z^{o,tgt}_t$, and a target change in state $dz^{o,tgt}_t$ on the world coordinate system O.

Note that in FIG. 29B, a line segment designates a posture or a target change in state, and a circle and a cross designate a position. This also applies in FIG. 29C.

FIG. 29C shows a position $s^m_t''$ and a change in position $\Delta s^m_t''$ of the hand and a target change in state $dz^{o,tgt}_t''$ on the object reference coordinate system O''. An origin of the object reference coordinate system O'' also serves as the centroid of the manipulation target object.

FIG. 29D is a view showing an action $u^m_t''$ of the hand being determined by use of the manipulation model.

The agent discretizes the change in position $ds^{o,tgt}_t''/T_{tgt}$ and the change in posture $dq^{o,tgt}_t''/T_{tgt}$ as the change in state by unit change amount $\Delta z^{o,tgt}_t''$ to calculate values #k* and #h* of indexes #k and #h obtained by discretizing the change in position $ds^{o,tgt}_t''/T_{tgt}$ and the change in posture $dq^{o,tgt}_t''/T_{tgt}$.

Further, in the frequency table included in the position field of each index #d obtained by discretizing each position $s^m_t''$ in the position table as a manipulation model (FIG. 20), the agent selects, out of the frequency fields where the indexes #k and #h have values #k* and #h*, a maximum frequency field with a maximum frequency stored therein.

In FIG. 29D, a frequency field selected as the maximum frequency field in the frequency table is marked out in black.

The agent calculates values #j* of index #j obtained by discretizing the change in position $\Delta s^m_t''$ of the hand which is allocated to the maximum frequency field, and also calculates values #d* of index #d obtained by discretizing the position $s^m_t''$ of the hand which is allocated to the position field (a portion marked with a slanting line in FIG. 29D) in the position table having a frequency table including the maximum frequency field.

The agent then determines a representative value representing a range of the position of the hand discretized into index #d* as a position $s^m_t''$ to be used as a component of the action $u^m_t''$ of the hand, and also determines a representative value representing a range of change in position of the hand discretized into index #j* as a change in position $\Delta s^m_t''$ to be used as a component of the action $u^m_t''$ of the hand.

Herein, in the position table, the position field (portion marked with a slanting line in FIG. 29I)) having a frequency table including the maximum frequency field corresponds to the position (position on the object reference coordinate system O'') where movement of the hand is started when the hand is moved to put the manipulation target object in a target state.

Note that, in the simulation, a position table divided into 20×20 position fields in width×length was adopted.

Figure 30:
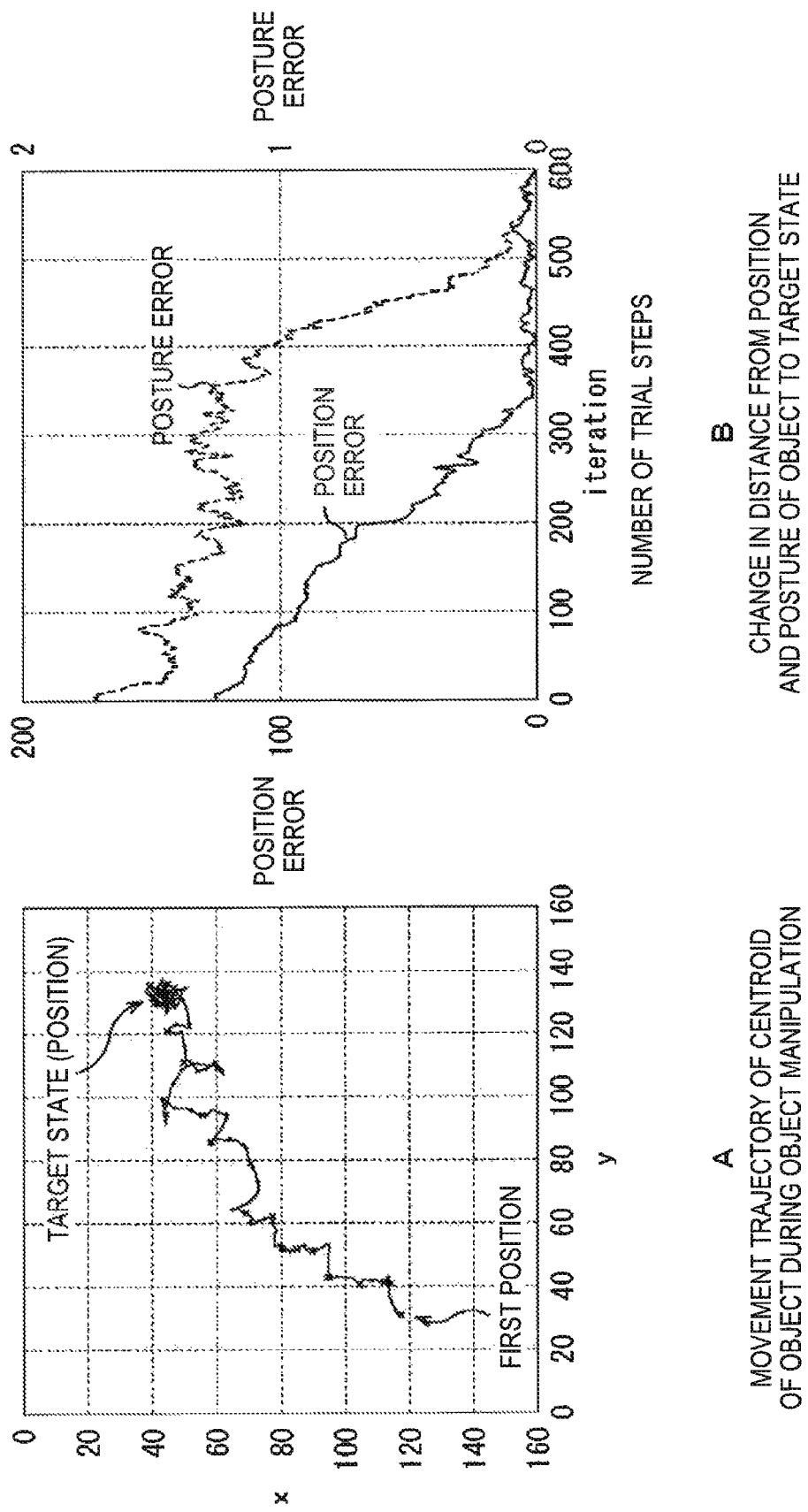
FIG. 30 is a view schematically showing another result of a simulation of the action output processing by use of the manipulation model.

FIG. 30 is a view showing another result of the simulation of e action output processing by use of the manipulation model.

FIG. 30A shows a movement trajectory (movement trajectory on the world coordinate system O) of the manipulation target object manipulated by the hand.

FIG. 30B shows an error of the position and an error of the posture of the manipulation target object manipulated by the hand.

In FIG. 30B, a horizontal axis represents the number of trial steps that is the number of times that the hand was moved (the number of times that an action of the hand was determined), while a vertical axis represents an error of the position and an error of the posture of the manipulation target object with respect to a target state.

The agent is moving the hand so that both the position and the posture reach the target state simultaneously. Accordingly, as shown in FIG. 30A, the movement trajectory of the manipulation target object is a trajectory which sways from side to side with respect to a shortest trajectory extending from a first position of the manipulation target object to a target state position.

In the simulation, it was confirmed that position error and posture error of the manipulation target object tend to decrease as manipulation of the hand progresses and that the manipulation target object achieves the position as a target state first and then both the position and posture as the target state are achieved.

In FIG. 30B, the manipulation target object achieves the position as a target state with about 350 steps (the number of trial steps), and achieves both the position and posture as a target state with 600 steps.

[Chapter 7 Description of computer with the Technology Applied Thereto]

Next, a series of aforementioned processing may be executed by hardware and may also be executed by software. When a series of processing is performed by software, a program constituting the software is installed in a general-purpose computer or the like.

Figure 31:
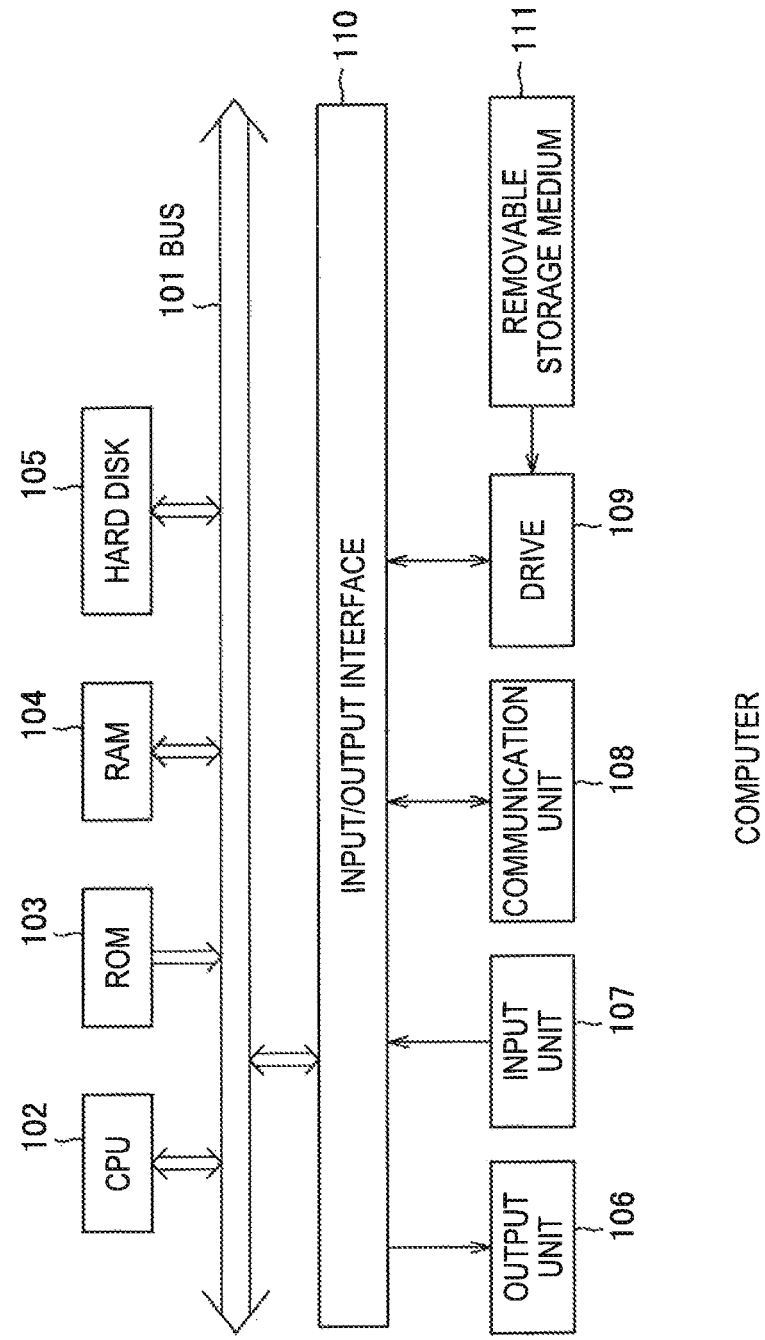
FIG. 31 is a block diagram showing a configuration example of one embodiment of a computer with the technology applied thereto.

Accordingly, FIG. 31 shows a configuration example of one embodiment of a computer in which a program for executing a series of aforementioned processing is installed.

The program may be recorded in advance in a hard disk 105 or a ROM 103 as a record medium built in the computer.

Or alternatively, the program may be stored (recorded) in a removable recording medium 111. Such a removable recording medium 111 may be provided as a so-called package software. Here, examples of the removable recording medium 111 include a flexible disk, a compact disc read only memory (CD-ROM), a magneto optical (MO) disc, a digital versatile disc (DVD), a magnetic disc, and a semiconductor memory.

Note that the program may be installed on a computer through the removable recording medium 111 as described above and in addition, the program may be downloaded onto a computer via a communication network or a broadcasting network and installed onto a built-in hard disk 105. Specifically, the program may be transferred, for example, from a download site to a computer in a wireless manner via a satellite for digital satellite broadcasting or may be transferred to a computer in a wired manner via a network such as a local area network (LAN) and the Internet.

The computer incorporates a central processing unit (CPU) 102, and the CPU 102 is connected to an input/output interface 110 is via a bus 101.

Upon reception of an instruction inputted by operation of an input unit 107 or the like by a user through the input/output interface 110, the CPU 102 executes a program stored in the read only memory (ROM) 103 in response to the instruction. Or alternatively, the CPU 102 loads a program stored in the hard disk 105 to a random access memory (RAM) 104 and executes the program.

As a consequence, the CPU 102 performs processing in accordance with the aforementioned flow charts or the processing performed by the configuration of the block diagrams described in the foregoing. The CPU 102 then outputs a result of processing from an output unit 106 via, for example, the input/output interface 110, or transmits the result from a communication unit 108, and further records the result onto the hard disk 105 as appropriate.

Note that the input unit 107 includes a keyboard, a mouse, and a microphone. The output unit 106 includes a liquid crystal display (LCD) and a speaker.

In this specification, the processing executed by a computer in accordance with the program may be executed neither in the order described in the flow charts nor in chronological order. In other words, the processing performed by a computer in accordance with the program includes a process that is executed parallely or individually (such as parallel processing or object-based processing).

Moreover, the program may be processed by one computer (processor), or distributed-processing by a plurality of computers may be performed. Furthermore, the program may be transferred to a remote computer and be executed thereon.

Further in this specification, a system refers to a set of a plurality of component members (such as devices and modules (components)), and therefore all the constituent elements may be and may be not in the same casing. Therefore, a plurality of apparatuses stored in individual casings and connected via a network, and one apparatus including a plurality of modules stored in one casing are all included in the system.

It should be understood by those skilled in the art that various modifications, combinations, sub-combinations and alterations may occur depending on design requirements and other factors insofar as they are within the scope of the appended claims or the equivalents thereof.

For example, the technology may adopt a cloud computing configuration in which one function is assigned to a plurality of apparatuses via a network and is jointly processed thereby.

Moreover, each step explained in the aforementioned flow charts may be executed not only by one apparatus and but also by a plurality of apparatuses in cooperation with each other.

Further, when a plurality of processes are included in one step, a plurality of processes included in the one step may be executed not only by one apparatus, but also by a plurality of apparatuses in cooperation with each other.

Although the posture of the hand is unchanged in the present embodiment, the technology may also be applied to the case where the posture of the hand is changed.

Further, the technology may be applied to the case where an arbitrary first object is manipulated with another arbitrary second object.

Although the centroid origin coordinate system O" (FIG. 13) is used as an object reference coordinate system for treating the manipulation model in the present embodiment, a local coordinate system O' (FIG. 13) may also be adopted as the object reference coordinate system.

Additionally, the present technology may also be configured as below.

(1) An information processing apparatus including:
a manipulation model learning unit configured to learn a manipulation model regarding manipulation of a first object by a second object, by use of an actual image that is an actually observed image including the first object and the second object, the manipulation model associating a position and a change in state of the second object, when a state of the second object changes at a position in an object reference coordinate system with the first object regarded as a reference, with a change in state of the first object caused by the change in state of the second object.

(2) The information processing apparatus according to (1), wherein
the manipulation model includes a frequency table of the position in the object reference coordinate system, the frequency table indicating a frequency of occurrence of the change in state of the first object when the change in state of the second object occurs from the position.

(3) The information processing apparatus according to (2), wherein
the manipulation model learning unit includes a manipulation model updating unit configured to update the manipulation model by incrementing, when a specified change in state of the second object at a specified position in the object reference coordinate system, causes another specified change in state of the first object, a frequency of occurrence of the another specified change in state of the first object caused by the specified change in state of the second object occurred at the specified position, in the frequency table.

(4) The information processing apparatus according to (3), wherein
the manipulation model learning unit further includes
a first object reference image generation unit configured to generate a current time object reference image that is an image obtained by cutting away, from an actual image of current time, a specified range based on a current time object reference coordinate system that is the object reference coordinate system with the first object included in the actual image of current time regarded as a reference, and rotating the specified range in a manner that an inclination of the current time object reference coordinate system becomes 0,
a first recognition unit configured to recognize the second object from the current time object reference image to calculate a position and a change in state of the second object as the position and the change in state of the second object in the object reference coordinate system, a second object reference image generation unit configured to generate a previous time object reference image that is an image obtained by cutting away, from the actual image of current time, a specified range based on a previous time object reference coordinate system that is the object reference coordinate system with the first object included in an actual image of previous time that is immediately before the current time regarded as a reference, and rotating the specified range in a manner that an inclination of the previous time object reference coordinate system becomes 0, and a second recognition unit configured to recognize the first object from the previous time object reference image to calculate a state of the first object as the change in state of the first object in the object reference coordinate system, and the manipulation model updating unit updates the manipulation model based on the position and the change in state of the second object in the object reference coordinate system calculated in the first recognition unit and the change in state of the first object in the object reference coordinate system calculated in the second recognition unit.

(5) The information processing apparatus according to any one of (2) to (4), further including:

an action determination unit configured to determine an action of the second object for manipulating the first object by use of the manipulation model in a manner that a state of the first object is set equal to a specified target state.

(6) The information processing apparatus according to (5), wherein the action determination unit uses the manipulation model to determine, as the action of the second object, a position and a change in state of the second object on the object reference coordinate system having a highest frequency of causing the first object to have a change in state by a unit change amount that is an amount of a change in state of the first object used at current time for setting the state of the first object to be equal to the specified target state.

(7) The information processing apparatus according to any one of (1) to (6), further including:

an appearance model learning unit configured to learn a foreground appearance model that is an appearance model of a foreground corresponding to each of the first object and the second object in the actual image and a background appearance model that is an appearance model of a background by use of the actual image.

(8) The information processing apparatus according to (7), wherein the appearance model learning unit includes a foreground state estimation unit configured to estimate a state of the foreground by use of the actual image, and an appearance model updating unit configured to update the foreground appearance model and the background appearance model by use of a result obtained by estimating the state of the foreground.

(9) The information processing apparatus according to (8), wherein the background appearance model includes a background texture model indicating a texture of the background, the foreground appearance model includes a foreground texture model indicating a texture of the foreground and a foreground shape model indicating a shape of the foreground, and the state of the foreground includes a position of the foreground and a change velocity of the position, as well as a posture of the foreground and a change velocity of the posture.

(10) The information processing apparatus according to (9), wherein the background appearance model and the foreground appearance model are updated according to an EM algorithm using a particle filter.

(11) The information processing apparatus according to (10), wherein the foreground state estimation unit performs processing to calculate a weight of a state particle, which is a particle representing the state of the foreground, and to calculate a transition destination of the state particle as an E step of the EM algorithm using the particle filter.

(12) The information processing apparatus according to (11), wherein the foreground state estimation unit calculates, as the weight of the state particle, a value corresponding to an observation likelihood of an observation value observed in a generation model that generates an observed value of an image when the state of the foreground is equal to a state represented by the state particle; and calculates the transition destination of the state particle, on an assumption that the state particle transits, while stochastically fluctuating, according to the change velocity of the position and the change velocity of the posture among the states of the foreground represented by the state particle, and in the generation model, an observation value of the image observed in the generation model is generated by alpha-blending the texture indicated by the foreground texture model and the texture indicated by the background texture model, with the foreground shape model regarded as an alpha value, for a point on the image indicated by the foreground appearance model, and adopting the texture indicated by the background texture model for a point other than the point on the image indicated by the foreground appearance model.

(13) The information processing apparatus according to (11) or (12), wherein the appearance model updating unit performs, as an M step of the EM algorithm using the particle filter, processing to update the foreground texture model by cutting away an image from the actual image in accordance with the state represented by the state particle and weighting and summing the cut image cut away from the actual image in accordance with the weight of the state particle, processing to update the background texture model by removing from the actual image a foreground corresponding to the state in accordance with the state represented by the state particle and weighting and summing the actual image having the foreground removed therefrom in accordance with the weight of the state particle, and processing to update the foreground shape model by calculating a likelihood of pixels of the texture, which is indicated by the foreground texture model, being a foreground and a likelihood of the pixels being a background, and calculating a probability of the pixels of the texture, which is indicated by the foreground texture model, being a foreground by use of the likelihood of being a foreground and the likelihood of being a background.

(14) The information processing apparatus according to (13), wherein the appearance model updating unit updates the foreground texture model by equalizing a weighted sum value during predetermined time, the weighted sum value being obtained by weighting and summing the cut image in accordance with the weight of the state particle, and updates the background texture model by equalizing a weighted sum value during predetermined time, the weighted sum value being obtained by weighting and summing the actual image having the foreground removed therefrom in accordance with the weight of the state particle.

(15) An information processing method including:

learning a manipulation model regarding manipulation of a first object by a second object by use of an actual image that is an actually observed image including the first object and the second object, the manipulation model associating a position and a change in state of the second object, when a state of the second object changes at a position in an object reference coordinate system with the first object regarded as a reference, with a change in state of the first object caused by the change in state of the second object.

(16) A program that causes a computer to function as:

a manipulation model learning unit configured to learn a manipulation model regarding manipulation of a first object by a second object by use of an actual image that is an actually observed image including the first object and the second object, the manipulation model associating a position and a change in state of the second object, when a state of the second object changes at a position in an object reference coordinate system with the first object regarded as a reference, with a change in state of the first object caused by the change in state of the second object.

The present disclosure contains subject matter related to that disclosed in Japanese Priority Patent Application JP 2012-230513 filed in the Japan Patent Office on Oct. 18, 2012, the entire content of which is hereby incorporated by reference.

What is claimed is:

1. An information processing apparatus comprising:
    a manipulation model learning unit configured to learn a manipulation model regarding manipulation of a first object by a second object, by use of an actual image that is an actually observed image including the first object and the second object, the manipulation model associating a position and a change in state of the second object, when a state of the second object changes at a position in an object reference coordinate system with the first object regarded as a reference, with a change in state of the first object caused by the change in state of the second object,
    wherein the manipulation model includes a frequency table of the position in the object reference coordinate system, the frequency table indicating a frequency of occurrence of the change in state of the first object when the change in state of the second object occurs from the position,
    wherein the manipulation model learning unit includes a manipulation model updating unit configured to update the manipulation model by incrementing, when a specified change in state of the second object at a specified position in the object reference coordinate system, causes another specified change in state of the first object, a frequency of occurrence of the another specified change in state of the first object caused by the specified change in state of the second object occurred at the specified position, in the frequency table, and
    wherein the manipulation model learning unit further includes
        a first object reference image generation unit configured to generate a current time object reference image that is an image obtained by cutting away, from an actual image of current time, a specified range based on a current time object reference coordinate system that is the object reference coordinate system with the first object included in the actual image of current time regarded as a reference, and rotating the specified range in a manner that an inclination of the current time object reference coordinate system becomes 0,
        a first recognition unit configured to recognize the second object from the current time object reference image to calculate a position and a change in state of the second object as the position and the change in state of the second object in the object reference coordinate system,
        a second object reference image generation unit configured to generate a previous time object reference image that is an image obtained by cutting away, from the actual image of current time, a specified range based on a previous time object reference coordinate system that is the object reference coordinate system with the first object included in an actual image of previous time that is immediately before the current time regarded as a reference, and rotating the specified range in a manner that an inclination of the previous time object reference coordinate system becomes 0, and
        a second recognition unit configured to recognize the first object from the previous time object reference image to calculate a state of the first object as the change in state of the first object in the object reference coordinate system, and the manipulation model updating unit updates the manipulation model based on the position and the change in state of the second object in the object reference coordinate system calculated in the first recognition unit and the change in state of the first object in the object reference coordinate system calculated in the second recognition unit.

2. The information processing apparatus according to claim 1, further comprising:
    an action determination unit configured to determine an action of the second object for manipulating the first object by use of the manipulation model in a manner that a state of the first object is set equal to a specified target state.

3. The information processing apparatus according to claim 2, wherein
    the action determination unit uses the manipulation model to determine, as the action of the second object, a position and a change in state of the second object on the object reference coordinate system having a highest frequency of causing the first object to have a change in state by a unit change amount that is an amount of a change in state of the first object used at current time for setting the state of the first object to be equal to the specified target state.

4. The information processing apparatus according to claim 1, further comprising:
    an appearance model learning unit configured to learn a foreground appearance model that is an appearance model of a foreground corresponding to each of the first object and the second object in the actual image and a background appearance model that is an appearance model of a background by use of the actual image.

5. The information processing apparatus according to claim 4, wherein the appearance model learning unit includes
- a foreground state estimation unit configured to estimate a state of the foreground by use of the actual image, and
- an appearance model updating unit configured to update the foreground appearance model and the background appearance model by use of a result obtained by estimating the state of the foreground.

6. The information processing apparatus according to claim 5, wherein
the background appearance model includes a background texture model indicating a texture of the background,
the foreground appearance model includes a foreground texture model indicating a texture of the foreground and a foreground shape model indicating a shape of the foreground, and
the state of the foreground includes a position of the foreground and a change velocity of the position, as well as a posture of the foreground and a change velocity of the posture.

7. The information processing apparatus according to claim 6, wherein
the background appearance model and the foreground appearance model are updated according to an Expectation-Maximization algorithm using a particle filter.

8. The information processing apparatus according to claim 7, wherein
the foreground state estimation unit performs processing to calculate a weight of a state particle, which is a particle representing the state of the foreground, and to calculate a transition destination of the state particle as an expectation step of the Expectation-Maximization algorithm using the particle filter.

9. The information processing apparatus according to claim 8, wherein
the foreground state estimation unit
- calculates, as the weight of the state particle, a value corresponding to an observation likelihood of an observation value observed in a generation model that generates an observed value of an image when the state of the foreground is equal to a state represented by the state particle; and
- calculates the transition destination of the state particle, on an assumption that the state particle transits, while stochastically fluctuating, according to the change velocity of the position and the change velocity of the posture among the states of the foreground represented by the state particle, and
in the generation model, an observation value of the image observed in the generation model is generated by alpha-blending the texture indicated by the foreground texture model and the texture indicated by the background texture model, with the foreground shape model regarded as an alpha value, for a point on the image indicated by the foreground appearance model, and adopting the texture indicated by the background texture model for a point other than the point on the image indicated by the foreground appearance model.

10. The information processing apparatus according to claim 8, wherein
the appearance model updating unit performs, as a maximization step of the Expectation-Maximization algorithm using the particle filter,
processing to update the foreground texture model by cutting away an image from the actual image in accordance with the state represented by the state particle and weighting and summing the cut image cut away from the actual image in accordance with the weight of the state particle,
processing to update the background texture model by removing from the actual image a foreground corresponding to the state in accordance with the state represented by the state particle and weighting and summing the actual image having the foreground removed therefrom in accordance with the weight of the state particle, and
processing to update the foreground shape model by calculating a likelihood of pixels of the texture, which is indicated by the foreground texture model, being a foreground and a likelihood of the pixels being a background, and calculating a probability of the pixels of the texture, which is indicated by the foreground texture model, being a foreground by use of the likelihood of being a foreground and the likelihood of being a background.

11. The information processing apparatus according to claim 10, wherein
the appearance model updating unit
- updates the foreground texture model by equalizing a weighted sum value during predetermined time, the weighted sum value being obtained by weighting and summing the cut image in accordance with the weight of the state particle, and
- updates the background texture model by equalizing a weighted sum value during predetermined time, the weighted sum value being obtained by weighting and summing the actual image having the foreground removed therefrom in accordance with the weight of the state particle.

12. An information processing method comprising:
learning a manipulation model regarding manipulation of a first object by a second object by use of an actual image that is an actually observed image including the first object and the second object, the manipulation model associating a position and a change in state of the second object, when a state of the second object changes at a position in an object reference coordinate system with the first object regarded as a reference, with a change in state of the first object caused by the change in state of the second object,
wherein the manipulation model includes a frequency table of the position in the object reference coordinate system, the frequency table indicating a frequency of occurrence of the change in state of the first object when the change in state of the second object occurs from the position,
wherein the manipulation model is updated by incrementing, when a specified change in state of the second object at a specified position in the object reference coordinate system, causes another specified change in state of the first object, a frequency of occurrence of the another specified change in state of the first object caused by the specified change in state of the second object occurred at the specified position, in the frequency table, and
wherein learning the manipulation model further includes
generating a current time object reference image that is an image obtained by cutting away, from an actual image of current time, a specified range based on a current time object reference coordinate system that is the object reference coordinate system with the first object included in the actual image of current time regarded as a reference, and rotating the specified range in a manner that an inclination of the current time object reference coordinate system becomes 0, recognizing the second object from the current time object reference image to calculate a position and a change in state of the second object as the position and the change in state of the second object in the object reference coordinate system, generating a previous time object reference image that is an image obtained by cutting away, from the actual image of current time, a specified range based on a previous time object reference coordinate system that is the object reference coordinate system with the first object included in an actual image of previous time that is immediately before the current time regarded as a reference, and rotating the specified range in a manner that an inclination of the previous time object reference coordinate system becomes 0, and recognizing the first object from the previous time object reference image to calculate a state of the first object as the change in state of the first object in the object reference coordinate system, and the manipulation model is updated based on the position and the change in state of the second object in the object reference coordinate system calculated in the first recognition unit and the calculated change in state of the first object in the object reference coordinate system.

13. A non-transitory computer-readable storage medium having embodied thereon a program, which when executed by a computer causes the computer to execute a method, the method comprising:

learning a manipulation model regarding manipulation of a first object by a second object by use of an actual image that is an actually observed image including the first object and the second object, the manipulation model associating a position and a change in state of the second object, when a state of the second object changes at a position in an object reference coordinate system with the first object regarded as a reference, with a change in state of the first object caused by the change in state of the second object, wherein the manipulation model includes a frequency table of the position in the object reference coordinate system, the frequency table indicating a frequency of occurrence of the change in state of the first object when the change in state of the second object occurs from the position, wherein the manipulation model learning unit includes a manipulation model updating unit configured to update the manipulation model by incrementing, when a specified change in state of the second object at a specified position in the object reference coordinate system, causes another specified change in state of the first object, a frequency of occurrence of the another specified change in state of the first object caused by the specified change in state of the second object occurred at the specified position, in the frequency table, and wherein the manipulation model learning unit further includes a first object reference image generation unit configured to generate a current time object reference image that is an image obtained by cutting away, from an actual image of current time, a specified range based on a current time object reference coordinate system that is the object reference coordinate system with the first object included in the actual image of current time regarded as a reference, and rotating the specified range in a manner that an inclination of the current time object reference coordinate system becomes 0, a first recognition unit configured to recognize the second object from the current time object reference image to calculate a position and a change in state of the second object as the position and the change in state of the second object in the object reference coordinate system, a second object reference image generation unit configured to generate a previous time object reference image that is an image obtained by cutting away, from the actual image of current time, a specified range based on a previous time object reference coordinate system that is the object reference coordinate system with the first object included in an actual image of previous time that is immediately before the current time regarded as a reference, and rotating the specified range in a manner that an inclination of the previous time object reference coordinate system becomes 0, and a second recognition unit configured to recognize the first object from the previous time object reference image to calculate a state of the first object as the change in state of the first object in the object reference coordinate system, and the manipulation model updating unit updates the manipulation model based on the position and the change in state of the second object in the object reference coordinate system calculated in the first recognition unit and the change in state of the first object in the object reference coordinate system calculated in the second recognition unit.

14. An information processing apparatus comprising:

a manipulation model learning unit configured to learn a manipulation model regarding manipulation of a first object by a second object, by use of an actual image that is an actually observed image including the first object and the second object, the manipulation model associating a position and a change in state of the second object, when a state of the second object changes at a position in an object reference coordinate system with the first object regarded as a reference, with a change in state of the first object caused by the change in state of the second object an appearance model learning unit configured to learn a foreground appearance model that is an appearance model of a foreground corresponding to each of the first object and the second object in the actual image and a background appearance model that is an appearance model of a background by use of the actual image, wherein the appearance model learning unit includes a foreground state estimation unit configured to estimate a state of the foreground by use of the actual image, and an appearance model updating unit configured to update the foreground appearance model and the background appearance model by use of a result obtained by estimating the state of the foreground, wherein the background appearance model includes a background texture model indicating a texture of the background, wherein the foreground appearance model includes a foreground texture model indicating a texture of the foreground and a foreground shape model indicating a shape of the foreground, and wherein the state of the foreground includes a position of the foreground and a change velocity of the position, as well as a posture of the foreground and a change velocity of the posture, wherein the background appearance model and the foreground appearance model are updated according to an Expectation-Maximization algorithm using a particle filter, and wherein the foreground state estimation unit performs processing to calculate a weight of a state particle, which is a particle representing the state of the foreground, and to calculate a transition destination of the state particle as an expectation step of the Expectation-Maximization algorithm using the particle filter.

15. The information processing apparatus according to claim 14, wherein the foreground state estimation unit calculates, as the weight of the state particle, a value corresponding to an observation likelihood of an observation value observed in a generation model that generates an observed value of an image when the state of the foreground is equal to a state represented by the state particle; and calculates the transition destination of the state particle, on an assumption that the state particle transits, while stochastically fluctuating, according to the change velocity of the position and the change velocity of the posture among the states of the foreground represented by the state particle, and in the generation model, an observation value of the image observed in the generation model is generated by alpha-blending the texture indicated by the foreground texture model and the texture indicated by the background texture model, with the foreground shape model regarded as an alpha value, for a point on the image indicated by the foreground appearance model, and adopting the texture indicated by the background texture model for a point other than the point on the image indicated by the foreground appearance model.

16. The information processing apparatus according to claim 14, wherein the appearance model updating unit performs, as a maximization step of the Expectation-Maximization algorithm using the particle filter, processing to update the foreground texture model by cutting away an image from the actual image in accordance with the state represented by the state particle and weighting and summing the cut image cut away from the actual image in accordance with the weight of the state particle, processing to update the background texture model by removing from the actual image a foreground corresponding to the state in accordance with the state represented by the state particle and weighting and summing the actual image having the foreground removed therefrom in accordance with the weight of the state particle, and processing to update the foreground shape model by calculating a likelihood of pixels of the texture, which is indicated by the foreground texture model, being a foreground and a likelihood of the pixels being a background, and calculating a probability of the pixels of the texture, which is indicated by the foreground texture model, being a foreground by use of the likelihood of being a foreground and the likelihood of being a background.

17. The information processing apparatus according to claim 16, wherein the appearance model updating unit updates the foreground texture model by equalizing a weighted sum value during predetermined time, the weighted sum value being obtained by weighting and summing the cut image in accordance with the weight of the state particle, and updates the background texture model by equalizing a weighted sum value during predetermined time, the weighted sum value being obtained by weighting and summing the actual image having the foreground removed therefrom in accordance with the weight of the state particle.

* * * * *